(12) United States Patent
Price et al.

(10) Patent No.: US 10,690,085 B2
(45) Date of Patent: Jun. 23, 2020

(54) VARIABLE TRAVEL VALVE APPARATUS FOR AN INTERNAL COMBUSTION ENGINE

(71) Applicant: JP Scope, Inc., Mt. Juliet, TN (US)

(72) Inventors: Charles Price, Mt. Juliet, TN (US); Jay McFarlane, Mt. Juliet, TN (US); Stephen John Charlton, Rancho Santa Fe, CA (US); William Anderson, Cameron Park, CA (US); David Evans, Nederland, CO (US); Guy Robert Babbitt, Fort Collins, CO (US); Christopher Wayne Turner, Windsor, CO (US); Daniel S. Pedersen, Fort Collins, CO (US); Clayton Jacobs, Loveland, CO (US); Drew Cohen, Fort Collins, CO (US); Nicholas Paul Echter, Fort Collins, CO (US); Kristina Weyer-Geigel, Yakima, WA (US); Caleb Alvarado, Fort Collins, CO (US)

(73) Assignee: JP Scope, Inc., Mt. Juliet, TN (US)

( * ) Notice: Subject to any disclaimer, the term of this patent is extended or adjusted under 35 U.S.C. 154(b) by 0 days.

(21) Appl. No.: 16/296,857

(22) Filed: Mar. 8, 2019

(65) Prior Publication Data
US 2019/0338724 A1    Nov. 7, 2019

Related U.S. Application Data

(63) Continuation of application No. PCT/US2017/051016, filed on Sep. 11, 2017.
(Continued)

(51) Int. Cl.
*F02F 1/24*    (2006.01)
*F01L 9/04*    (2006.01)

(52) U.S. Cl.
CPC ............. *F02F 1/24* (2013.01); *F01L 9/04* (2013.01); *F01L 2009/0405* (2013.01); *F02F 2001/244* (2013.01)

(58) Field of Classification Search
CPC ......... F02F 1/24; F02F 2001/244; F01L 9/04; F01L 2009/0405
See application file for complete search history.

(56) References Cited

U.S. PATENT DOCUMENTS

| | | |
|---|---|---|
| 13,905 A | 12/1855 | Gardiner |
| 1,123,986 A | 1/1915 | Bowman et al. |

(Continued)

FOREIGN PATENT DOCUMENTS

| | | |
|---|---|---|
| CH | 73015 | 8/1916 |
| CN | 1344348 | 4/2002 |

(Continued)

OTHER PUBLICATIONS

AutoSpeed—BMW's Valvetronic! autospeed, [online] [retrieved on Apr. 28, 2008] Retrieved from the Internet, URL: Hyperlink "http://www.autospeed.com/cms/article/html?&A=1083" http://www.autospeed.com/cms/article/html?&A=1083 , pp. 1-6.

(Continued)

*Primary Examiner* — Hung Q Nguyen
(74) *Attorney, Agent, or Firm* — Cooley LLP

(57) ABSTRACT

An apparatus includes a valve and an actuator. The valve has a portion movably disposed within a valve pocket defined by a cylinder head of an engine. The valve is configured to move relative to the cylinder head a distance between a closed position and an opened position. The portion of the valve defines a flow opening that is in fluid communication with a cylinder of an engine when the valve is in the opened (Continued)

position. The actuator is configured to selectively vary the distance between the closed position and the opened position.

20 Claims, 43 Drawing Sheets

Related U.S. Application Data

(60) Provisional application No. 62/385,804, filed on Sep. 9, 2016.

(56) References Cited

U.S. PATENT DOCUMENTS

| | | | |
|---|---|---|---|
| 1,161,223 A | 11/1915 | Koken et al. | |
| 1,161,224 A | 11/1915 | Koken et al. | |
| 1,273,002 A | 7/1918 | Samuels | |
| 1,303,748 A | 5/1919 | Wattel | |
| 1,340,481 A | 5/1920 | Francis | |
| 1,537,248 A | 5/1925 | Maloney | |
| 1,599,430 A | 9/1926 | Ofeldt | |
| 1,612,550 A | 12/1926 | Tom | |
| 1,618,687 A | 2/1927 | Swanstrom | |
| RE16,814 E | 12/1927 | Farmer et al. | |
| 1,724,458 A | 8/1929 | Davidson | |
| 1,818,527 A | 8/1931 | Becker | |
| 1,835,971 A | 12/1931 | Schattanek | |
| 1,877,760 A | 9/1932 | Berner et al. | |
| 1,922,678 A * | 8/1933 | Hallett | F01L 7/028 123/188.4 |
| 2,201,292 A | 5/1940 | Hickey | |
| 2,244,706 A | 6/1941 | Irving | |
| 2,296,081 A | 9/1942 | Aspin | |
| 2,302,442 A * | 11/1942 | Hickey | F01L 5/04 123/188.4 |
| 2,364,040 A | 11/1944 | Grube | |
| 2,409,350 A | 10/1946 | Forrest | |
| 2,741,931 A | 4/1956 | Sills | |
| 2,770,140 A | 11/1956 | Palumbo | |
| 3,198,181 A * | 8/1965 | Dolphin | F01L 7/08 123/59.2 |
| 3,633,869 A | 1/1972 | Lehmann | |
| 3,788,597 A | 1/1974 | Ichioka | |
| 3,882,833 A | 5/1975 | Longstaff et al. | |
| 3,896,781 A | 7/1975 | Smith | |
| 4,333,427 A | 6/1982 | Burillo et al. | |
| 4,342,294 A | 8/1982 | Hopkins | |
| 4,363,302 A | 12/1982 | Pischinger | |
| 4,455,543 A | 6/1984 | Pischinger et al. | |
| 4,614,170 A | 9/1986 | Pischinger et al. | |
| 4,700,684 A | 10/1987 | Pischinger et al. | |
| 4,722,315 A | 2/1988 | Pickel | |
| 4,765,287 A * | 8/1988 | Taylor | F01L 5/02 123/188.4 |
| 4,777,915 A | 10/1988 | Bonvallet | |
| 4,815,421 A | 3/1989 | Paul et al. | |
| 4,911,115 A | 3/1990 | Boyesen | |
| 4,976,227 A | 12/1990 | Draper | |
| 5,070,826 A | 12/1991 | Kawamura | |
| 5,074,259 A | 12/1991 | Pusic | |
| 5,076,221 A | 12/1991 | Kawamura | |
| 5,124,598 A | 6/1992 | Kawamura | |
| 5,203,830 A | 4/1993 | Faletti et al. | |
| 5,275,337 A | 1/1994 | Kolarik et al. | |
| 5,289,802 A | 3/1994 | Paquette et al. | |
| 5,329,897 A * | 7/1994 | Hemphill | F01L 7/08 123/190.14 |
| 5,333,582 A | 8/1994 | Kawamura | |
| 5,398,647 A | 3/1995 | Rivera | |
| 5,417,403 A | 5/1995 | Shurman et al. | |
| 5,454,357 A * | 10/1995 | Elder | F01L 7/00 123/184.55 |
| 5,515,818 A | 5/1996 | Born | |
| 5,542,385 A | 8/1996 | Kim | |
| 5,558,049 A | 9/1996 | Dubose | |
| 5,596,966 A | 1/1997 | Elder | |
| 5,603,292 A | 2/1997 | Hakansson | |
| 5,647,311 A | 7/1997 | Liang et al. | |
| 5,655,494 A | 8/1997 | Donaldson, Jr. | |
| 5,694,890 A | 12/1997 | Yazdi | |
| 5,740,769 A | 4/1998 | Mori | |
| 5,839,400 A | 11/1998 | Vattaneo et al. | |
| 5,878,707 A | 3/1999 | Ballard | |
| 5,967,108 A | 10/1999 | Kutlucinar | |
| 6,065,432 A | 5/2000 | Zakharov et al. | |
| 6,105,542 A | 8/2000 | Efford | |
| 6,205,850 B1 | 3/2001 | Wehrman et al. | |
| 6,222,294 B1 | 4/2001 | Stacy et al. | |
| 6,257,191 B1 | 7/2001 | Kutlucinar | |
| 6,340,010 B1 | 1/2002 | Hara et al. | |
| 6,382,193 B1 | 5/2002 | Boyer et al. | |
| 6,443,116 B1 | 9/2002 | Dahlborg | |
| 6,546,347 B2 | 4/2003 | Batchelor et al. | |
| 6,644,255 B1 | 11/2003 | Henry | |
| 6,666,197 B2 | 12/2003 | Bayer | |
| 6,672,270 B2 | 1/2004 | Armer | |
| 6,694,942 B1 | 2/2004 | Massmann et al. | |
| 6,763,790 B2 | 7/2004 | Watson et al. | |
| 6,827,067 B1 | 12/2004 | Yang et al. | |
| 6,957,635 B2 | 10/2005 | Katayana | |
| 6,968,819 B2 | 11/2005 | Fujii et al. | |
| 7,128,062 B2 | 10/2006 | Kuo et al. | |
| 7,159,556 B2 | 1/2007 | Yoshihara | |
| 7,249,597 B2 | 7/2007 | Muller et al. | |
| 7,263,963 B2 * | 9/2007 | Price | F01L 1/047 123/188.4 |
| 7,373,909 B2 | 5/2008 | Price | |
| 7,448,352 B2 | 11/2008 | Warren | |
| 7,448,354 B2 | 11/2008 | Price | |
| 7,461,619 B2 | 12/2008 | Price | |
| 7,874,271 B2 * | 1/2011 | Price | F01L 1/047 123/90.11 |
| 8,776,756 B2 * | 7/2014 | Cotton | F01L 5/00 123/188.5 |
| 10,309,266 B2 | 6/2019 | Price et al. | |
| 2001/0020693 A1 * | 9/2001 | Bischofberger | F01L 7/02 251/368 |
| 2002/0124822 A1 | 9/2002 | Cornell et al. | |
| 2003/0145838 A1 | 8/2003 | Leman et al. | |
| 2003/0196646 A1 | 10/2003 | Shoyama et al. | |
| 2004/0154597 A1 | 8/2004 | Kashima et al. | |
| 2005/0076890 A1 | 4/2005 | Seitz et al. | |
| 2005/0131618 A1 | 6/2005 | Megli et al. | |
| 2005/0205028 A1 | 9/2005 | Lewis et al. | |
| 2005/0268880 A1 | 12/2005 | Bidner et al. | |
| 2005/0274337 A1 | 12/2005 | Chang | |
| 2006/0118087 A1 | 6/2006 | Lewis et al. | |
| 2006/0130792 A1 | 6/2006 | Katou et al. | |
| 2007/0067988 A1 | 3/2007 | Price | |
| 2007/0068470 A1 | 3/2007 | Price | |
| 2007/0068471 A1 | 3/2007 | Price | |
| 2007/0068494 A1 | 3/2007 | Price | |
| 2008/0017161 A1 | 1/2008 | Price | |
| 2010/0077973 A1 * | 4/2010 | Price | F01L 1/20 123/90.11 |

FOREIGN PATENT DOCUMENTS

| | | |
|---|---|---|
| DE | 237263 | 8/1911 |
| DE | 648642 | 8/1937 |
| DE | 20 2006 011 290 | 11/2006 |
| EP | 0 287 522 | 10/1988 |
| EP | 1 188 916 | 3/2002 |
| GB | 2 419 636 | 5/2006 |
| JP | S51-116308 | 10/1976 |
| JP | S55-28731 | 2/1980 |
| JP | S57-18409 | 1/1982 |
| JP | S57-70906 | 5/1982 |
| JP | S58-128407 | 8/1983 |
| JP | S58-128408 | 8/1983 |
| JP | S58-128409 | 8/1983 |

(56) References Cited

FOREIGN PATENT DOCUMENTS

| | | |
|---|---|---|
| JP | 59-062773 | 4/1984 |
| JP | S59-74316 | 4/1984 |
| JP | S59-105007 | 6/1984 |
| JP | S60-47810 | 3/1985 |
| JP | S60-112610 | 6/1985 |
| JP | S60-157908 | 8/1985 |
| JP | S60-233304 | 11/1985 |
| JP | S60-233305 | 11/1985 |
| JP | S61-201806 | 9/1986 |
| JP | S62-298610 | 12/1987 |
| JP | S63-100209 | 5/1988 |
| JP | S64-8307 | 1/1989 |
| JP | H02-137503 | 5/1990 |
| JP | H02-241915 | 9/1990 |
| JP | H03-206309 | 9/1991 |
| JP | H04-259613 | 9/1992 |
| JP | H06-022505 | 1/1994 |
| JP | H06-288209 | 10/1994 |
| JP | H06-85971 | 11/1994 |
| JP | H07-29366 | 4/1995 |
| JP | H08-218828 | 8/1996 |
| JP | H09-324630 | 12/1997 |
| JP | H10-280921 | 10/1998 |
| WO | WO 01/29466 | 4/2001 |
| WO | WO 2011/129799 | 10/2011 |

OTHER PUBLICATIONS

BMW World—Technology, US Auto Parts® [online] [retrieved on Apr. 28, 2008] Retrieved from the Internet, URL: Hyperlink "http://www.usautoparts.net/bmw/technology/valvetronic.htm" http://www.usautoparts.net/bmw/technology/valvetronic.html, pp. 1-4.

Eugene P. Batzell, "Slide, Rotary and Piston Valves Versus Poppet Valves for Gas Engine Service," SAE Technical Paper 100016, 1910.

Extended European Search Report dated Nov. 12, 2012 for European Application No. 10746881.1, 9 pages.

International Search Report and Written Opinion for International Application No. PCT/US06/37274 dated Apr. 16, 2007, 7 pages.

International Search Report and Written Opinion for PCT/US2010/025520, dated Jun. 7, 2010, 9 pages.

International Search Report and Written Opinion for PCT/US2017/051016, dated Jan. 4, 2018.

M. Sellnau, et al., "2-Step Variable Valve Actuation: System Optimization and Integration on an SI Engine," 2006 SAE World Congress, Apr. 3-6, 2006, SAE Technical Paper Series 2006-01-0040.

Peter Kreuter, et al., "Variable Valve Action—Switchable and Continuously Variable Valve Lifts," SAE Technical Paper 2003-01-0026, SAE International, 2003.

Ralph L. Skinner, "The Development of the Skinner Slide Valve Engine," SAE Technical Paper 47-0178, presented at the SAE Annual Meeting, Jan. 6-10, 1947.

S. Hara, et al., "Application of a Variable Valve Event and Timing System to Automotive Engines," 2000 SAE World Congress, Mar. 6-9, 2000, SAE Technical Paper Series 2000-01-1224.

Seiichi Kai, "Development and Progress of the Exhaust-System Device for 2-Stroke Engines," Small Engine Technology Conference and Exposition, Sep. 28-30, 1999, SAE Technical Paper Series 1999-01-3332.

Examination Report dated Mar. 20, 2020 for corresponding European Application No. 17 849 741.8, 8 pages.

* cited by examiner

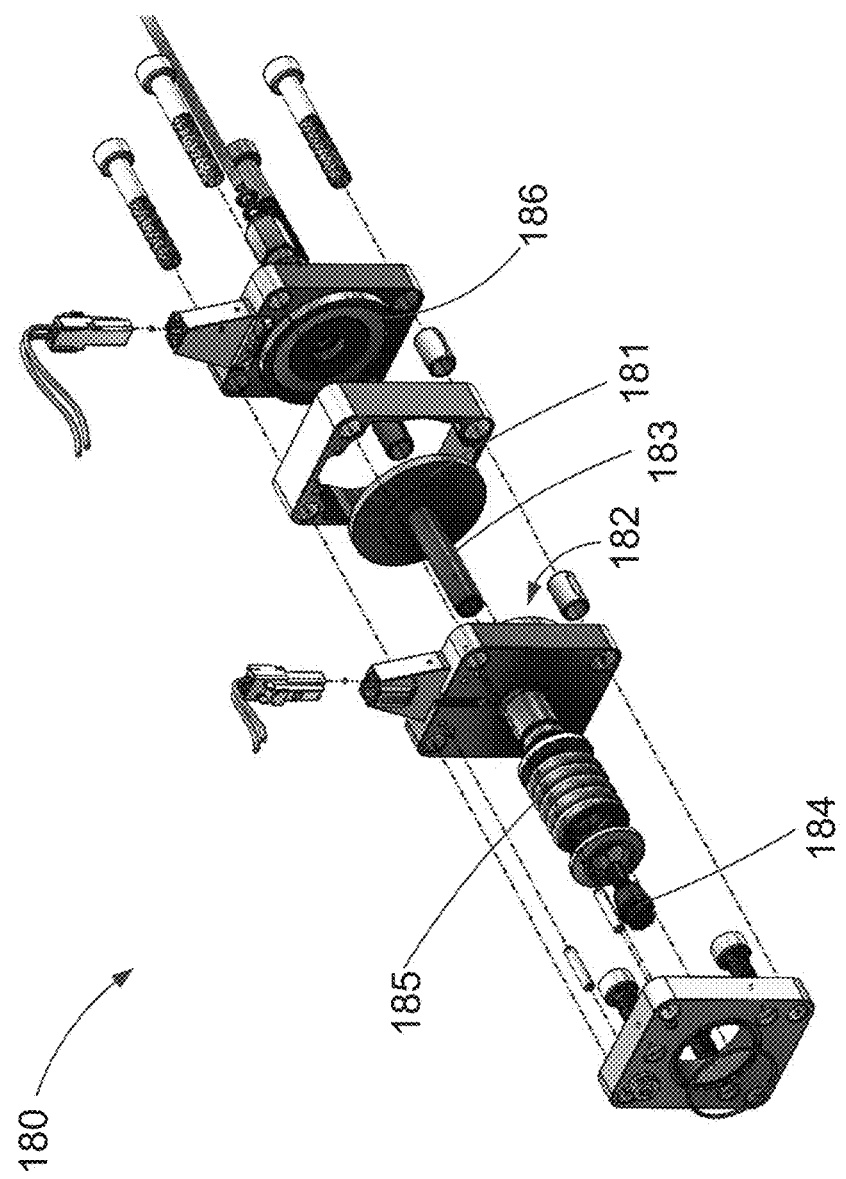

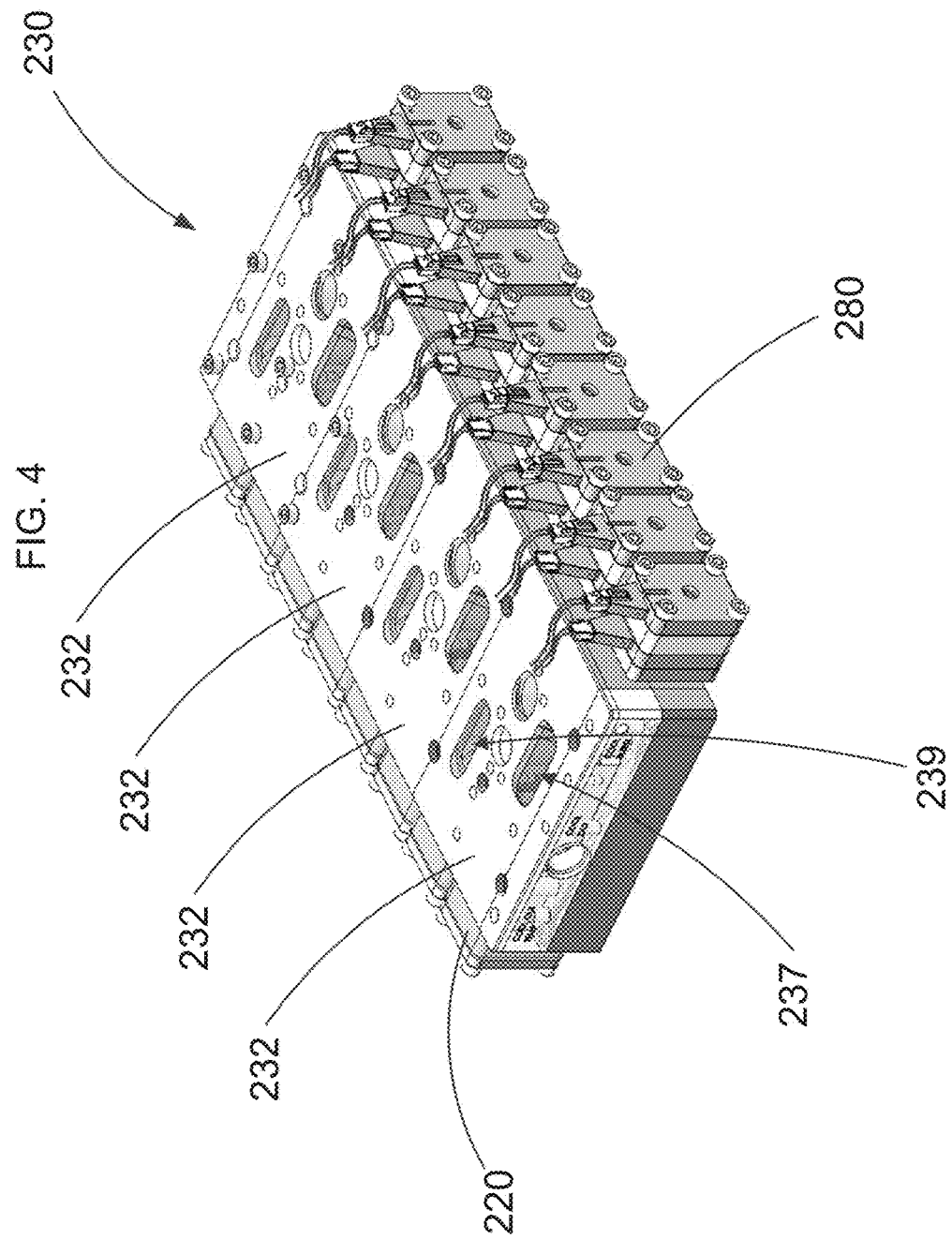

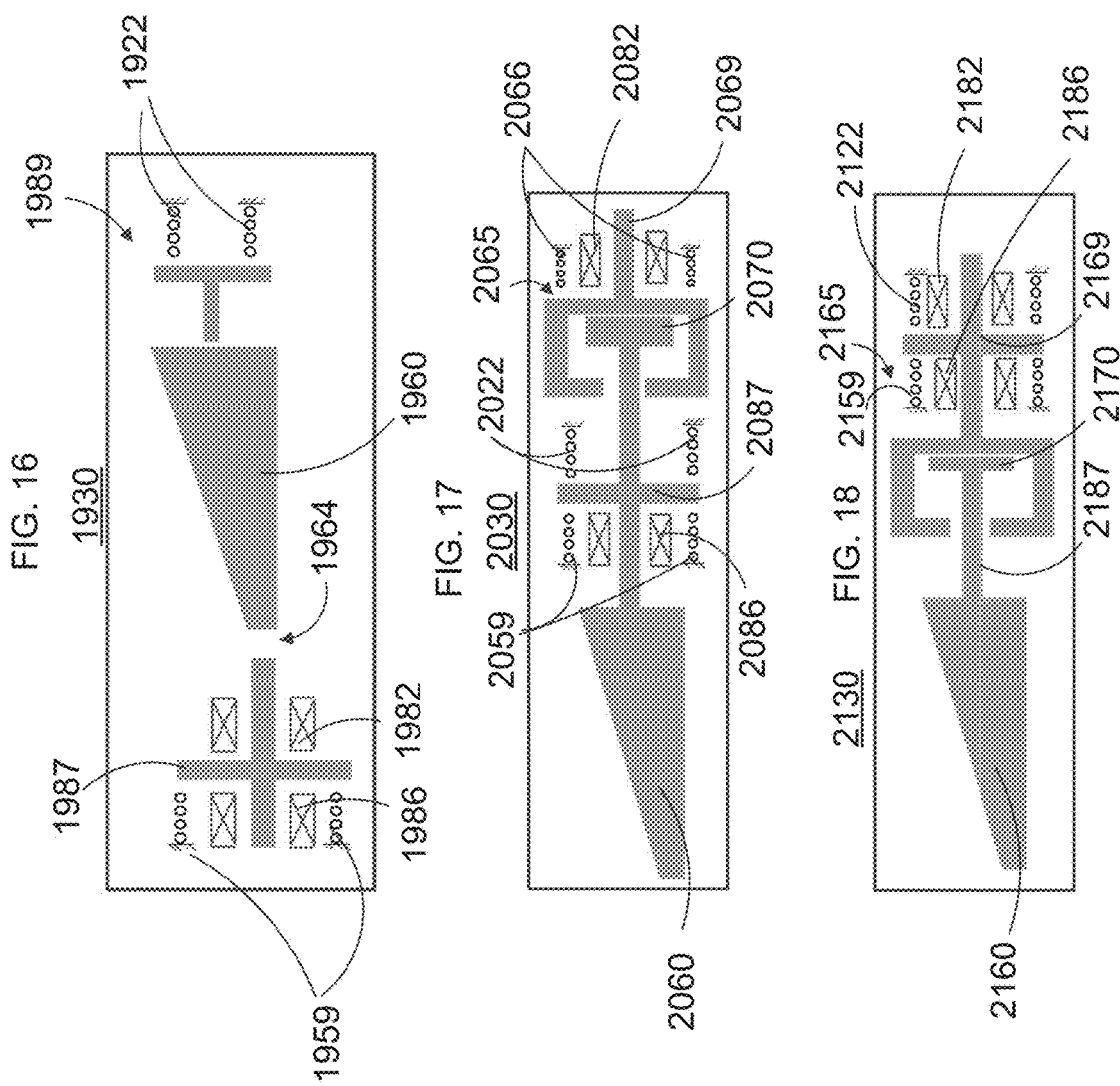

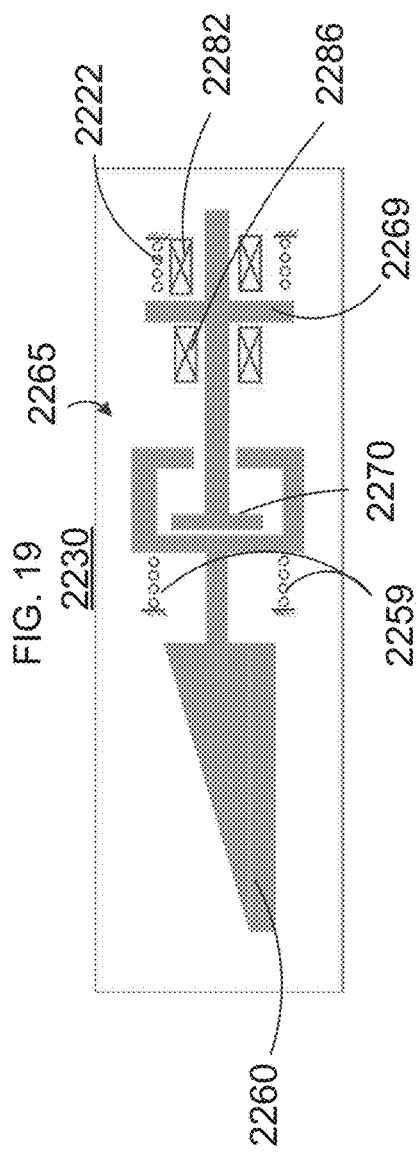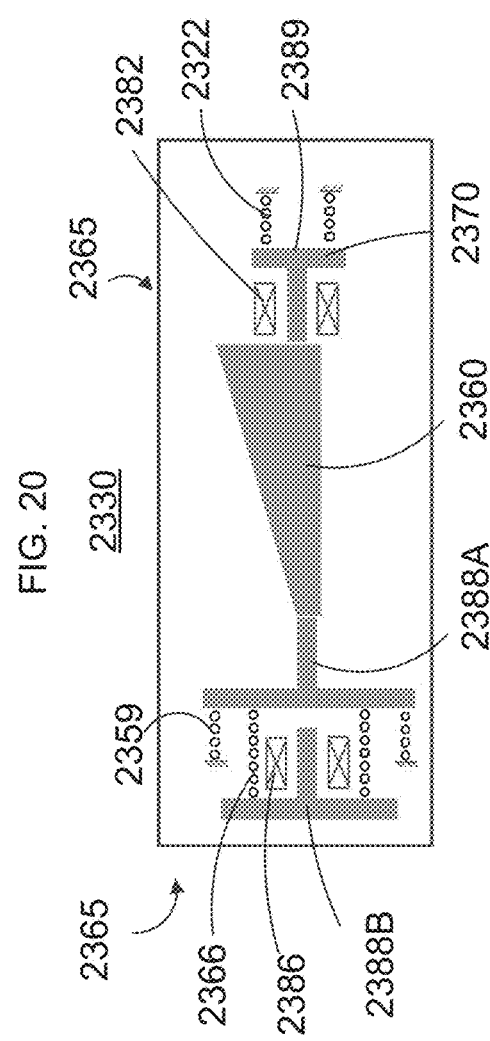

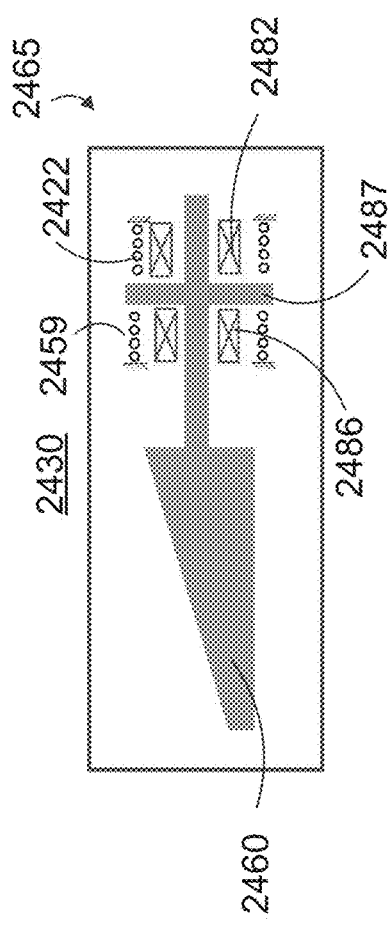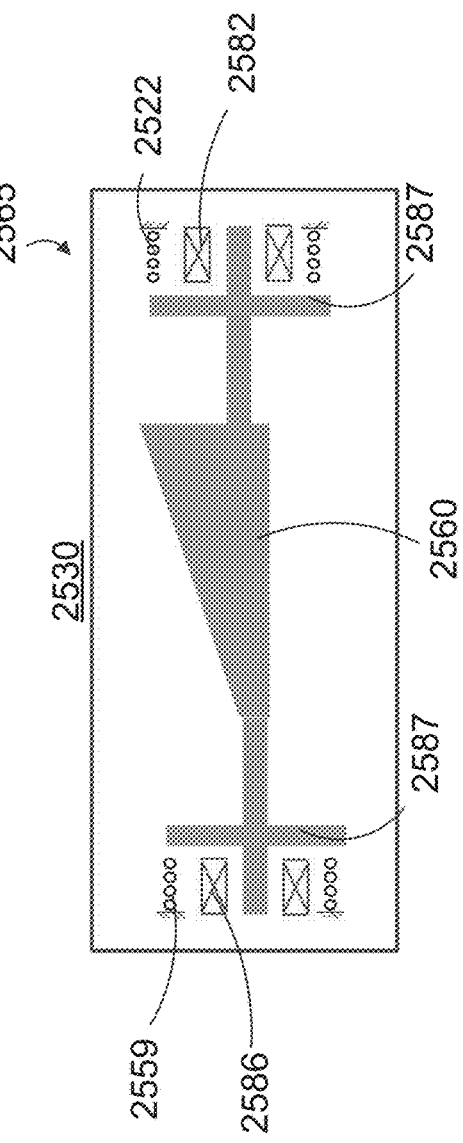

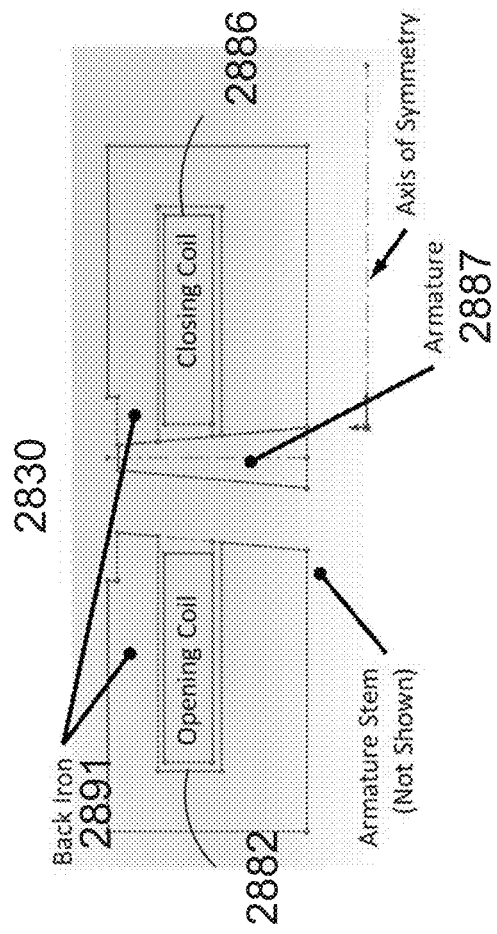

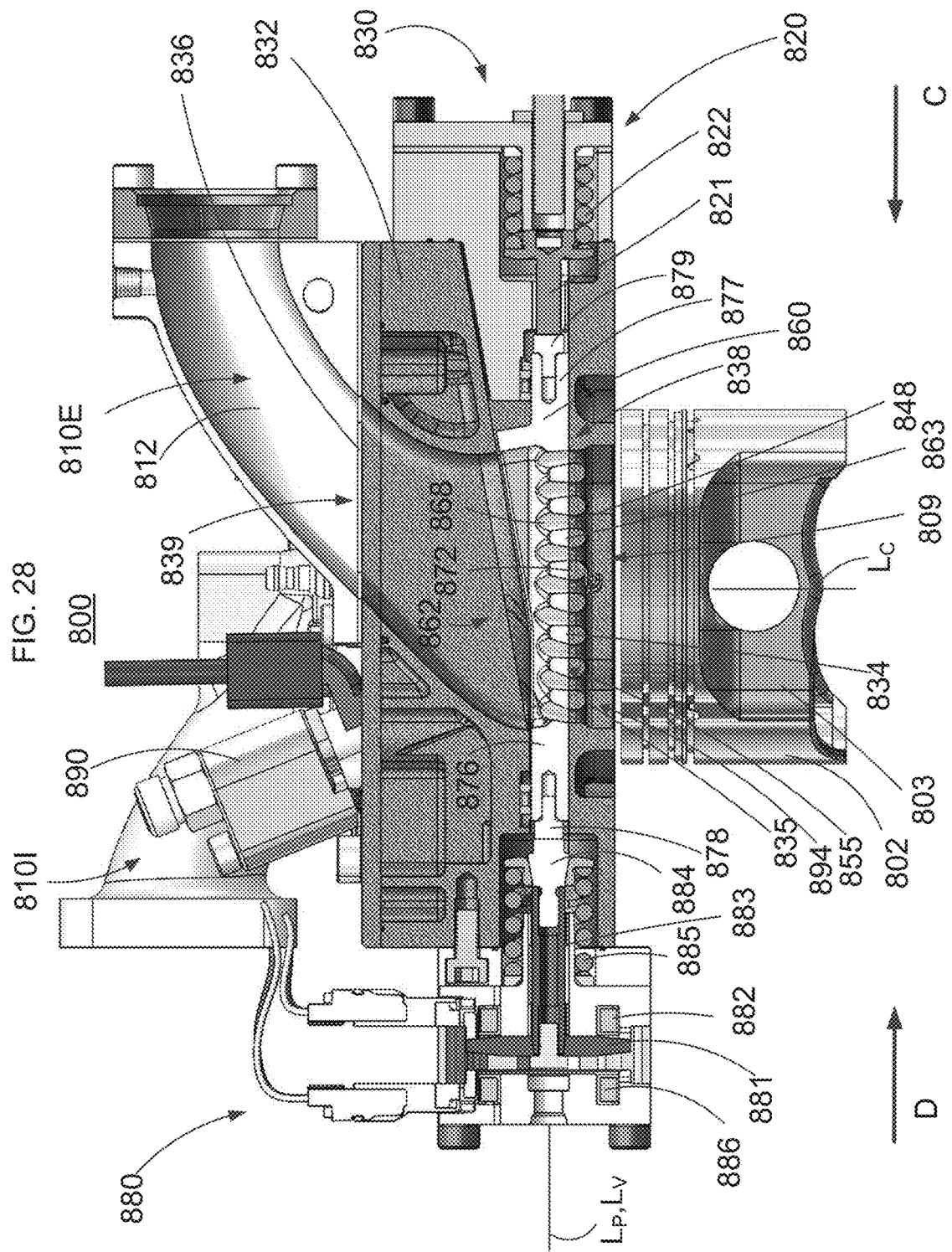

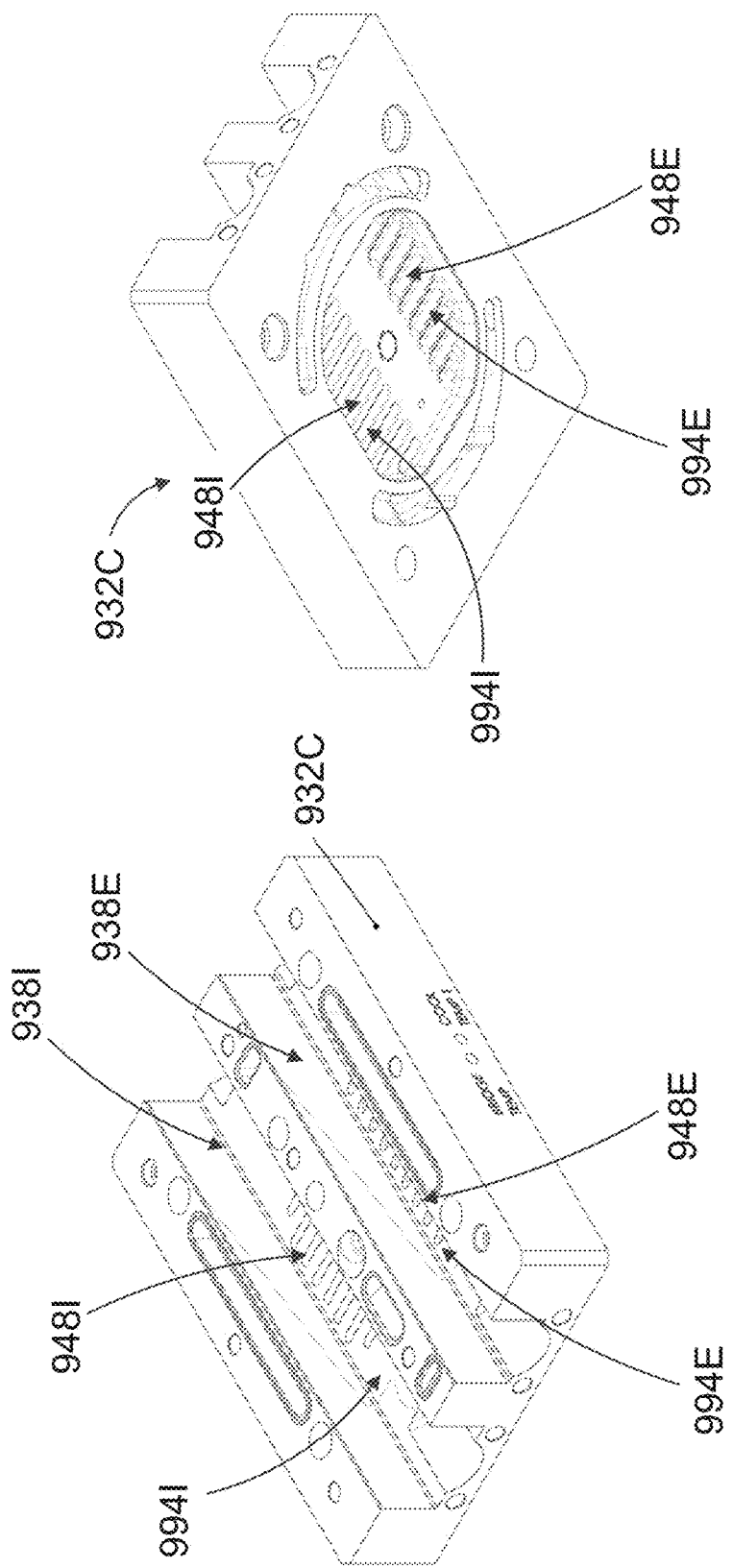

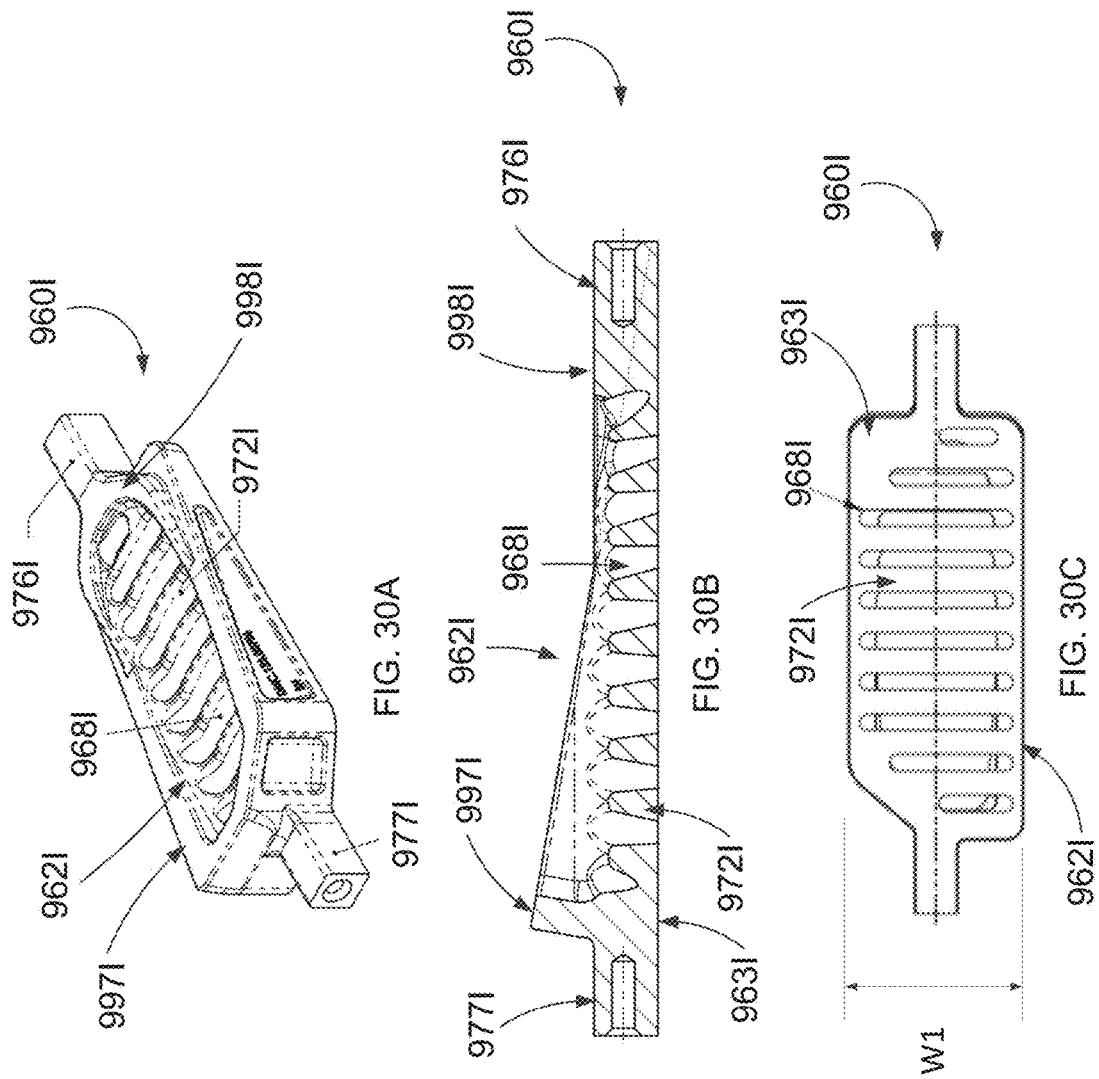

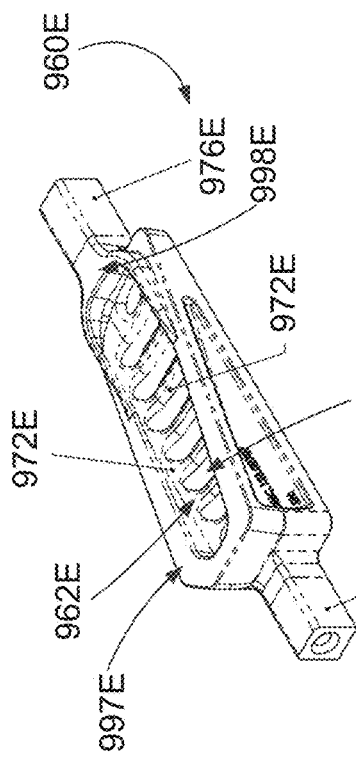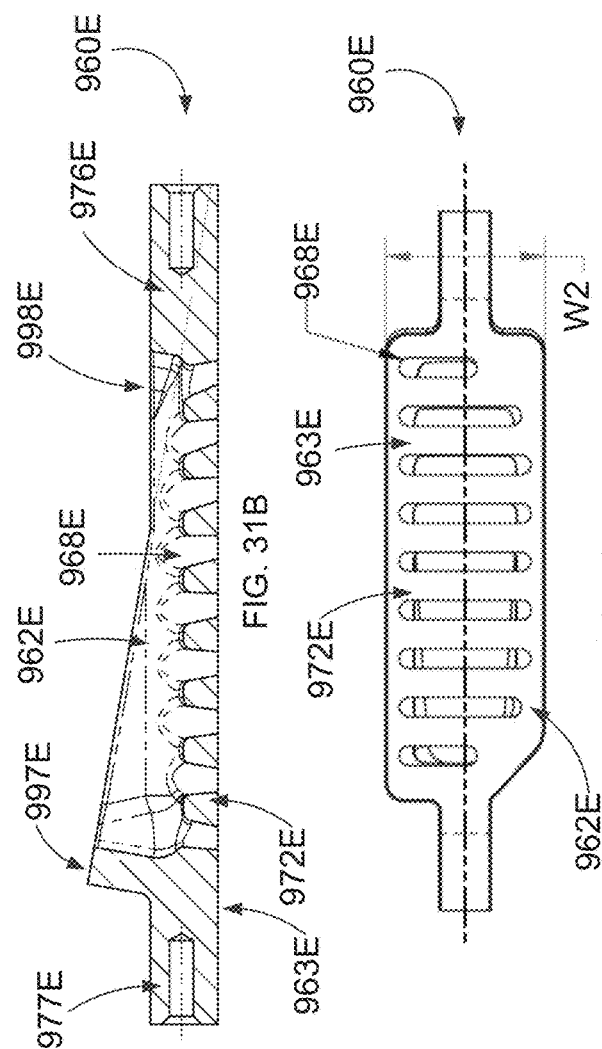
FIG. 31A
FIG. 31B
FIG. 31C

1600

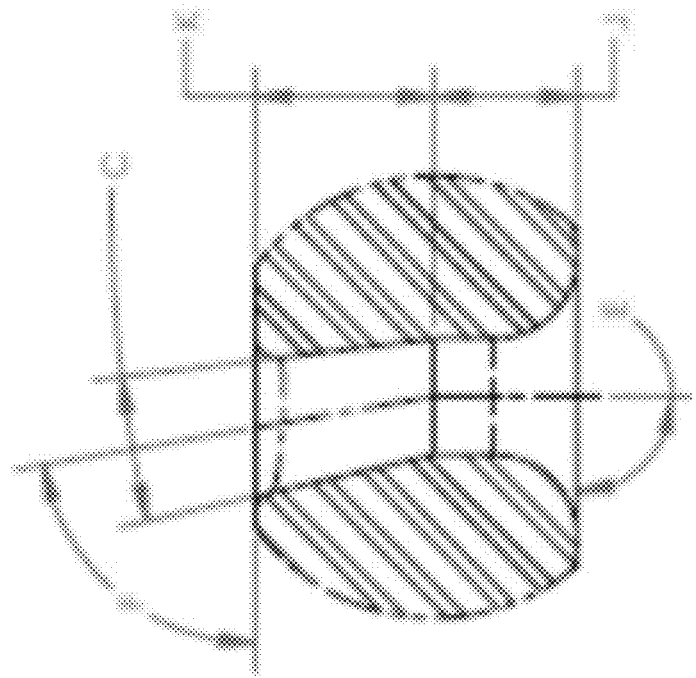
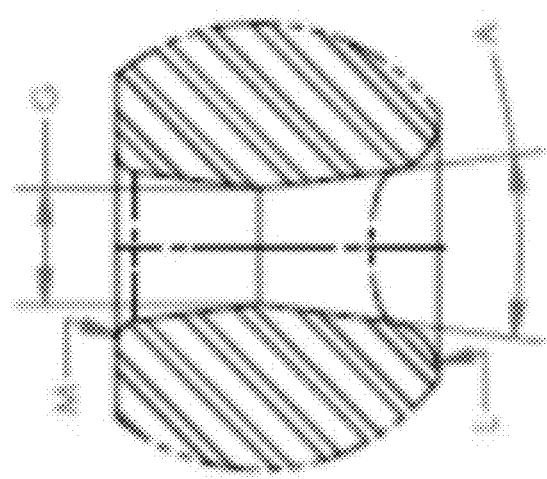
FIG. 44A
FIG. 44B

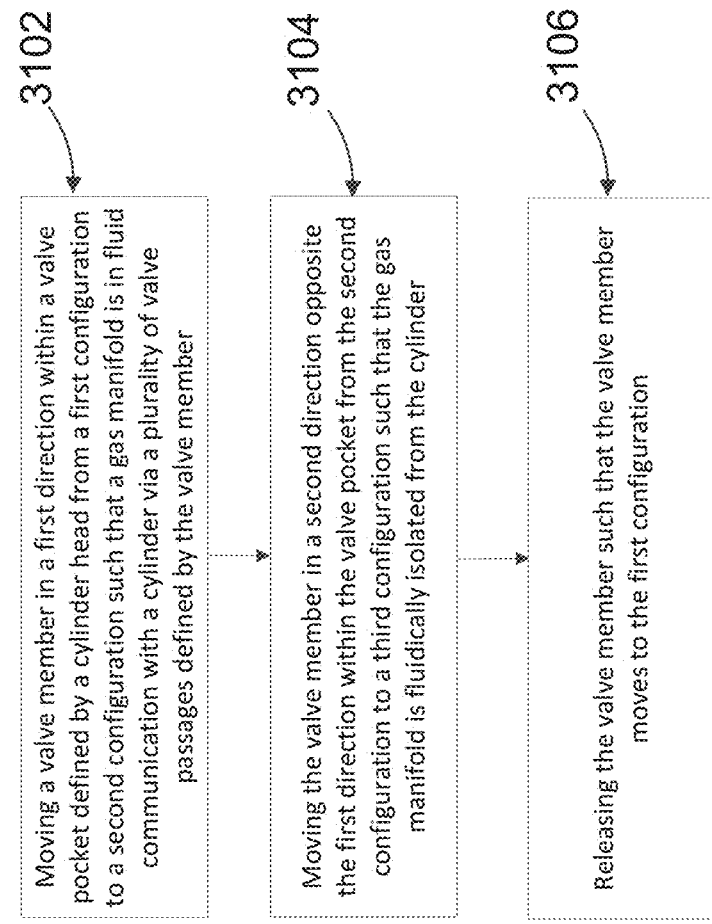

3202 — Applying a first current to a first electromagnetic coil of an actuation assembly such that an armature is drawn toward the first electromagnetic coil, the armature being coupled to a valve member such that the movement of the armature causes the valve member to move within a valve pocket defined by a cylinder head from a neutral configuration to an open configuration, the valve member defining a plurality of valve flow passages, a gas manifold being in fluidic communication with a cylinder via the plurality of valve flow passages in the open configuration 3204 — Ceasing the application of the first current to the first electromagnetic coil such that the valve member moves to the neutral configuration 3206 — Applying a second current to a second electromagnetic coil of an actuation assembly such that the valve member moves to a closed configuration, the gas manifold being fluidically isolated from the cylinder in the closed configuration

VARIABLE TRAVEL VALVE APPARATUS FOR AN INTERNAL COMBUSTION ENGINE

CROSS-REFERENCE TO RELATED APPLICATIONS

This application is a continuation of PCT Application No. PCT/US2017/051016, filed Sep. 11, 2017, entitled "Variable Travel Valve Apparatus for an Internal Combustion Engine," which claims priority to and the benefit of U.S. Provisional Application No. 62/385,804, filed Sep. 9, 2016, entitled "Variable Travel Valve Apparatus for an Internal Combustion Engine," the entire contents of each of which are hereby expressly incorporated by reference for all purposes.

BACKGROUND

The embodiments described herein relate to an apparatus for controlling gas exchange processes in a fluid processing machine, and more particularly to a valve and cylinder head assembly for an internal combustion engine.

Many fluid processing machines, such as, for example, internal combustion engines, compressors, and the like, require accurate and efficient gas exchange processes to ensure optimal performance. For example, during the intake stroke of an internal combustion engine, a predetermined amount of air and fuel must be supplied to the combustion chamber at a predetermined time in the operating cycle of the engine. The combustion chamber then must be sealed during the combustion event to prevent inefficient operation and/or damage to various components in the engine. During the exhaust stroke, the burned gases in the combustion chamber must be efficiently evacuated from the combustion chamber.

Some known internal combustion engines use poppet valves to control the flow of gas into and out of the combustion chamber. Known poppet valves are reciprocating valves that include an elongated stem and a broadened sealing head. In use, known poppet valves open inwardly towards the combustion chamber such that the sealing head is spaced apart from a valve seat, thereby creating a flow path into or out of the combustion chamber when the valve is in the opened position. The sealing head can include an angled surface configured to contact a corresponding surface on the valve seat when the valve is in the closed position to effectively seal the combustion chamber.

The enlarged sealing head of known poppet valves, however, obstructs the flow path of the gas coming into or leaving the combustion cylinder, which can result in inefficiencies in the gas exchange process. Moreover, the enlarged sealing head can also produce vortices and other undesirable turbulence within the incoming air, which can negatively impact the combustion event. To minimize such effects, some known poppet valves are configured to travel a relatively large distance between the closed position and the opened position. Increasing the valve lift, however, results in higher parasitic losses, greater wear on the valve train, greater chance of valve-to-piston contact during engine operation, and the like.

Because the sealing head of known poppet valves extends into the combustion chamber, they are exposed to the extreme pressures and temperatures of engine combustion, which increases the likelihood that the valves will fail or leak. Exposure to combustion conditions can cause, for example, greater thermal expansion, detrimental carbon deposit build-up and the like. Moreover, such an arrangement is not conducive to servicing and/or replacing valves. In many instances, for example, the cylinder head must be removed to service or replace the valves.

To reduce the likelihood of leakage, known poppet valves are biased in the closed position using relatively stiff springs. Thus, known poppet valves are often actuated using a camshaft to produce the high forces necessary to open the valve. Known camshaft-based actuation systems, however, have limited flexibility to change the valve travel (or lift), timing and/or duration of the valve event as a function of engine operating conditions. For example, although some known camshaft-based actuation systems can change the valve opening or duration, such changes are limited because the valve events are dependent on the rotational position of the camshaft and/or the engine crankshaft. Accordingly, the valve events (i.e., the timing, duration and/or travel) are not optimized for each engine operating condition (e.g., low idle, high speed, full load, etc.), but are rather selected as a compromise that provides the desired overall performance.

Some known poppet valves are actuated using electronic actuators or hydraulics. Solenoid-based actuation systems, however, often require multiple springs and/or solenoids to overcome the force of the biasing spring. Moreover, solenoid-based actuation systems require relatively high power to actuate the valves against the force of the biasing spring. Hydraulic-based systems require parts with very close tolerances and require a hydraulic power supply.

Thus, a need exists for an improved valve actuation system for an internal combustion engine and like systems and devices.

SUMMARY

Gas exchange valves and methods are described herein. In some embodiments, an apparatus includes a valve and an actuator. The valve has a portion movably disposed within a valve pocket defined by a cylinder head of an engine. The valve is configured to move relative to the cylinder head a distance between an equilibrium position, a closed position and an opened position. The portion of the valve defines a flow opening that is in fluid communication with a cylinder of an engine when the valve is in the opened position. The actuator is configured to selectively vary the distance between the closed position and the opened position.

BRIEF DESCRIPTION OF THE DRAWINGS

FIG. 3 is an exploded view solenoid assembly in FIG. 5.

FIG. 4 is a perspective view of a cylinder head assembly, according to an embodiment.

FIG. 16 is a schematic illustration of a valve system, according to an embodiment.

FIG. 17 is a schematic illustration of a valve system, according to an embodiment.

FIG. 18 is a schematic illustration of a valve system, according to an embodiment.

FIG. 19 is a schematic illustration of a valve system, according to an embodiment.

FIG. 20 is a schematic illustration of a valve system, according to an embodiment.

FIG. 21 is a schematic illustration of a valve system, according to an embodiment.

FIG. 22 is a schematic illustration of a valve system, according to an embodiment.

FIG. 25 is a schematic illustration of a valve actuator, according to an embodiment.

FIG. 28 is a cross-sectional view of a portion of an engine including a cylinder head assembly, according to an embodiment.

FIGS. 29C and 29D are a top perspective view and a bottom perspective view, respectively, of a bottom layer of the cylinder head of FIG. 29A.

FIGS. 30A-30C are various views of an intake valve member, according to an embodiment.

FIGS. 31A-31C are various views of an intake valve member, according to an embodiment.

FIG. 44A is a cross-sectional illustration of a flow passage, according to an embodiment.

FIG. 44B is a cross-sectional illustration of a flow passage, according to an embodiment.

FIG. 45 is a method of operating a cylinder head assembly, according to an embodiment.

FIG. 46 is a method of operating a cylinder head assembly, according to an embodiment.

DETAILED DESCRIPTION

Figure 1:
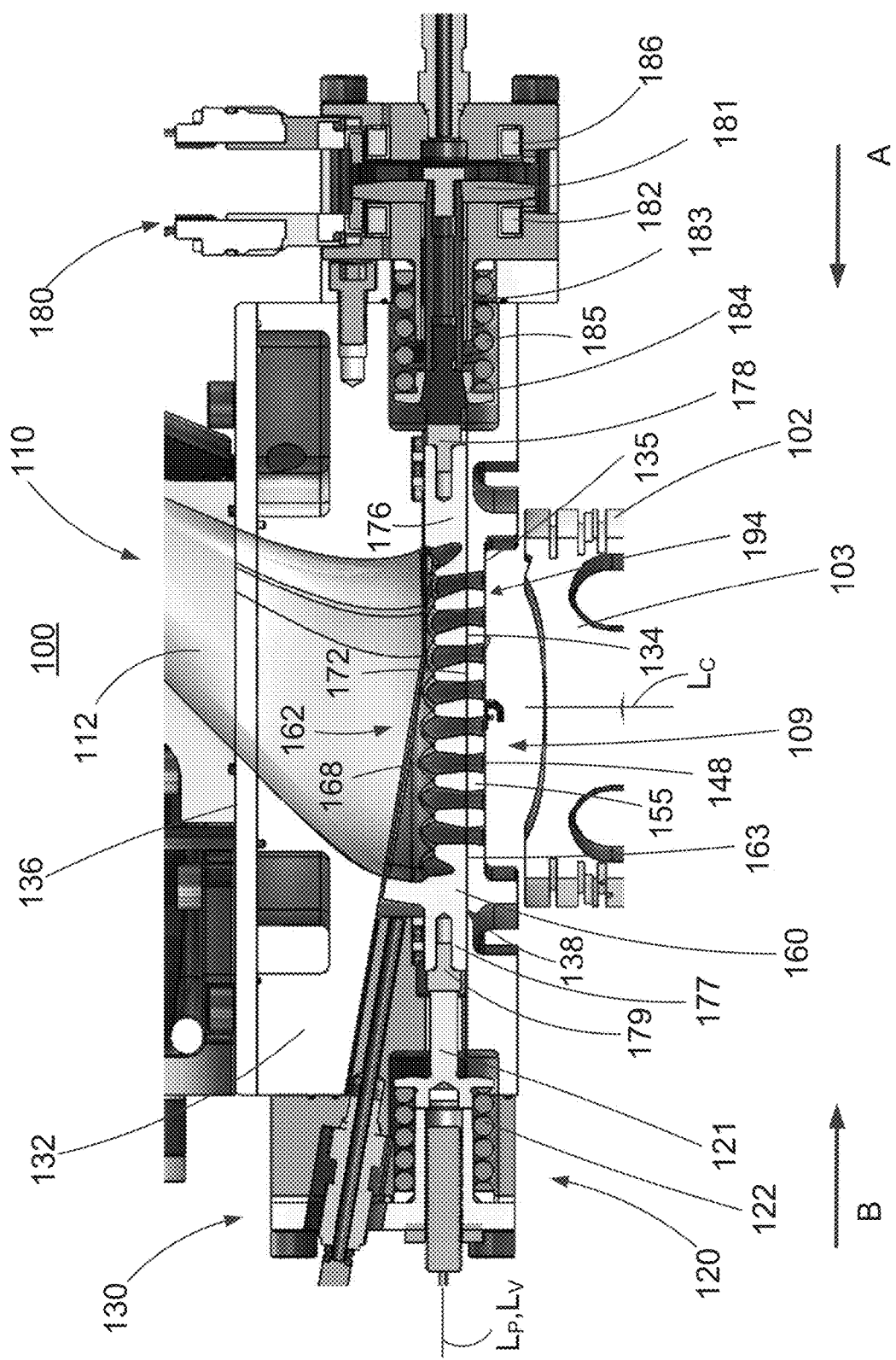
FIG. 1 is a cross-sectional view of a portion of an engine including a cylinder head assembly according to an embodiment.

In some embodiments, an apparatus includes a valve and an actuator. The valve has a portion movably disposed within a valve pocket defined by a cylinder head of an engine. The valve is configured to move relative to the cylinder head a distance between an equilibrium position, a closed position and an opened position. The portion of the valve defines a flow opening that is in fluid communication with a cylinder of an engine when the valve is in the opened position. The actuator is configured to selectively vary the distance between the closed position and the opened position.

In some embodiments, an apparatus includes a cylinder head and a valve member. The cylinder head can have an interior surface defining a valve pocket. The cylinder head can be configured to be coupled to a cylinder and a gas manifold. The valve member can have a portion defining a plurality of valve flow passages. The valve member can be configured to be disposable within the valve pocket such that the valve member is movable within the valve pocket along a longitudinal axis of the valve member. The apparatus can have a first configuration, a second configuration, and a third configuration. In the first configuration, each valve flow passage from the plurality of valve flow passages can be in fluid communication with the cylinder and the gas manifold. In the second configuration, each valve flow passage from the plurality of valve flow passages can be fluidically isolated from the cylinder. In the third configuration, the valve member can be disposed in a position different from the first configuration and the second configuration. The valve member can be biased toward the third configuration.

In some embodiments, an apparatus includes a cylinder head and a valve member. The cylinder head can have an interior surface defining a valve pocket. The cylinder head can be configured to be coupled to a cylinder and a gas manifold. A portion of the valve pocket can including sealing portions which define a plurality of cylinder flow passages. The valve member can have a portion defining a plurality of valve flow passages, the valve member configured to be disposable within the valve pocket such that the valve member is movable within the valve pocket along a longitudinal axis of the valve member. The apparatus can have a first configuration, a second configuration, and a third configuration. In the first configuration, each valve flow passage from the plurality of valve flow passages can be in fluid communication with the cylinder and the gas manifold, the plurality of valve flow passages in fluid communication with the cylinder via the plurality of cylinder flow passages. In the second configuration, each valve flow passage from the plurality of valve flow passages can be fluidically isolated from the cylinder via the sealing portions of the valve pocket. In the third configuration, an opening to each of the plurality of valve flow passages is at least partially obstructed by the sealing portions of the valve pocket such that each valve flow passage from the plurality of valve flow passages is in fluid communication with the cylinder and the gas manifold. The valve member can be biased toward the third configuration.

In some embodiments, a method includes moving a valve member in a first direction within a valve pocket defined by a cylinder head from a first configuration to a second configuration such that a gas manifold is in fluid communication with a cylinder via a plurality of valve passages defined by the valve member. Next, the valve member can be moved in a second direction opposite the first direction within the valve pocket from the second configuration to a third configuration such that the gas manifold is fluidically isolated from the cylinder. The valve member can be released such that the valve member moves to the first configuration.

In some embodiments, a method includes applying a first current to a first electromagnetic coil of an actuation assembly such that an armature is drawn toward the first electromagnetic coil. The armature can be coupled to a valve member such that the movement of the armature causes the valve member to move within a valve pocket defined by a cylinder head from a neutral configuration to an open configuration. The valve member can define a plurality of valve flow passages. A gas manifold can be in fluidic communication with a cylinder via the plurality of valve flow passages in the open configuration. The application of the first current to the first electromagnetic coil can be ceased such that the valve member moves to the neutral configuration. A second current can then be applied to a second electromagnetic coil of an actuation assembly such that the valve member moves to a closed configuration, the gas manifold being fluidically isolated from the cylinder in the closed configuration.

FIG. 1 is a cross-sectional front view of a portion of an engine 100 including a cylinder head assembly capable of performing fully variable valve actuation, according to an embodiment. The engine 100 includes an engine block 102 and a cylinder head assembly 130 coupled to the engine block 102. The engine block 102 defines or includes a cylinder 103 having a longitudinal axis Lc. A piston (not shown) can be disposed within the cylinder 103 such that it can reciprocate along the longitudinal axis Lc of the cylinder 103. The piston can be coupled by a connecting rod (not shown) to a crankshaft (not shown) having an offset throw (not shown) such that as the piston reciprocates within the cylinder 103, the crankshaft is rotated about its longitudinal axis (not shown). In this manner, the reciprocating motion of the piston can be converted into a rotational motion.

A first surface 135 of the cylinder head assembly 130 can be coupled to the engine block 102 such that a portion of the first surface 135 covers the upper portion of the cylinder 103 thereby forming a combustion chamber 109. Although the portion of the first surface 135 covering the cylinder 103 is shown as being flat (and, in some embodiments, lies parallel to the top surface of a piston within the combustion chamber 109), in some embodiments, because the cylinder head assembly 130 does not include valves that protrude into the combustion chamber, the surface of the cylinder head assembly forming part of the combustion chamber can have any suitable geometric design. For example, in some embodiments, the surface of the cylinder head assembly forming part of the combustion chamber can be curved and angularly offset from the top surface of the piston. In other embodiments, the surface of the cylinder head assembly forming part of the combustion chamber can be curved to form a hemispherical combustion chamber, a pent-roof combustion chamber or the like.

A gas manifold 110 defining an interior area or port 112 is coupled to a second surface 136 of the cylinder head assembly 130 such that the interior area 112 of the gas manifold 110 is in fluid communication with a valve pocket 138 via an opening in the second surface 136. As described in detail herein, this arrangement allows a gas, such as, for example air or combustion by-products, to be transported into or out of the cylinder 103 via the cylinder head assembly 130 and the gas manifold 110. Although shown as including a single gas manifold 110, in some embodiments, an engine can include two or more gas manifolds. For example, in some embodiments an engine can include an intake manifold configured to supply air and/or an air-fuel mixture to the cylinder head and an exhaust manifold configured to transport exhaust gases away from the cylinder head.

Moreover, as shown, in some embodiments the first surface 135 of the cylinder head assembly 130 can be opposite the second surface 136. In some embodiments, the cylinder head assembly 130 is arranged such that the flow of gas into and/or out of the cylinder 103 can occur along a substantially straight line. In such an arrangement, a fuel injector (not shown) can be disposed in an intake manifold (not shown) directly above cylinder flow passages 148 (described below). In this manner, the injected fuel can be conveyed into the cylinder 103 without being subjected to a series of bends. Eliminating bends along the fuel path can reduce fuel impingement and/or wall wetting, thereby leading to more efficient engine performance, such as, for example, improved transient response.

The cylinder head assembly 130 includes a cylinder head 132 and a valve member 160. The cylinder head 132 includes a cylinder bridge portion 194 (also referred to as a cylinder bridge). The cylinder bridge 194 of the cylinder head 132 has an interior surface 134 that defines the bottom of a valve pocket 138 having a longitudinal axis Lp. The cylinder bridge 194 also includes a bottom surface that can define the top of the combustion chamber 109. For example, as shown in FIG. 1, the bottom surface of the cylinder bridge is the same surface as first surface 135. The cylinder bridge 194 also defines eight cylinder flow passages 148. Each of the cylinder flow passages 148 is adjacent the first surface 135 of the cylinder head 132 and is in fluid communication with the cylinder 103. Additionally, each of the cylinder flow passages 148 can be in fluid communication with the valve pocket 138 in a condition where the cylinder flow passages 148 are not obstructed by the valve member 160. The cylinder bridge 194 also includes a number of sealing portions 155 which can define the cylinder flow passages 148.

Figure 2:
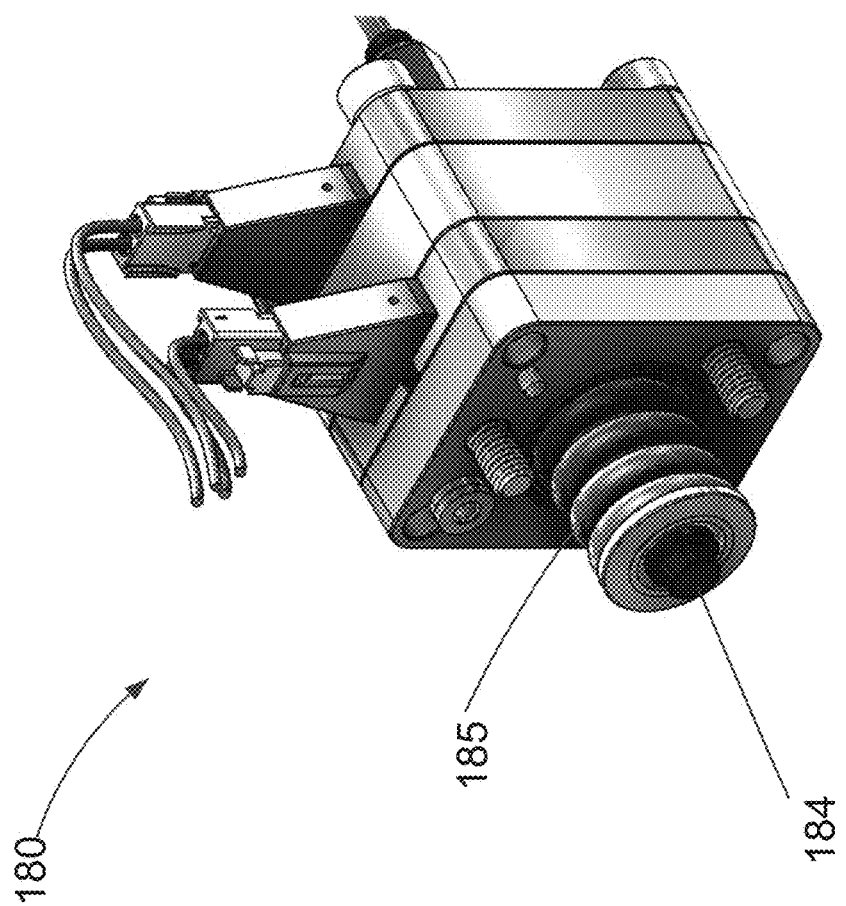
FIG. 2 is a perspective view of a solenoid assembly associated with the cylinder head assembly illustrated in FIG. 1.

The valve member 160 has a flow passage portion 162 (also referred to as a valve bridge or valve bridge portion), a first stem portion 176, and a second stem portion 177. The valve member 160 can have a tapered shape (e.g., a partially tapered outer wall portion), as shown in FIG. 1. The first stem portion 176 is coupled to an end of the flow passage portion 162 of the valve member 160 and is configured to engage a first plug 178. The first plug 178 is configured to engage with an actuator assembly 180 (also referred to herein as a solenoid assembly) (shown in perspective view in FIG. 2 and in exploded view in FIG. 3). The second stem portion 177 is coupled to an end of the flow passage portion 162 opposite from the first stem portion 176 and is configured to engage a second plug 179. The second plug 179 is configured to engage with a spring assembly 120 (also referred to herein as a return assembly).

The solenoid assembly 180 includes an armature 181, a connecting rod 183, a force application member 184, and a spring 185. The solenoid assembly 180 also includes an electromagnetic open coil 182 and an electromagnetic close coil 186. The force application member 184 is configured to engage with the first plug 178 such that a force applied to the first plug 178 can cause movement of the valve member 160. The engagement between the force application member 184 and the first plug 178 can be abutting contact. Said another way, the force application member 184 and the first plug 178 can include no articulated joint or interlocking features. In other embodiments, the engagement between the force application member 184 and the first plug 178 and/or the valve member 160 can include interlocking features.

The spring assembly 120 includes a spring 122 and a spring force application member 121. The spring 122 can be configured to elastically deform and be biased toward an expanded configuration. The spring force application member 121 can be formed of an inelastic, stiff material. For example, the spring force application member 121 can be formed of steel and/or titanium. The spring force application member 121 is configured to engage with the second plug 179 such that a force applied to the second plug 179 by the spring assembly 120 (e.g., due to being biased toward an expanded configuration) can cause movement of the valve member 160. The engagement between the spring force application member 121 and the second plug 179 can be abutting contact. Said another way, the spring force application member 121 and the second plug 179 can include no articulated joint or interlocking features. In other embodiments, the engagement between the spring force application member 121 and the second plug 179 and/or the valve member 160 can include interlocking features.

The flow passage portion 162 of the valve member 160 defines eight flow passages 168 therethrough. The flow passage portion 162 includes a number of sealing portions 172, each of which is disposed adjacent one of the flow passages 168 and disposed on and/or includes a bottom surface 163 of the flow passage portion 162. In some embodiments, the sealing portions 172 define the openings to the flow passages 168 on the bottom surface 163 of the flow passage portion 162. The valve member 160 is disposed within the valve pocket 138 such that the flow passage portion 162 of the valve member 160 can be moved along a longitudinal axis Lv of the valve member 160 within the valve pocket 138. For example, the solenoid assembly 180 can be configured to apply a force to the first plug 178 such that the valve member 160 shifts in the direction of arrow A. Similarly, the solenoid assembly 180 can be configured to apply a second force to the force application member 184 such that the force application member shifts in the direction of arrow B, causing the valve member 160 to also shift in the direction of arrow B under the force of the spring assembly 120. Said another way, the spring assembly 120 can be configured to apply a force to the second plug 179 such that the valve member 160 shifts in the direction of arrow B. In some embodiments, the solenoid assembly 180 can be engaged with the valve member via an interlocking element, rather than just being disposed in abutting contact, such that the solenoid assembly 180 is configured to apply a second force to the first plug 178 such that the valve member 160 shifts in the direction of arrow B.

The spring 122 and the spring 185 can both be biased toward the valve member 160 (i.e., the spring 122 and the spring 185 are both center-biased). Thus, in a configuration in which no current is applied to the armature 181 of the solenoid assembly 180 (i.e., no current is applied to the open coil 182 or the close coil 186), the spring forces applied to the valve member 160 by the spring 185 and the spring 122 will cause the valve member 160 to be center-biased in a neutral position such that the valve member 160 is disposed in a centered or substantially centered position relative to the cylinder head 132 and the valve member 160 is partially open. In other words, the flow passages 168 can be partially aligned with the flow passages 148 such that at least a portion of the cylinder-side opening to each flow passage 168 is in fluid communication with a flow passage 148 and a portion of the cylinder-side opening to each flow passage 168 is obstructed, blocked, or closed by a sealing portion 155. In some embodiments, the spring 122 and the spring 185 can be biased toward the valve member 160 such that in the absence of a current applied to the coils 182, 186 of the solenoid assembly 180, the valve member 160 is disposed halfway between the location of the valve member 160 in an open position (e.g., the position of the valve member 160 when a current is applied to the open coil 182) and the location of the valve member 160 in a closed position (e.g., the position of the valve member 160 when a current is applied to the close coil 186).

In some embodiments, the spring 122 and the spring 185 can be biased toward the valve member 160 such that in the absence of a current applied to the coils 182, 186 of the solenoid assembly 180, the valve member 160 is disposed partway along the translation path between the location of the valve member 160 in an open position (e.g., the position of the valve member 160 when a current is applied to the open coil 182) and the location of the valve member 160 in a closed position (e.g., the position of the valve member 160 when a current is applied to the close coil 186). In some embodiments, the valve member 160 can be positioned closer to the open position, closer to the closed position, or at the midway point. In some embodiments, one or more flow passages 168 of the valve member 160 can be partially obstructed by a sealing portion 172 of the flow passage portion 162. In some embodiments, the offset in central axes between the flow passages 168 and the sealing portions 172 when the valve member 160 is in the neutral position can result in the openings of the flow passages 168 in the bottom surface 163 of the flow passage portion 162 being about 50% obstructed, more than 50% obstructed, or less than 50% obstructed.

As shown in the configuration of FIG. 1, when the solenoid assembly 180 is actuated such that current is delivered to the open coil 182, the armature 181 can be configured to shift toward the open coil 182, allowing the connecting rod 183 and the force application member 184 to move into force-applying contact with the first plug 178 as a result of the force from spring 185. Thus, the valve member 160 can be pushed by the force application member 184 in the direction of arrow A against the force applied by spring 122 such that the flow passages 168 are in alignment with the flow passages 148 (as shown by the configuration illustrated in FIG. 1). When the flow passages 168 are in alignment with the flow passages 148, each of the flow passages 168 can be in fluid communication with one of the cylinder flow passages 148. In this manner, the gas manifold 110 is in fluid communication with the cylinder 103 via the flow passages 168, 148. When the current is removed from the open coil 182, a return force applied by the spring 122 in combination with the spring force application member 121 can push the valve member 160 in the direction of arrow B such that the valve member 160 returns to the equilibrium position.

When the solenoid assembly 180 is actuated such that current is delivered to the close coil 186, the armature 181 can be configured to shift toward the close coil 186, moving the connecting rod 183 and the force application member 184 in the direction of arrow B against the force of spring 185 and reducing the force applied on the first plug 178 by the force application member 184. Due to the reduced force applied on the first plug 178 by the force application member 184, the valve member 160 can be pushed by the spring assembly 120 in the direction of arrow B such that the flow passages 168 are out of alignment with the flow passages 148. In other words, the valve member 160 can be disposed such that the flow passages 168 are sealed from the combustion chamber 109 by the sealing portions 172. Moreover, when each flow passage 168 is offset from the corresponding cylinder flow passage 148, each flow passage 168 is fluidically isolated from the cylinder flow passages 148. In this manner, the cylinder 103 is fluidically isolated from the gas manifold 110. When the current is removed from the close coil 186, a return force applied by the spring 185 in combination with the force application member 184 can push the valve member 160 in the direction of arrow A against the force of the spring assembly 120 such that the valve member 160 returns to the equilibrium position. In some embodiments, rather than the valve member 160 being moved to the fully closed position in the direction of arrow B via the force of the spring 122 being stronger than the force of the spring 185, the solenoid assembly 180 can be coupled to the valve member 160 such that the movement of the armature 181 can pull the valve member 160 against the force of the spring 185 and into the closed or partially closed position.

In some embodiments, the solenoid assembly 180 can be actuated to apply a "boost pulse" to the valve member 160. For example, a current can be delivered to one of the open coil 182 or the close coil 186 to assist movement of the valve (e.g., to overcome friction forces). In some embodiments, the solenoid assembly 180 can be actuated to apply sufficient current to the open coil 182 and/or the close coil 186 to precisely control the location of the armature 181 between the open coil 182 and the close coil 186 such that the position of the valve member 160 is precisely controlled relative to the cylinder bridge 194. Thus, in some embodiments, the valve member 160 can be positioned by the cylinder head assembly 130 at an infinite number of positions relative to the cylinder bridge 194 corresponding to an infinite number of flow areas and volumetric flow rates through the valve member 160.

In some embodiments, the force needed for movement (e.g., reciprocating or translating) of the valve member 160 can be provided substantially by the spring 122 and/or the spring 185, with the solenoid assembly 180 applying only boost pulses to the force application member 184 when needed to maintain the movement of the valve member 160 as desired. The boost pulses can be used to accelerate or decelerate the valve member 160. In some embodiments, the solenoid assembly 180 can be actuated to hold the valve member 160 in a particular position (e.g., open, close, or partially open) relative to the cylinder bridge 194 for a desired period of time. In some embodiments, when the solenoid assembly 180 ceases applying current to the coils 182 and 186, the valve member 180 can be configured to be reciprocated or oscillated by the springs 120 and 185 (due to springs 120 and 185 being biased toward an expanded configuration) until the valve member 180 has returned to a natural center-biased position between the return assembly 120 and the actuator assembly 180. For example, each of the springs 120 and 185 can act both as an actuator and a damper as the valve member 180 returns to its natural state between spring 120 and spring 185.

Although the longitudinal axis Lc of the cylinder 103 is shown as being substantially normal to the longitudinal axis Lp of the valve pocket 138 and the longitudinal axis Lv of the valve member 160, in some embodiments, the longitudinal axis of the cylinder can be offset from the longitudinal axis of the valve pocket and/or the longitudinal axis of the valve member by an angle other than 90 degrees.

Although the flow passages 168 and the cylinder flow passages 148 are shown as having particular shapes in FIG. 1, the flow passages 168 and the cylinder flow passages 148 can have any suitable shape. FIG. 1 shows the flow passages 168 having rounded tops. When aligned as in FIG. 1, the flow passages 168 and the cylinder flow passages 148 can have a combined converging/diverging shape. In some embodiments, when the valve member 160 is in the open configuration, at least one of the valve flow passages 168 can converge toward a corresponding cylinder flow passage 148, and the corresponding cylinder flow passage 148 can converge toward at least one of the valve flow passages 168. In some embodiments, at least one of the valve flow passages 168 and the cylinder flow passages have a central axis angled at a non-zero angle relative to the central axis Lc of the cylinder head 132. In some embodiments, the flow passages 168 and/or the cylinder flow passages 148 can be angled, for example, 5, 10, or 20 degrees relative to vertical to control the fluid motion inside the cylinder 103 when the piston inside the cylinder 103 is drawing down. In some embodiments, the flow passages 168 and/or the cylinder flow passages 148 can be angled between, for example, about 20 degrees and about 40 degrees relative to vertical. In some embodiments, the flow passages 168 and/or the cylinder flow passages 148 can be angled, for example, between about 5 degrees and about 20 degrees relative to vertical. The flow passages 168 and/or the cylinder flow passages 148 can have optimized shapes and sizes such that the fluid flow can be controlled to achieve a particular result. For example, tumble can occur such that air flows down one side of the cylinder 103, starts to rotate near the piston at the bottom of the cylinder, and then is collapsed and converted into turbulence such that fuel efficiency is improved.

The spring 122 and the spring 185 can be constructed from any suitable material, such as, for example, a stainless steel spring wire, and can be fabricated to produce a suitable biasing force. In some embodiments, however, a cylinder head assembly can include any suitable biasing member to ensure that that the valve member 160 can be moved among a center-biased equilibrium configuration, an opened configuration, and a closed configuration. For example, in some embodiments, a cylinder head assembly can include a cantilever spring, a Belleville spring, a leaf spring and the like.

Although the cylinder head 132 is shown and described as being a separate component coupled to the engine block 102, in some embodiments, the cylinder head 132 and the engine block 102 can be monolithically fabricated, thereby eliminating the need for a cylinder head gasket and cylinder head mounting bolts. In some embodiments, for example, the engine block and the cylinder head can be cast using a single mold and subsequently machined to include the cylinders, valve pockets and the like.

Although the engine 100 is shown and described as including a single cylinder, in some embodiments, an engine can include any number of cylinders in any arrangement. For example, in some embodiments, an engine can include any number of cylinders in an in-line arrangement. In other embodiments, any number of cylinders can be arranged in a vee configuration, an opposed configuration or a radial configuration.

Similarly, the engine 100 can employ any suitable thermodynamic cycle. Such engine types can include, for example, Diesel engines, spark ignition engines, homogeneous charge compression ignition (HCCI) engines, two-stroke engines and/or four stroke engines. Moreover, the engine 100 can include any suitable type of fuel injection system, such as, for example, multi-port fuel injection, direct injection into the cylinder, carburetion, and the like.

Although the cylinder head assembly 130 is shown and described above with reference to a single valve 160 and a single gas manifold 110, in some embodiments, a cylinder head assembly includes multiple valves and gas manifolds. For example, FIG. 4 illustrates a perspective view of a cylinder head assembly 230. As illustrated, the cylinder head assembly 230 includes four cylinder heads 232. Each cylinder head 232 includes an intake valve member 260I and an exhaust valve member 260E (shown in perspective view in FIGS. 5 and 6, respectively). Each of the cylinder heads 232 can be the same or similar in structure and/or function to the cylinder head 132 described above with reference to FIG. 1. For example, each of the cylinder heads 232 is associated with two solenoid assemblies 280 and two spring assemblies 220 (one of each for both the intake valve member 260I and the exhaust valve member 260E). Each solenoid assembly 280 and spring assembly 220 can be the same or similar in structure and/or function to the solenoid assembly 180 and spring assembly 120, respectively.

Each cylinder head 232 can include an intake valve pocket (not shown), within which the intake valve member 260I can be disposed, and an exhaust valve pocket (not shown), within which the exhaust valve member 260E can be disposed. Each cylinder head 232 can define an intake port 237 and an exhaust port 239. The positioning of the intake valve member 260I and the exhaust valve member 260E relative to cylinder flow passages defined by each cylinder head 232 can be controlled by the solenoid assembly 280 and the spring assembly 220 as described above with respect to the solenoid assembly 180 and the spring assembly 120. For example, the operation of each intake valve member 260I and each exhaust valve member 260E can be similar to that of the valve member 160 described above in that each has an equilibrium position, an opened position, and a closed position. When the intake valve member 260I is in the opened position, in which each flow passage 268I defined by the intake valve member 260I is aligned with a corresponding cylinder flow passage (not shown), an intake manifold (not shown) coupled to the cylinder head can be in fluid communication with a cylinder (not shown) coupled to the cylinder head, thereby allowing a charge of air to be conveyed from the intake manifold into the cylinder. When the exhaust valve member 260E is in the closed position in which each flow passage 268E of the exhaust valve member 260E is fully offset and/or sealed from its corresponding cylinder flow passage (not shown), each flow passage 268E can be fluidically isolated from the cylinder flow passages (not shown). In this manner, the cylinder can be fluidically isolated from the exhaust manifold (not shown).

The cylinder head assembly 230 can have many different configurations corresponding to the various combinations of the positions of the valve members 260I, 260E within each cylinder head 232 as the valve members 260I, 260E move between their respective equilibrium, opened and closed positions. One possible configuration of a cylinder head 232 includes an intake configuration in which the intake valve member 260I is in the opened position and the exhaust valve member 260E is in the closed position. Another possible configuration includes a combustion configuration in which both valves are in their closed positions. Yet another possible configuration includes an exhaust configuration in which the intake valve member 260I is in the closed position and the exhaust valve member 260E is in the opened position. Yet another possible configuration is an overlap configuration in which both valves are in their opened positions.

Figure 6:
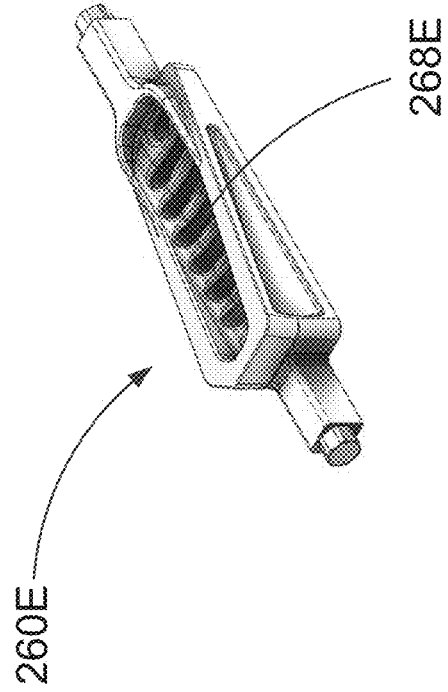
FIG. 6 is a perspective view of an exhaust valve member, according to an embodiment.
Figure 5:
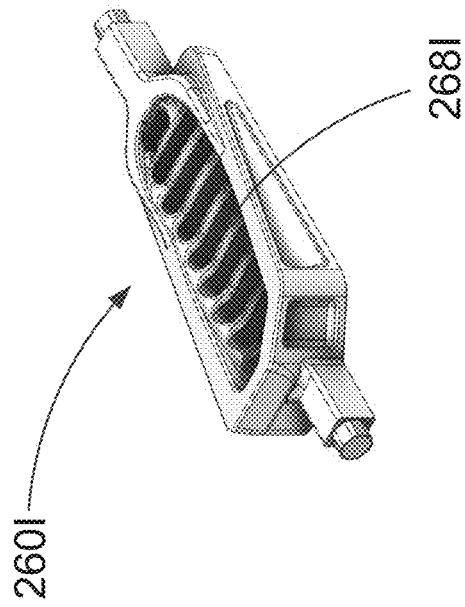
FIG. 5 is a perspective view of an intake valve member, according to an embodiment.

Although the intake valve member 260I and the exhaust valve member 260E are shown in FIGS. 5 and 6 as defining eight flow passages each having a long, narrow shape, in some embodiments a valve member can define any number of flow passages having any suitable shape and size. Each flow passage 268I and 268E need not have the same shape and/or size as the other flow passages 268I and 268E. Rather, in some embodiments, the size of the flow passages can decrease with a taper of the valve member 260I and/or 260E. In this manner, the valve member 260 can be configured to maximize the cumulative flow area, thereby resulting in more efficient engine operation. Moreover, in some embodiments, the shape and/or size of the flow passages 268 can vary along a longitudinal axis of the flow passages 268I and 268E. For example, in some embodiments, the flow passages can have a lead-in chamfer or taper along the longitudinal axis of the flow passages 268I and 268E. In some embodiments, the flow passages 268I and/or 268E near the ends of the intake valve member 260I or the exhaust valve member 260E can have shorter lengths than the flow passages 268I and/or 268E in the center of the intake valve member 260I or the exhaust valve member 260E.

Similarly, each of the cylinder flow passages (such as cylinder flow passages 148 in FIG. 1) need not have the same shape and/or size as the other cylinder flow passages, respectively. Moreover, in some embodiments, the shape and/or size of the cylinder flow passages (e.g., 148) can vary along their respective longitudinal axes. For example, in some embodiments, the cylinder flow passages can have a lead-in chamfer or taper along their longitudinal axes. In some embodiments, the cylinder flow passages (e.g., 148)

corresponding to the valve flow passages 268I or 268E near the ends of the intake valve member 260I or the exhaust valve member 260E, respectively, can have shorter lengths than the cylinder flow passages in the center of the cylinder flow passage arrangement (e.g., near the center of the bridge portion).

In some embodiments, the longitudinal axis and/or the centerline of one flow passage (e.g., the cylinder flow passages 148 and/or the valve flow passages 168) need not be parallel to the longitudinal axis of another flow passage, as shown in FIG. 1. Additionally, as shown in FIG. 1, in some embodiments the longitudinal axis Lf of one or more of the flow passages 168 can be substantially normal to the longitudinal axis Lv of the valve member 160, while the longitudinal axis Lf of other of the flow passages 168 can be angularly offset from the longitudinal axis Lv of the valve member 160 by an angle other than 90 degrees.

The valve members 260I and 260E can be fabricated from any suitable material or combination of materials. For example, in some embodiments, the tapered portion can be fabricated from a first material, the stem portions can be fabricated from a second material different from the first material and the sealing portions, to the extent that they are separately formed, can be fabricated from a third material different from the first two materials. In this manner, each portion of the valve member can be constructed from a material that is best suited for its intended function. For example, in some embodiments, the sealing portions can be fabricated from a relatively soft stainless steel, such as for example, unhardened 430FR stainless steel, so that the sealing portions will readily wear when contacting the interior surface of the cylinder head. In this manner, the valve member can be continuously lapped during use, thereby ensuring a fluid-tight seal. In some embodiments, for example, the tapered portion can be fabricated from a relatively hard material having high strength, such as for example, hardened 440 stainless steel. Such a material can provide the necessary strength and/or hardness to resist failure that may result from repeated exposure to high temperature exhaust gas. In some embodiments, for example, one or both stem portions can be fabricated from a ceramic material configured to have high compressive strength.

In some embodiments, each of the cylinder heads 232, including the interior surface (not shown) that defines the valve pocket, is monolithically constructed from a single material, such as, for example, cast iron. In some monolithic embodiments, for example, the interior surface defining the valve pocket can be machined to provide a suitable surface for engaging the sealing portions (not shown) of the valve member such that a fluid-tight seal can be formed. In other embodiments, however, the cylinder head can be fabricated from any suitable combination of materials. As discussed in more detail herein, in some embodiments, a cylinder head can include one or more valve inserts disposed within the valve pocket. In this manner, the portion of the interior surface configured to contact the sealing portions of the valve member can be constructed from a material and/or in a manner conducive to providing a fluid-tight seal.

Figure 7:
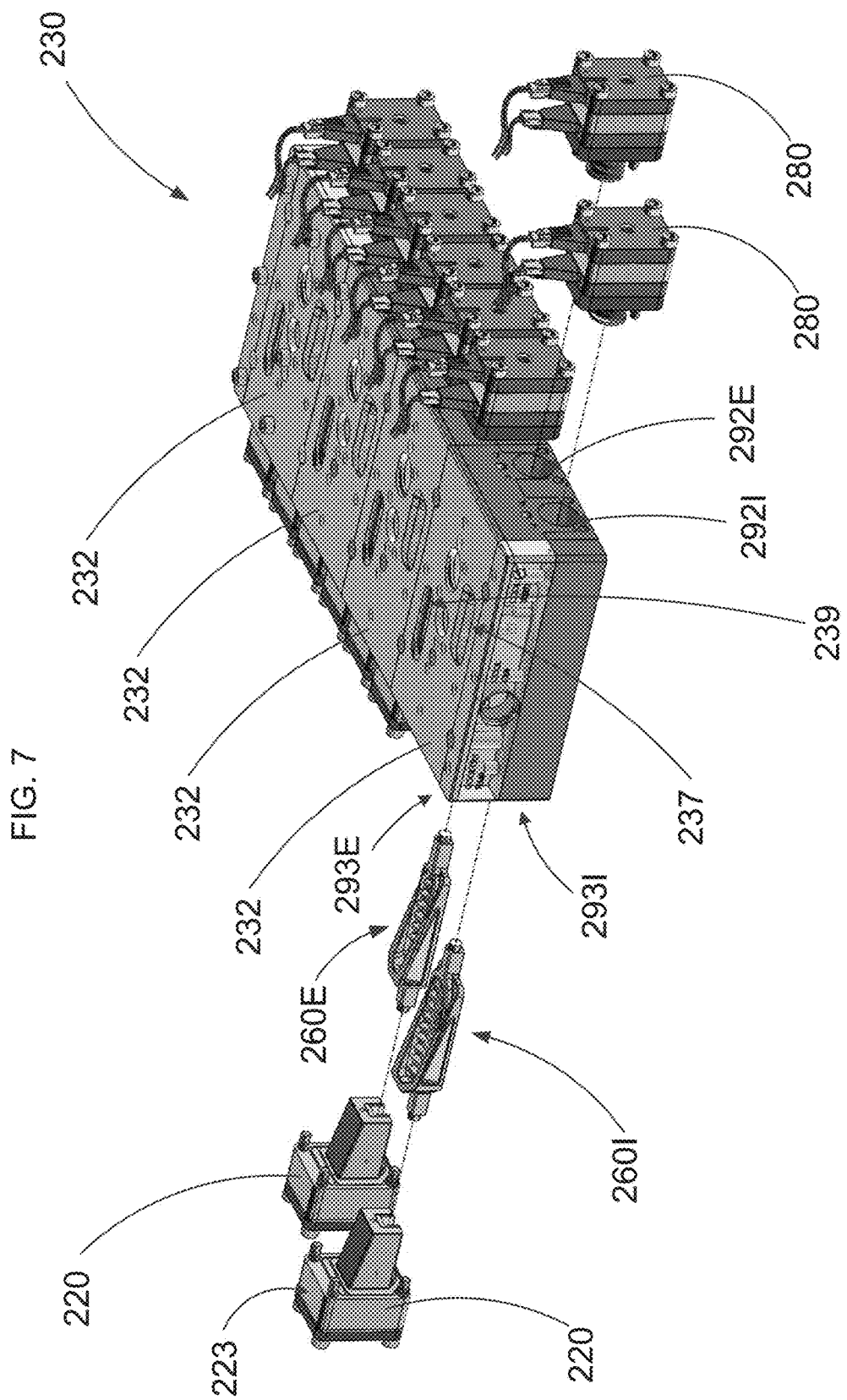
FIG. 7 is a partially exploded view of the cylinder head assembly of FIG. 4 in a first configuration.
Figure 8:
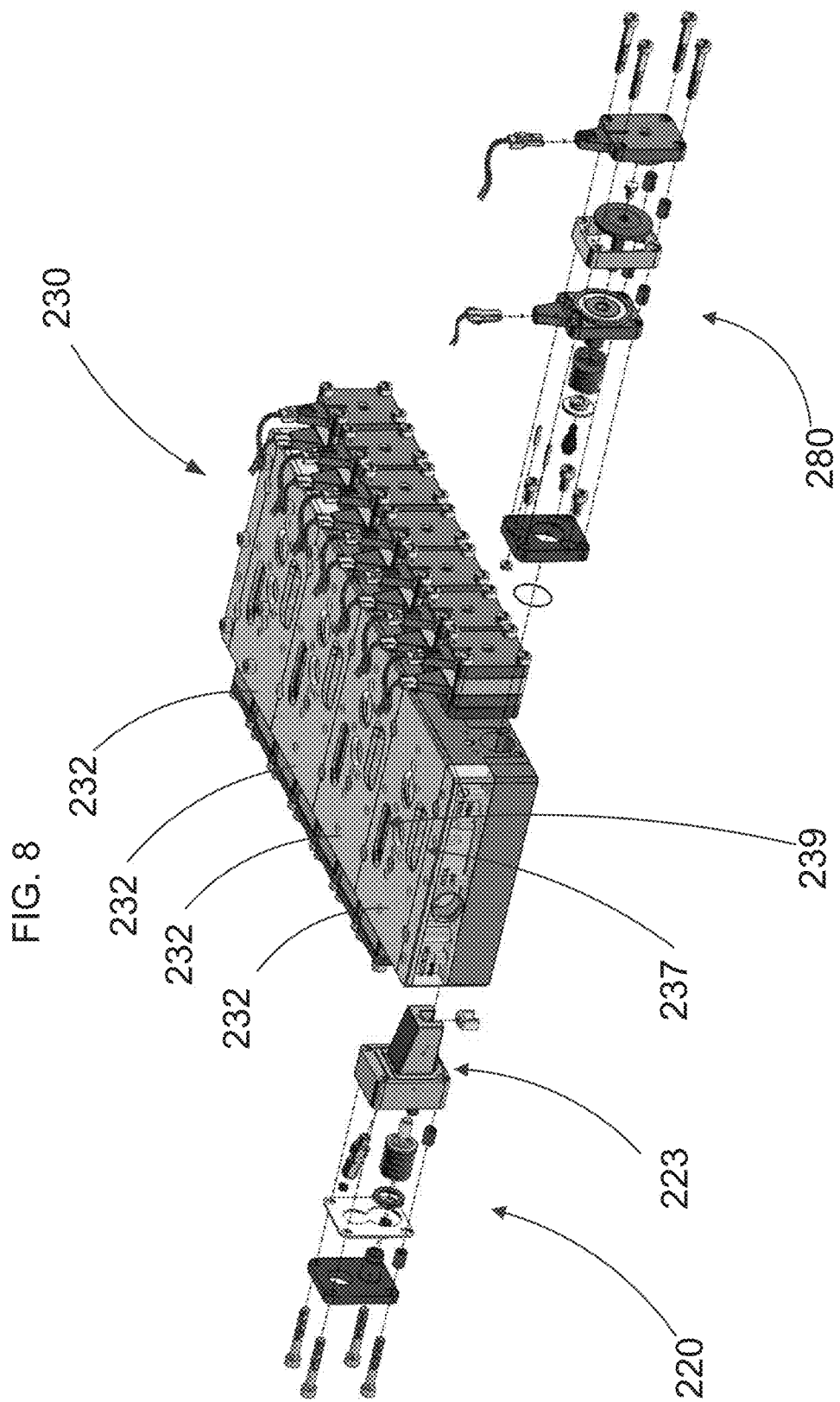
FIG. 8 is a partially exploded view of the cylinder head assembly of FIG. 4 in a second configuration.

FIGS. 7 and 8 are each a perspective view of the assembly of FIG. 4 in a first exploded configuration and a second exploded configuration, respectively. As shown in FIGS. 7 and 8, the spring or return assemblies 220 can include a housing 223. As demonstrated by FIG. 7, in some embodiments, each of the cylinder heads 232 can first be assembled such that the cylinder head 232 defines an intake valve pocket and an exhaust valve pocket (not shown). The cylinder head 232 can be formed such that, in the assembled configuration, the cylinder head 232 defines an intake actuator assembly port 292I and an exhaust actuator assembly port 292E on a first side of the cylinder head 232, and an intake return assembly port 293I and an exhaust return assembly port 293E (not shown) on a second side of the cylinder head 232. Each of the actuator assemblies 280 can be inserted into one of the intake actuator assembly port 292I and the exhaust actuator assembly port 292E. The intake valve member 260I can be inserted through the intake return assembly port 293I and into the intake valve pocket. The exhaust valve member 260E can be inserted through the exhaust return assembly port 293E and into the exhaust valve pocket. Each of the return assemblies 220 can then be inserted into one of the intake return assembly port 293I and the exhaust return assembly port 293E.

Figure 48:
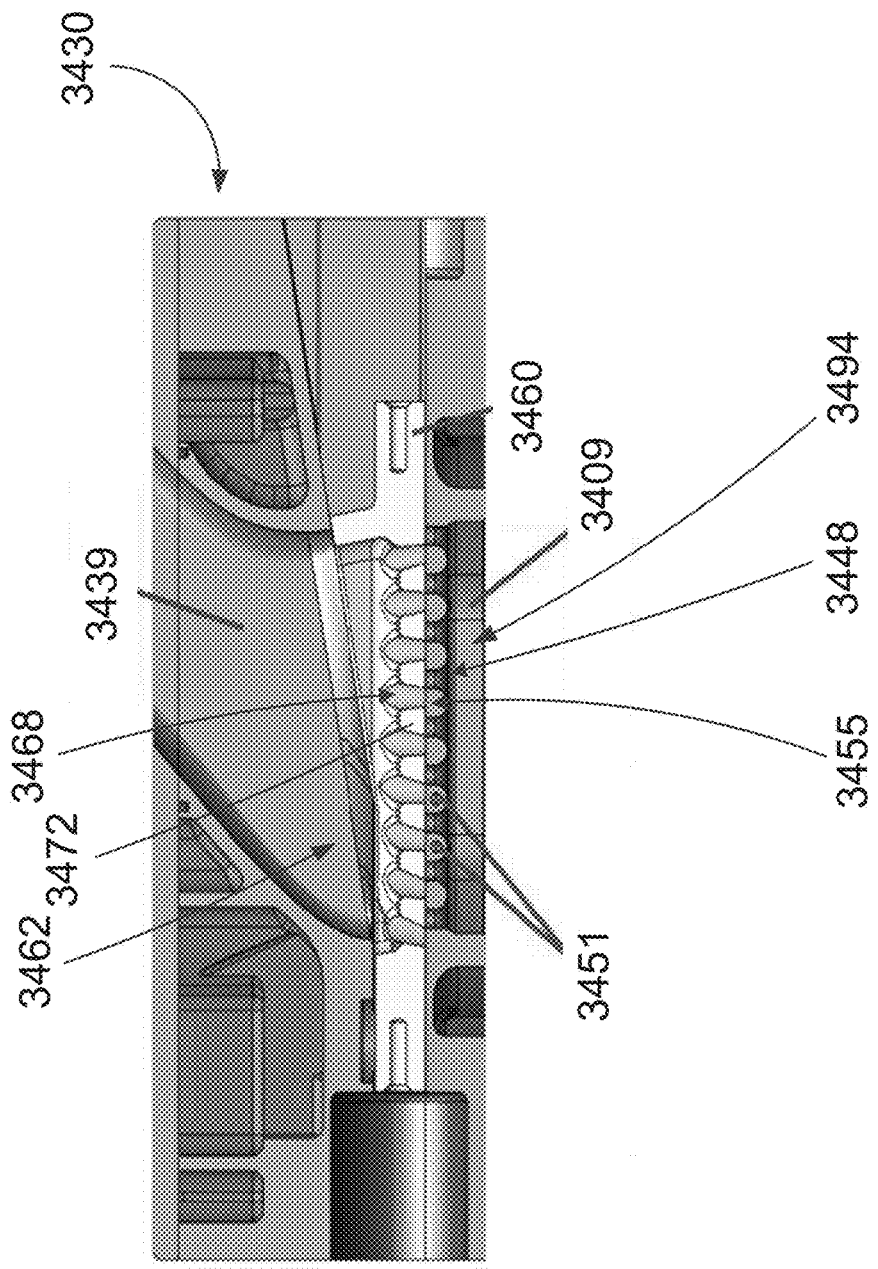
FIG. 48 is a cross-sectional illustration of a cylinder head and a valve member, according to an embodiment.

FIG. 48 is a cross-sectional illustration of a cylinder head 3430 and a valve member 3460. The cylinder head 3430 and the valve member 3460 can be the same or similar in structure and/or function to any of the cylinder heads or valve members, respectively, described herein. For example, the cylinder head 3430 includes a cylinder bridge 3494. The cylinder bridge 3494 includes a number of sealing portions 3455 that define a number of flow passages 3448. The valve member 3460 includes a valve bridge 3462. The valve bridge 3462 includes a number of sealing portions 3472 that define a number of flow passages 3468.

The valve member 3460 is shown in FIG. 48 in a neutral, center-biased mid-position within the cylinder head 3430. Said another way, the valve member 3460 is shown in a position that is located partially between the fully closed and fully open position. The valve member 3460 can be biased toward the shown center-biased configuration when an actuator assembly (not shown) on a first side of the valve member 3460 is not applying force via a solenoid assembly, but is providing force to a first side of the valve member 3460 via a spring and a return assembly (not shown) is applying a force via a spring to a second side of the valve member 3460. In some embodiments, the exhaust port 3439 and the combustion chamber 3409 can be in fluid communication when the valve member 3460 is in the neutral, center-biased position. In some embodiments, the valve member 3460 can partially or fully seal the exhaust port 3439 from the combustion chamber 3409 in the center-biased position, although the valve member 3460 is in a longitudinally translated position relative to the fully closed position of the valve member 3460 (e.g., the seal may be less strong in the center-biased position). In some embodiments, an edge of a sealing member 3472 can align with an edge of a sealing member 3455 in the center-biased position of the valve member 3460. In some embodiments, an edge of a sealing member 3472 can be offset from an edge of a sealing member 3455 when the valve member 3460 is in the center-biased position.

As shown in FIG. 48, in some embodiments the cylinder head can include a number of cooling passages 3451. The cooling passages 3451 can extend through, for example, the sealing members 3455. The cooling passages 3451 can be in fluidic communication with a source of coolant such that the coolant can flow through the sealing members 3455 of the valve member 3460 and cool the valve member 3460. Although FIG. 48 shows the cooling passages 3451 extending through two of the sealing member 3455, in some embodiments the cooling passages 3451 can be defined through any portion of the valve member 3460 and any number of sealing members 3455, such as, for example, one or all of the sealing member 3455.

Figure 9:
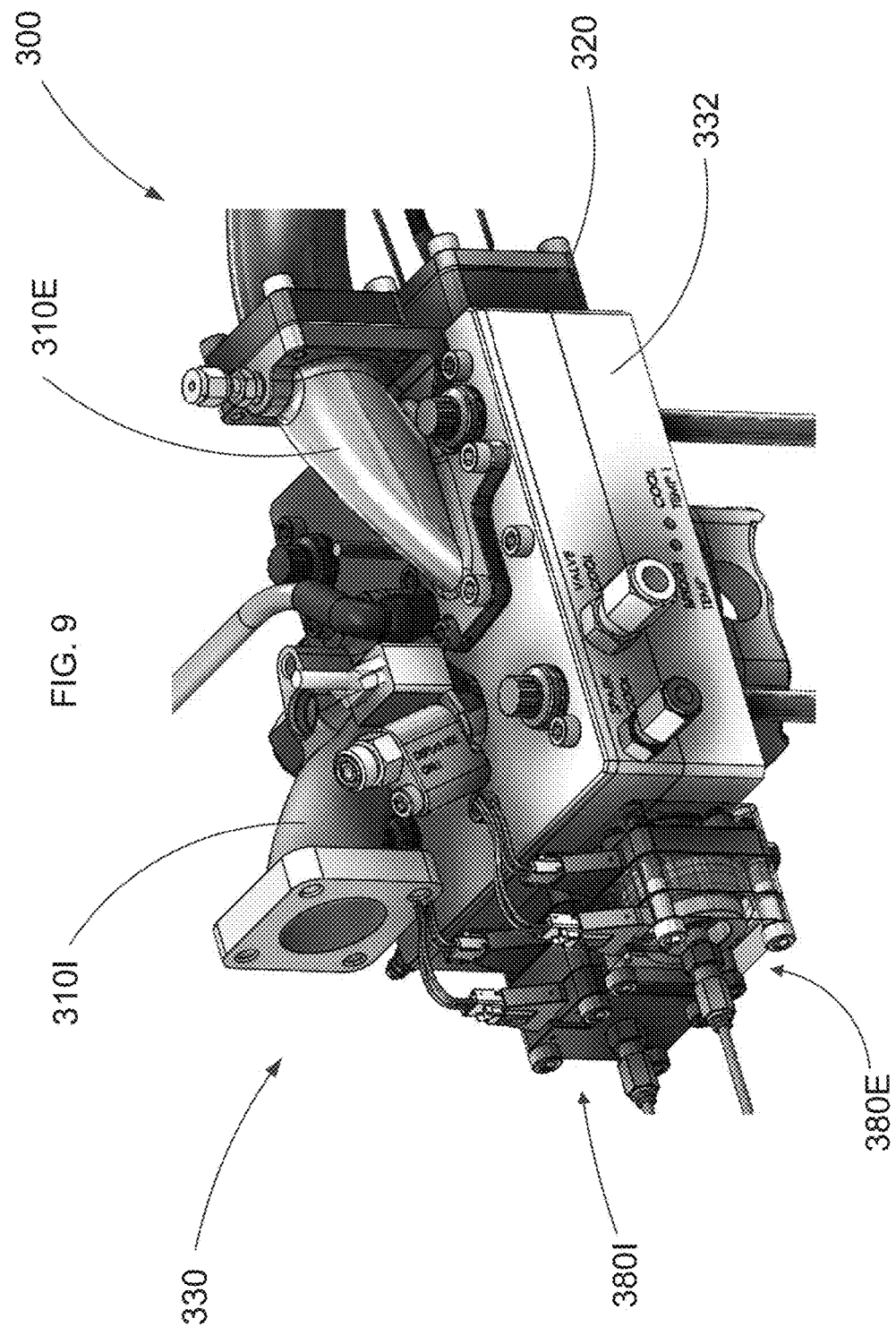
FIG. 9 is a perspective view of a portion of an engine including a cylinder head assembly, according to an embodiment.

FIG. 9 is a perspective view of a portion of an engine 300 including a cylinder head assembly 330, according to an embodiment. The cylinder head assembly 330 can be the same or similar in structure and/or function to any of the cylinder head assemblies described herein. For example, the cylinder head assembly 330 includes a cylinder head 332, which can be the same or similar in structure and/or function to any of the cylinder heads described herein. Additionally, actuation assemblies 380I and 380E (e.g., solenoid assemblies) can be coupled to the cylinder head 332 such that the actuation assemblies 380I and 380E can be operationally coupled to an intake valve member (not shown) and an exhaust valve member (not shown) disposed within an intake valve member pocket (not shown) and an exhaust valve member pocket (not shown), respectively. The actuation assemblies 380I and 380E can be the same or similar in structure and/or function to any actuation assemblies or solenoid assemblies described herein. Additionally, return assemblies 320 (e.g., spring assemblies) can be coupled to the cylinder head 332 such that the return assemblies 320 are operationally coupled to the intake valve member and the exhaust valve member. The return assemblies 320 can be the same or similar in structure and/or function to any of the return assemblies or spring assemblies described herein. Additionally, an intake duct 310I and an exhaust duct 310E are coupled to the cylinder head 332 such that the intake duct 310I is in fluid communication with an intake port (not shown) and, thus, the flow passages of the intake valve member and such that the exhaust duct 310E is in fluid communication with an exhaust port (not shown) and, thus, the flow passages of the exhaust valve member.

Figure 10:
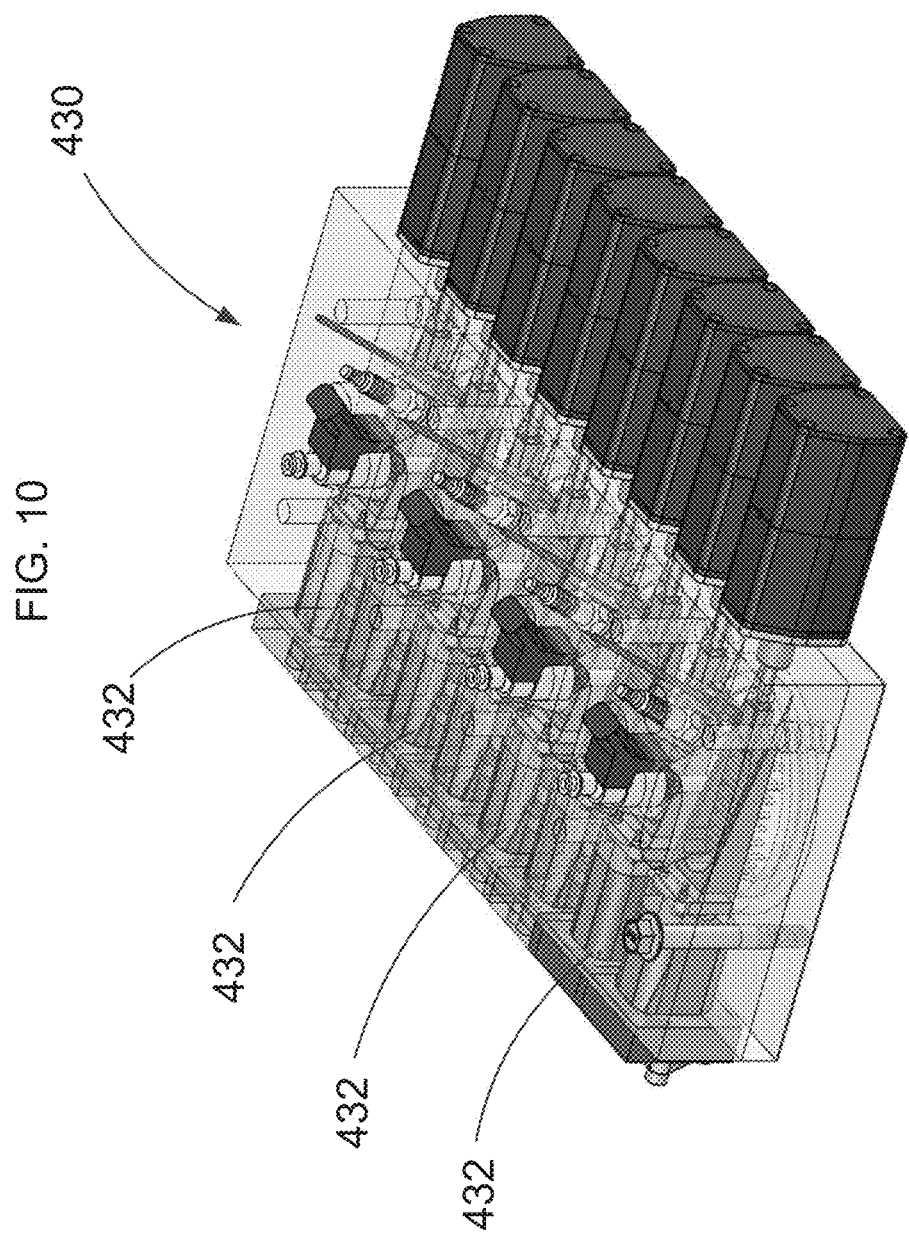
FIG. 10 is a perspective view of a cylinder head assembly, according to an embodiment.

FIG. 10 is a perspective view of a cylinder head assembly 430, according to an embodiment. The cylinder head assembly 430 can be the same and/or similar in structure and function to the cylinder head assembly 230 described above with respect to FIGS. 4-8. For example, the cylinder head assembly 430 includes four cylinder heads 432. An outer wall of each cylinder head 432 of the cylinder head assembly 430 is shown in transparent in FIG. 10 such that the inner components of each cylinder head 432 can be viewed. As shown in FIG. 10, an fluid injector and/or spark plug can be positioned through the center of each cylinder head 432 such that the fluid injector and/or spark plug are able to access a combustion chamber below the cylinder head 432.

Figure 11:
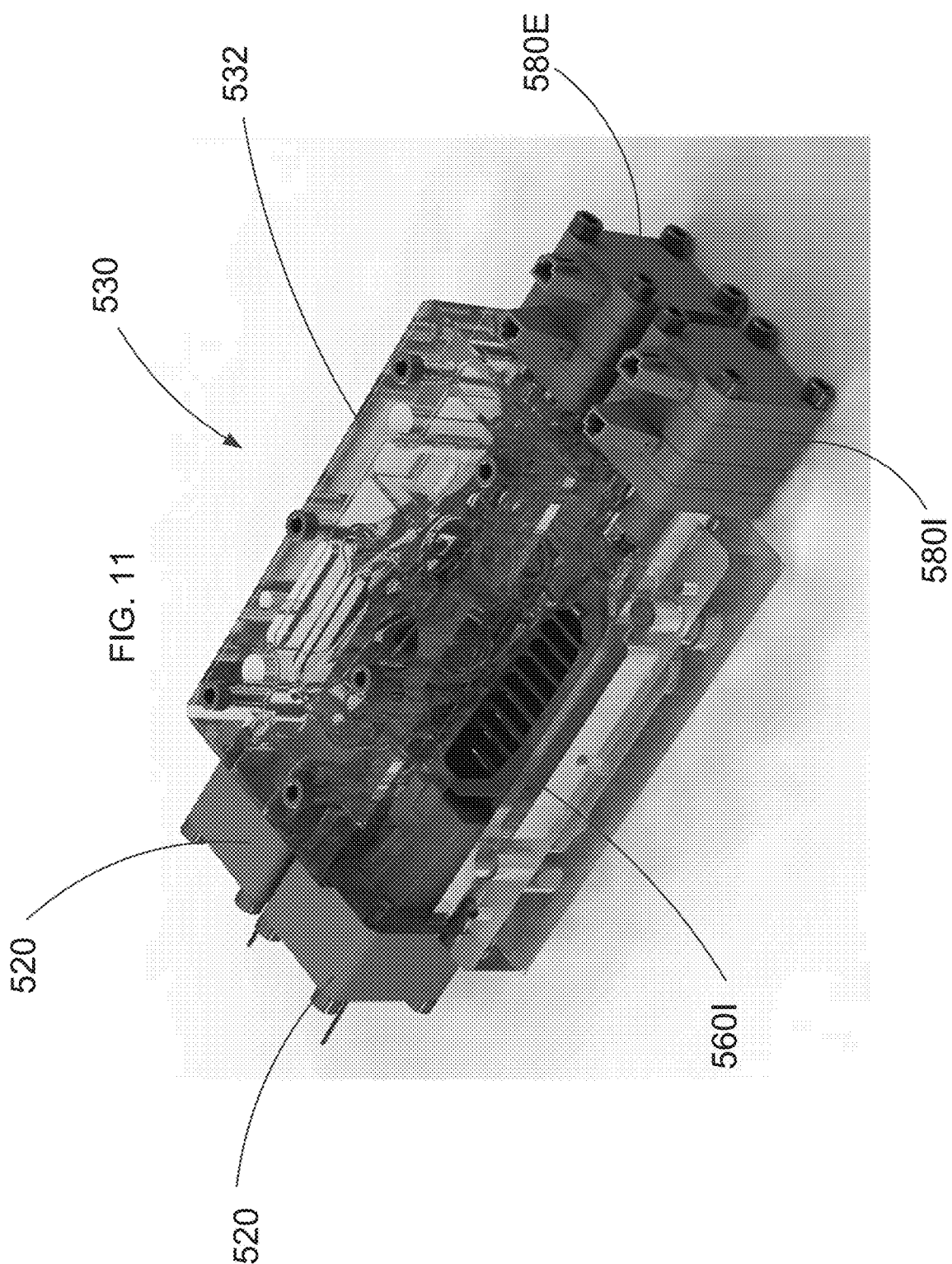
FIG. 11 is a perspective view of a cylinder head assembly, according to an embodiment.

FIG. 11 is a perspective view of a cylinder head assembly 530, according to an embodiment. The cylinder head assembly 530 includes a cylinder head 532, which can be the same or similar in structure and/or function to any of the cylinder heads described herein. Additionally, actuation assemblies 580I and 580E (e.g., solenoid assemblies) are coupled to the cylinder head 532 such that the actuation assemblies 580I and 580E can be operationally coupled to an intake valve member 560I and an exhaust valve member (not shown) disposed within an intake valve member pocket (shown via cutaway of a portion of the cylinder head 532) and an exhaust valve member pocket (not shown), respectively. The actuation assemblies 580I and 580E can be the same or similar in structure and/or function to any actuation assemblies or solenoid assemblies described herein. Additionally, return assemblies 520 (e.g., spring assemblies) are coupled to the cylinder head 532 such that the return assemblies 520 are operationally coupled to the intake valve member and the exhaust valve member. The return assemblies 520 can be the same or similar in structure and/or function to any of the return assemblies or spring assemblies described herein.

Figure 12:
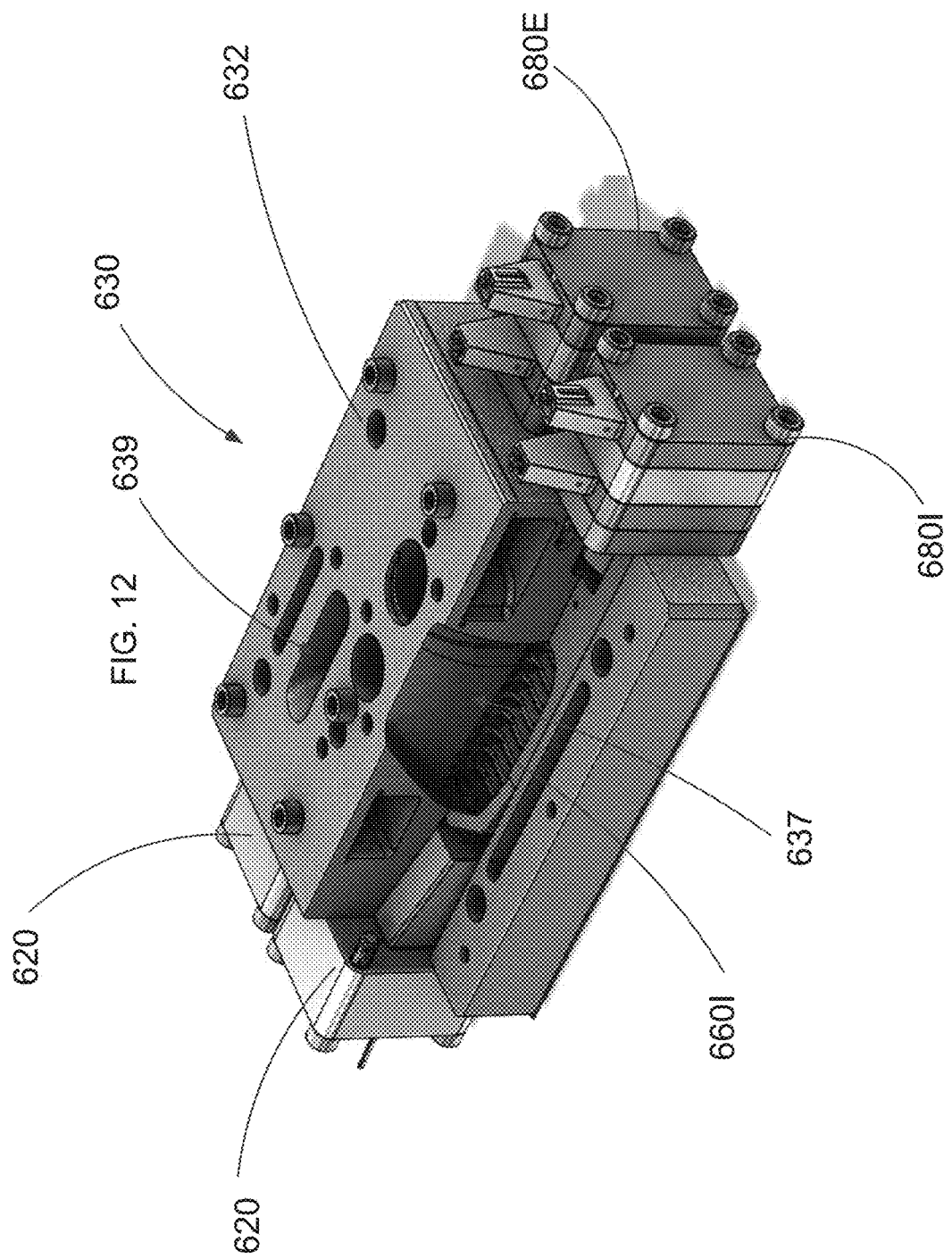
FIG. 12 is a perspective view of a cylinder head assembly, according to an embodiment.

FIG. 12 is a perspective view of a cylinder head assembly 630, according to an embodiment. The cylinder head assembly 630 includes a cylinder head 632, which can be the same or similar in structure and/or function to any of the cylinder heads described herein. Additionally, actuation assemblies 680I and 680E (e.g., solenoid assemblies) are coupled to the cylinder head 632 such that the actuation assemblies 680I and 680E can be operationally coupled to an intake valve member 660I and an exhaust valve member (not shown) disposed within an intake valve member pocket (shown via cutaway of a portion of the cylinder head 632) and an exhaust valve member pocket (not shown), respectively. The actuation assemblies 680I and 680E can be the same or similar in structure and/or function to any actuation assemblies or solenoid assemblies described herein. Additionally, return assemblies 620 (e.g., spring assemblies) are coupled to the cylinder head 632 such that the return assemblies 620 are operationally coupled to the intake valve member and the exhaust valve member. The return assemblies 620 can be the same or similar in structure and/or function to any of the return assemblies or spring assemblies described herein. The cylinder head 632 also defines an intake port 637 and an exhaust port 639, such that, when an intake manifold is fluidically coupled to the intake port 637 and an exhaust manifold is fluidically coupled to the exhaust port 639, the intake manifold is in fluidic communication with the flow passages of the intake valve member 660I and the exhaust manifold is in fluid communication with the flow passages of the exhaust valve member.

In some embodiments, the flow passage portion of a valve member, such as any of the valve members described herein, defining the flow passages of the valve member (i.e., the valve bridge) and the portion of a cylinder head, such as any of the cylinder heads described herein, defining the cylinder flow passages (i.e., the cylinder bridge) can be designed, shaped, and formed such that distortion and stress over operating temperature and pressure ranges is reduced. For example, the valve bridge and the cylinder bridge can be shaped and formed such that the distortion and stress is reduced when used in a modern combustion engine.

In some embodiments, the bridges can be S-shaped and/or Z-shaped such that stresses are allowed to deform the bridge in a controlled and desired manner. For example, the flow passages through the cylinder bridge and/or the valve bridge can be arranged and sized such that the sealing portions of the cylinder bridge or valve bridge, respectively, have an S or Z shape. In some embodiments, the outer shape or periphery of the valve bridge can have an S or Z shape. In some embodiments, the ratio of height to width of the valve bridge and/or the cylinder bridge can be greater than 1. In some embodiments, the stiffness of the cylinder head can be reduced to allow for the expansion and deformation of the bridges without inducing high stresses. In some embodiments, a freely expanding combustion ring or insert can be included. The freely expanding combustion ring or insert can be configured to not transfer load into the main cylinder head and can enable controlled deformation resulting from thermal and mechanical loads. In some embodiments, the valve bridge and/or the cylinder bridge can be structured to handle peak cylinder pressures. For example, the valve bridge and/or the cylinder bridge can include stress optimization through the bridge contour such that the valve bridge and/or the cylinder bridge can have a thick center and thinner ends.

In some embodiments, a cylinder head, such as any of the cylinder heads described herein, can be manufactured from one material. In some embodiments, a cylinder head, such as any of the cylinder heads described herein, can be manufactured from two or more materials. For example, one of the materials can be a high-strength material such that the high-strength material provides an internal (e.g., skeletal) or an external (e.g., exoskeletal) framework and/or is able to accommodate thermal and mechanical loads.

In some embodiments, the valve can be manufactured as a compacted graphite iron (CGI) casting. In some embodiments, the cooling of the casting during manufacturing can be controlled to improve strength in high-stress areas. The rate of cooling can affect the microstructure of the casting, and, in turn, physical properties like conductivity, strength, and other properties.

In some embodiments, the valve member and cylinder head can be formed from materials selected to achieve desired physical characteristics to enable proper operation over the operating temperature and pressure ranges. Additionally, the valve member and cylinder head can be formed from a material that achieves desired performance characteristics at a low cost. For example, the valve member and cylinder head can be formed from compacted graphite iron. In some embodiments, the valve member and cylinder head can be formed from, for example, ceramic materials and/or 3D printed materials. In some embodiments, the valve member and cylinder can be formed from any material capable of maintaining stable mechanical properties up to temperatures exceeding 450 C and having a high thermal conductivity such that the operational temperature of the components can be maintained.

Figure 47:
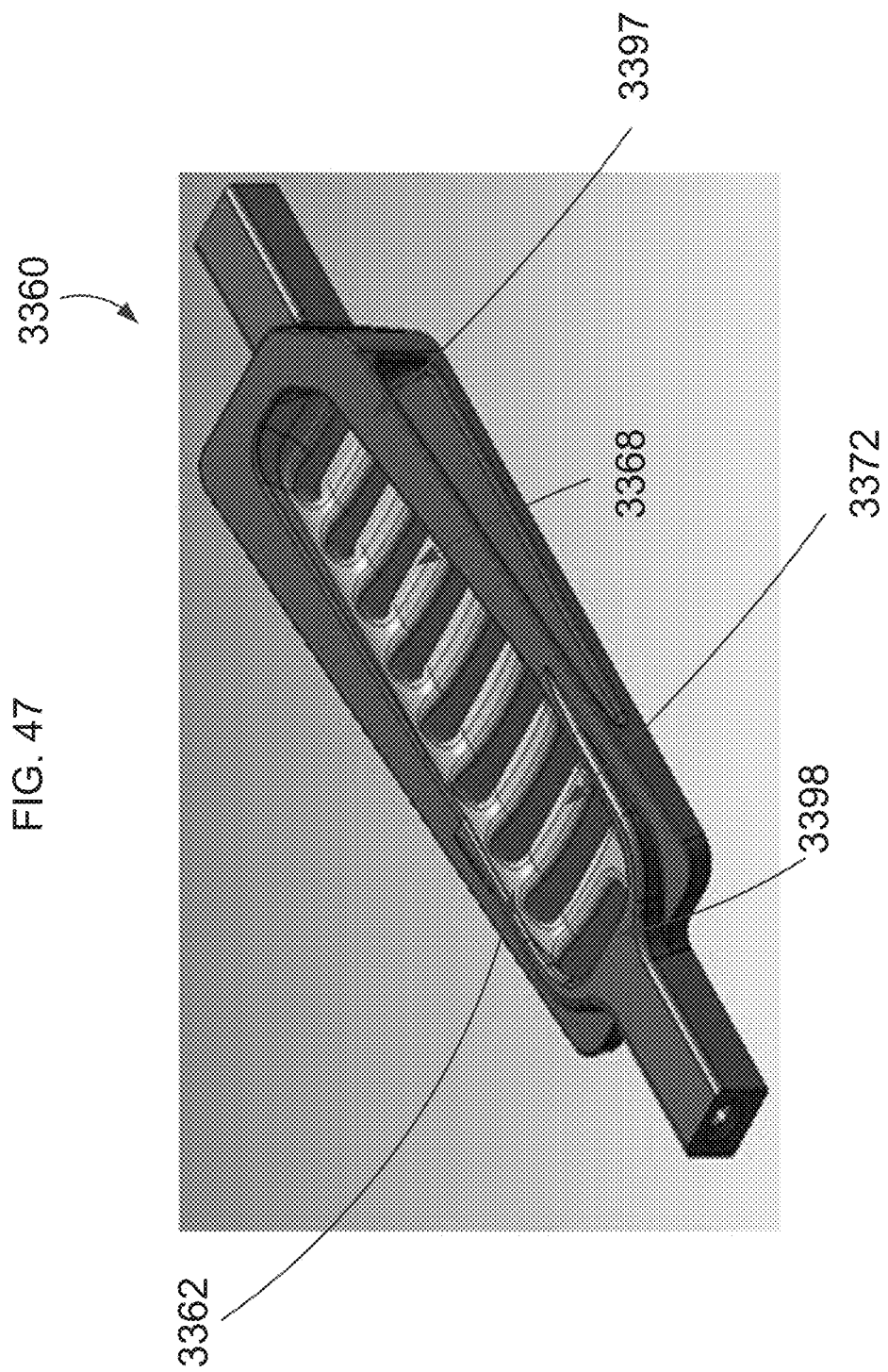
FIG. 47 is a perspective view of a valve member, according to an embodiment.

In some embodiments, methods can be used to cool the valve member and the cylinder head to proper operation temperatures of the valve member and the cylinder head over the operating range of the engine. In some embodiments, the valve member can have increased surface area on the top side of the valve member to transfer heat to the cool portion of the cylinder head away from the combustion heat loads. For example, the top surface, including the top sides of the sealing portions, can have a concave shape such that the top surface has more surface area for heat transfer. An example of this can be seen in FIG. 47, which is a perspective view of a valve member 3360. The valve member 3360 can be the same or similar in structure and/or function to any of the valve members described herein. The valve member 3360 includes a flow passage portion 3362. As shown, the flow passage portion 3362 is surrounded by a first upper wall 3398 and a second tapered upper wall 3397. The flow passage portion 3362 includes a number of sealing portions 3372 and defines a number of flow passages 3368. The top surface of the flow passage portion 3362 is concave such that the edges of the flow passage portion 3362 including the end portions of the sealing portions 3372 curve upward toward the edge of the first upper wall 3398 and/or the second tapered upper wall 3397. Thus, the valve member 3360 can have an increased upper surface area for heat transfer.

In some embodiments, the valve bridge and/or the cylinder bridge can define cooling passages through the valve bridge and/or the cylinder bridge. For example, the cooling passages can be defined during a 3D printing process of the valve bridge and/or the cylinder bridge. In some embodiments, the valve member, the valve bridge, and/or the cylinder bridge can include (e.g., be filled with) sodium. In some embodiments, the valve member, the valve bridge, and/or the cylinder bridge can define cooling channels that are shaped to guide heat away from the valve member, the valve bridge, and/or the cylinder bridge. In some embodiments, the head can be cooled independently from the cylinder block such that cooler temperatures are allowed from the coolant while normal operating temperatures are still allowed in the cylinder block. For example, coolant lines can be run directly from a coolant pump to the cylinder head. In some embodiments, a dedicated cooling circuit can be coupled to the cylinder head. In some embodiments, thermal barrier coatings can be used to restrict the conduction of heat from the gas to the valve and cylinder head. In some embodiments, a water-cooled exhaust manifold can be included. For example, the water-cooled exhaust manifold can be 3D printed.

In some embodiments, copper heat conduits can be imbedded in the valve member and/or the cylinder bridge. In some embodiments, the copper heat conduits can be formed (e.g., printed) with integrated porous wicking features. In some embodiments, during manufacture of a CGI casting of the valve and/or the head, the cooling of the casting can be controlled to improve conductivity along critical heat transfer paths. In some embodiments, 3D printed structures can be incorporated into cooling channels defined in the valve member, the valve bridge, and/or the cylinder bridge to improve heat transfer compared to conventional cooling channels. The 3D printed structures can cause the cooling channels to have increased surface area. In some embodiments, the 3D printed structures can be formed as webs, matrices, honey combs, micro-fins, scaffolding, and/or micro-channels. In some embodiments, the cooling channels can be optimized for maximum heat transfer coefficient using 3D printing. For example, the surface roughness can be optimized to increase flow for a given pump pressure. In other embodiments, turbulence can be strategically introduced in flow passages that may otherwise tend to be laminar via structures coupled (e.g., via 3D printing or molding) to the interior walls of the flow passages.

In some embodiments, the cylinder head assembly can be designed to reduce and stabilize the friction of the moving components in the cylinder head over the operating range and life of the engine. For example, the cylinder head assembly can include features to reduce friction of the moving components in the system while still allowing for a non-lubricated system capable of operating at elevated temperatures. In some embodiments, the contact area for friction, and resultant heat transfer, can be reduced. In some embodiments, coatings can be applied to the moving components to allow composite bearing materials to achieve the targeted operating life goals. In some embodiments, the valve members can be shaped and sized relative to their corresponding valve pockets such that sufficient tolerance between the valve members and their corresponding valve pockets exists such that the sides of the valve members are not in contact the cylinder head, which would induce uncontrolled frictional loading. In some embodiments, self-aligning guides can be included to reduce force from binding or misalignment. In some embodiments, the angle of operation (i.e., the line of action) can be adjusted such that the valve member is raised and the majority of the contact area is eliminated.

Due to the wedging force needed to hold the valve member in position relative to the cylinder head (e.g., in a closed configuration), the valve member can require a significant force to initiate movement out of wedged engagement with the cylinder head. In some embodiments, a slide hammer can be used to initiate this movement. In some embodiments, the stress caused by the slide hammer impact forces can be reduced over the operating range and life of the engine. For example, in some embodiments, a contact button can be included to survive the high impact load and distribute the force to a larger area on the valve to reduce stress. A contact button can be disposed on and/or within each valve stem of a valve member. In some embodiments, the contact button can be the same as a plug (e.g., first plug 178). In some embodiments, the contact button can be in addition to a plug. In some embodiments, a stiffener can be included in the center of the valve member to distribute the loads within the valve member. In some embodiments, fingers or a rib can be included (e.g., during casting of the valve) running down the sides of the valve member to direct the loads into the stronger sides of the valve member and away from the bridges.

In some embodiments, a valve member, such as any of the valve members described herein, can be manufactured with multiple materials. For example, a high-strength material can be used to provide an internal (e.g., skeletal) or external (e.g., exoskeletal) framework to accommodate slide hammer loads without affecting the form or function of the valve member. In some embodiments, an adjustable spring can be included in the contact button such that the slide hammer loads can break the valve member free while not introducing excessive impact force on the valve member.

Figure 13:
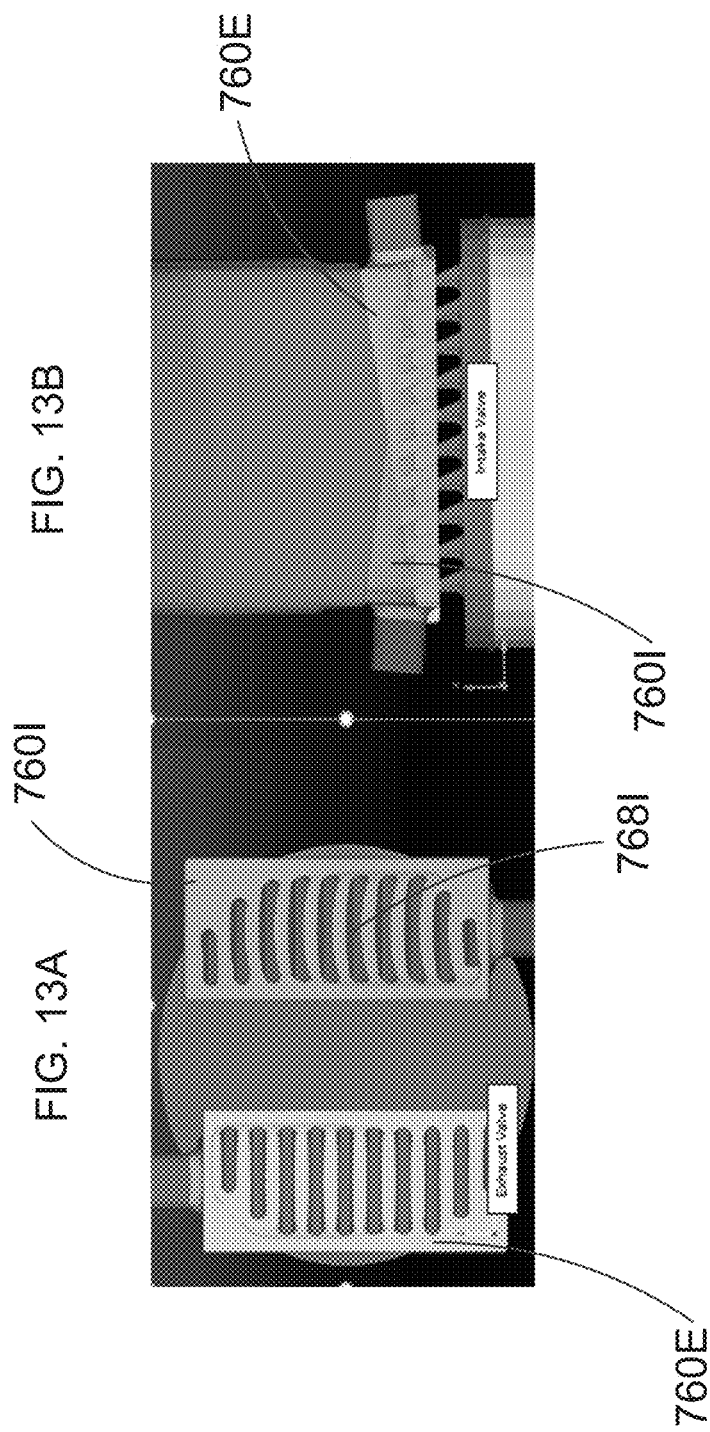
FIGS. 13A and 13B are a bottom view and a side view, respectively, of an exhaust valve and an intake valve, according to an embodiment.

In some embodiments, the volumetric efficiency can be improved by controlling the air motion in the cylinder for combustion purposes over the operating range and life of the engine. In some embodiments, the angle of the intake valve slots (e.g., the flow passages 168 of valve member 160 of FIG. 1) can align with the bore of the cylinder to create high tumble scenarios. In some embodiments, the intake valve slots can be angled away from parallel to create a desired combination of swirl and tumble. FIGS. 13A and 13B illustrate an intake valve member 760I and an exhaust valve member 760E. The intake valve member 760I defines intake valve passages 768I (also referred to as intake valve slots) defined at a 20-degree angle. When simulated in computational fluid dynamics (CFD) software, the 20-degree angle resulted in only a slight reduction in volumetric efficiency and still maintained a volumetric efficiency of greater than 100%. The angle of the intake valve slots can be designed to take advantage of the varying air velocities to over the operating conditions of the engine to create different air motion characteristics within the cylinder. Additionally, the valve bridge and/or the cylinder bridge can be structured (e.g., via angling of the intake valve passages ad/or the valve passages in the cylinder bridge) to manage conversion of swirl and tumble conversion into kinetic energy without dissipating the energy in the slot volumes. In some embodiments, the intake valve slots or flow passages can have any suitable shape or size. For example, FIGS. 44A and 44B illustrate two possible flow passage cross-section shapes.

In some embodiments, a valve member, such as any of the valve members described herein, can be structured to improve the flow of air into and out of the cylinder over the operating range and life of the engine. In some embodiment, the valve member structure results in a reduced flow area compared to conventional poppet valves and enables the incorporation of several design features which result in very high discharge coefficients. The resultant effective flow into the cylinder is very similar. In some embodiments, a converging or diverging geometry can be defined in the flow passages or slots (e.g., see FIG. 35B). In some embodiments, a tripping feature or lip can be added to create turbulence and maintain contact of the flow with the wall. In some embodiments, flow areas can be reduced in the inlet and exhaust manifolds to improve packaging and allow for the ability to keep flow attached.

In some embodiments, the architectural geometry of the valve members and the cylinder head can be configured to optimize performance and packaging over the operating range and life of the engine. The valve members, such as any of the valve members described herein, can be packaged in many different configurations depending on the primary need of the intended design. This flexibility allows for very accommodating and unique capabilities to meet customer performance and packaging requirements. For example, the valve members can include a cross flow design, a non-cross flow design, longitudinal flow, log manifold, boot-heel valve packaging, various valve seat angles (wedge angles), removable valve seats, head resurfacing for re-work, packaging considerations for a GDI injector next to an exhaust header, and/or spray angles and spark plug interactions for GDI.

Figure 14:
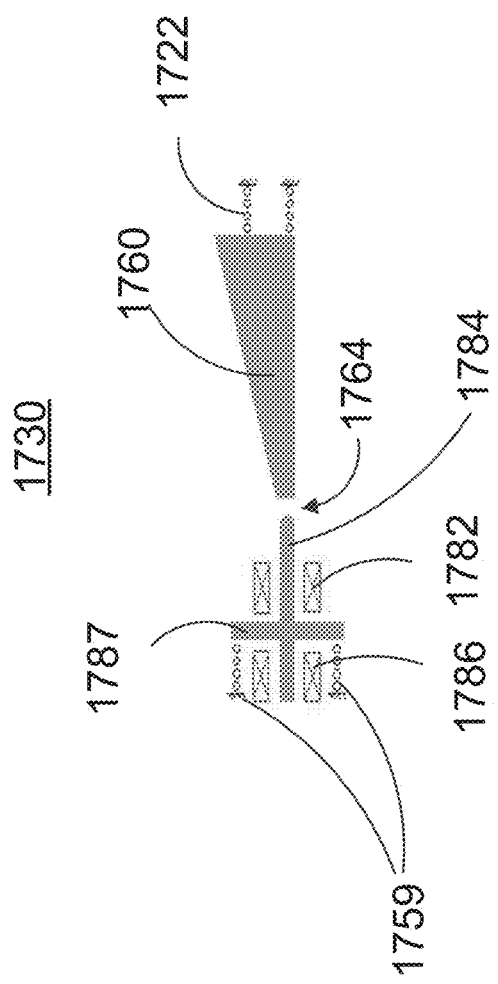
FIG. 14 is a schematic illustration of a valve system, according to an embodiment.

In some embodiments, a system includes a centrally-biased-spring-return actuator controlled engine valve system. The system minimizes packaging, friction, alignment issues and cost. FIG. 14 illustrates a system including a cylinder head assembly 1730 where the design locates two actuators (e.g., both an open and a close holding solenoid, 1782 and 1786, respectively) and a return spring 1759 on the nose-end side of the valve member 1760 while retaining a lash feature. The combined actuator includes one armature 1787 rather than separate actuators. A second spring 1722 is located on the opposite side of the valve member 1760, as shown in FIG. 14. The lash area 1764 combines an optional lash zone and guidance separation location. The actuator's armature 1787 is mechanically guided separately from the valve's guidance. The spring locations keep the armature 1787 and the valve member 1760 together throughout the opening and closing cycle. Said another way, the springs 1759 and 1722 are center-biased, keeping the two bodies (i.e., the valve member 1760 and the force application member 1784) in contact, except on the seat, as shown in FIG. 14. The configuration's opening spring contributes to high velocities prior to lash gap takeup, leading to lower required gaps. The design also contributes to easier actuation access sealing. The springs 1759 and 1722 can be sized to have appropriate forces at end-of-travel, controlling typical valve bounce. With respect to alignment, the system has clean divorce of actuator and valve movement centerlines and guidance. Including only one armature 1787 reduces the mass of the system and the number of connections. When the lash 1764 is adjusted to zero, the system is center-biased and there is low friction connection. The system includes easy valve seal on the armature. The slidehammer can be easily adjusted. Additionally, the slidehammer can directly act on the valve member. Impulse can be directed through the valve's center-of-gravity.

In some embodiments, compression pulses can be reduced or eliminated during engine starting or stopping transients for the purpose of improved noise, vibration, and harshness (NVH) through the use of specific intake and/or exhaust valve timing. This is a common disturbance for automotive hybrid powertrains, including simple start/stop systems used for improved fuel economy. The systems described herein allow completely decoupled valve events relative to piston/crankshaft position, from both dynamic timing and valve-to-piston clearance perspectives, and can change function strategy cycle-by-cycle and cylinder-by-cylinder. As such, either/both intake and exhaust valve timing can be adjusted in various strategies to negate cylinder compression and its attendant engine dynamic motion. One strategy embodiment would allow the intake air charge normally drawn into the cylinder to return to the intake manifold during the compression stroke, while then opening the exhaust valve during the "power' stroke to similarly recirculate exhaust gas. Variations and permutations of this strategy are numerous, depending upon emission, engine configuration, noise, and other factors. Typical engine starts in dynamic hybrid or start/stop driving operation can be either urgently fast or transparently subdued. The systems described herein facilitate either type of start by allowing a range in the number of engine compression events to be suppressed while the engine reaches an optimal target speed before normal valve timing is returned and combustion resumes. Engine shut-off can be a combination of normal compression or compression release free spin down.

In some embodiments, transient combustion power generation can be managed during gasoline engine starts using throttle-less fully-flexible intake valve control. This is a common disturbance for automotive hybrid powertrains, including simple start/stop systems used for improved fuel economy. Conventionally throttled gasoline hybrid and start/stop automotive powertrains often restart the engine with crankshaft motion of less than one revolution. The initial firing cylinder charge may be at nearly atmospheric pressure, resulting in a large combustion power pulse. This is due to intake manifold volume, below the throttle, shared by all cylinders. Subsequent firing cylinders have incrementally reduced power pulses as the intake manifold is evacuated. The system described herein allows fully flexible intake and exhaust valve timing/flow, and can change function strategy cycle-by-cycle and cylinder-by-cylinder. This control method commands the first viable combustion cylinder, and subsequent cylinders, to have reduced power via the cylinder-mounted valve member. Numerous throttle-less control strategies using valve timing can be executed to deliver the requested power levels. The return to normal engine power can be a pre-defined transition profile, depending upon driver and overall vehicle desired response characteristic. Thus, the systems described herein can provide a smooth, repeatable engine start for vehicle drivability improvement.

In some embodiments, open loop control of a solenoid actuated air valve (such as any of the valve members described herein) can be used to achieve desired valve motion, timing, velocity and engine performance. The open loop control of a solenoid(s) actuated air valve to achieve desired valve timing, valve motion, velocity, electrical power consumption, and/or specific engine performance by controlling the timing and shape of solenoid current waveforms referred to here as kicker and catcher pulses. These open loop algorithms may consist of such features as fixed pre-calibrated maps for determining kicker and catcher pulse shape, timing, count, etc. These open loop algorithms may utilize such engine operating parameters such as speed, temperature, load, accelerator pedal position, etc. for indexing this pre-calibrated tables.

In some embodiments, implementation of kick and catch closed loop control algorithms for controlling a solenoid actuated air valve (such as any of the valve members described herein) can be used to achieve desired valve motion, timing, velocity and engine performance. Multiple control algorithms can be employed in the control of a solenoid(s) actuated air valve to achieve desired valve timing, valve motion, velocity, and/or specific engine performance by controlling the timing and shape of solenoid current waveforms referred to here as kicker and catcher pulses. Some of these control methodologies include: adjusting current on off timings to achieve desired open and close timings of the valves, adjusting kicker pulse peak current level and duration as well as adjusting (e.g., reducing) catcher pulse peak level and duration reduce in order to reduce electric power consumption, adjusting kicker and/or catcher to reduce travel time, adjusting catcher pulse peak level and duration to reduce impact velocity and ringing/overshoot, controlling kicker pulse characteristics to achieve desired valve velocity during valve stroke and then controlling the catcher pulse to set seating velocity, optimizing algorithms to improve energy consumption, state space or optimal control to handle inner outer loop inner play, slow and fast loop rates to reduce multiple control loop interaction, and/or use of fixed timing points on valve stroke for timing control for example the point on the valve stroke where the valve starts and stops breathing.

In some embodiments, closed loop control of a solenoid actuated air valve (such as any of the valve members described herein) can be used to achieve desired valve motion, timing, velocity, and engine performance. The closed loop control of a solenoid(s)-actuated air valve to achieve desired valve timing, valve motion, velocity, and/or specific engine performance can be achieved by controlling the timing and shape of solenoid current waveforms referred to here as kicker and catcher pulses. These control algorithms may utilize standard direct sensing methods such as analog or limit sensors on valve position or more indirect sensing methods like cylinder pressure, back EMF, induced currents in the active and not-active coils, knock sensors, etc. for feedback purposes. These control algorithms can consist of multiple control methodologies such as PID, feed forward, dynamic programming, neural networks, fuzzy logic, adaptive, model reference adaptive, h-infinity, sliding mode, gain scheduling, kalman filters, observers, and/or estimators.

In some embodiments, the sealing surfaces of a cylinder head flat tapered valve pocket/seat can be defined. This will call out the surface that is causing the valve to achieve zero clearance at seal up using a flat taper. In some embodiments, sealing surfaces can be defined using the chamber bridges as well as the top of the valve and exit bridges. These also act as cooling contact surfaces to remove heat from the parts during operation.

In some embodiments, the cylinder head assemblies described herein can be testable modules.

Figure 15:
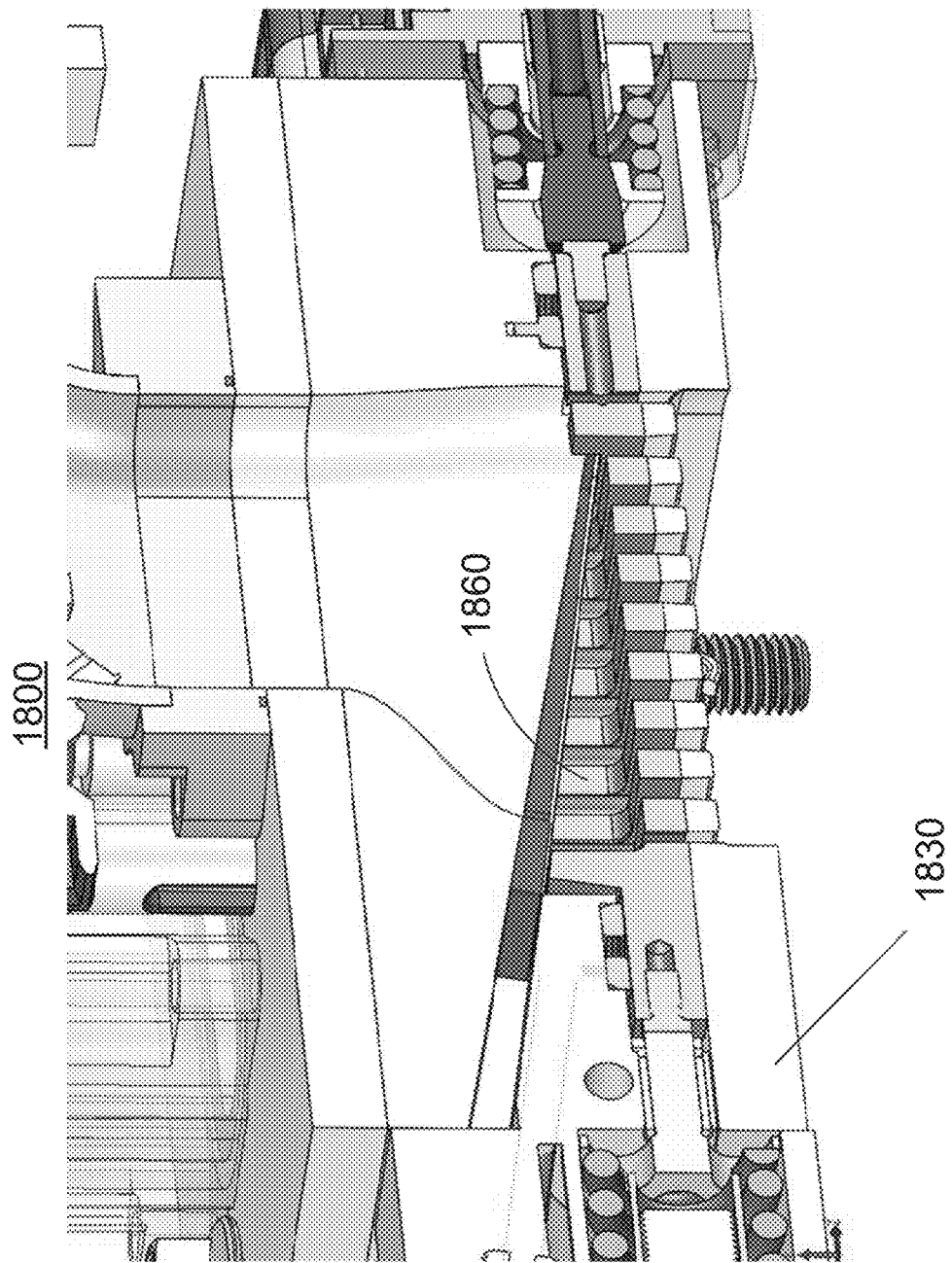
FIG. 15 is a perspective view of a cylinder head assembly, according to an embodiment.

In some embodiments, the cylinder head assemblies described herein can be oil-less modules. An example cylinder head assembly 1830 in an engine 1800 is illustrated in FIG. 15. As shown in FIG. 15, the design of the valve member 1860, which can be the same or similar in structure and/or function to any of the valve members described herein, with the motion perpendicular to the cylinder bore places the valve guides and actuation device out of the flow path of the exhaust gas. This enables cooling of the components to a lower temperature which enables the use of non-lubricated low friction bushing materials. The linear action method eliminates the need for rotating components (such as the camshaft) and sliding wear areas (such as rocker to valve interface) which require hydrodynamic lubrication and/or oil to reduce friction and wear between sliding components.

In some embodiments, the center-biased electromagnetic actuation of a valve member can reduce power consumption and lower seating velocities on both the opening and closing of the valve. The actuator architecture can optionally include a lash distance between the armature and the valve (i.e., slidehammer gap). In some embodiments, as shown in an example cylinder head assembly 1930 in FIG. 16, the actuator architecture can include a push-open, spring return. In such embodiments, both the opening coil 1982 and the closing coil 1986 are located on the armature 1987. The opening spring 1959 is located on the armature, and the closing spring 1922 is located on the opposite side of the valve on the 'push-closed shaft' 1989. Placing both coils on the armature allows for the implementation of a lash distance 1964, where the armature 1987 is pulled away from the valve member 1960 when in the closed position, so that it can provide an impact force to initiate the next valve opening event. Because the motive forces on the valve are provided by separate pieces, alignment concerns are mitigated.

In some embodiments, as shown in the example cylinder assembly 2030 in FIG. 17, the actuator architecture can include a push-pull 2065 with integrated slidehammer 2070 such that only an opening coil 2082 is on the armature 2069. In such embodiments, the valve member 2060 is centered by opening springs 2059 and closing springs 2022 acting directly on the valve body 2060. The closing armature 2087 is also on the valve body. The closing coil 2086 is on the armature 2087 connected directly to the valve member 2060. The opening coil 2082 is on the armature 2069, the geometry of which has a built-in lash to provide the slidehammer effect. The armature 2069 also has a small biasing spring 2066 to move it to the correct position between valve events. All the motive forces (coils and springs) are located on one side of the valve member 2060, which is beneficial from a packaging perspective.

In some embodiments, as shown in the example cylinder assembly 2130 in FIG. 18, the actuator architecture can include a push-pull 2165 with integrated slidehammer 2170, with all springs/coils on the armature 2169. In such embodiments, the basic geometry of the assembly 2130 is the same as the assembly 2030 in FIG. 17, except that all the springs and coils are located on the armature 2169. That is, the opening and closing coils 2182 and 2186, respectively, as well as the opening and closing springs, 2159 and 2122, respectively, are located on the armature 2169. The armature 2169 provides all the force to the valve 2160, through the armature 2187 which is connected directly to the valve member 2160. The armature 2169 is shaped so that is has a built-in lash as shown in FIG. 18. Therefore the spring-centering occurs via the armature 2169.

In some embodiments, as shown in the example cylinder assembly 2230 in FIG. 19, the actuator architecture can include a push-pull 2265 with integrated slidehammer 2270, where both the opening and the closing coils, 2282 and 2286 respectively, are located on the armature 2269. However, one spring, for example, the opening spring 2259, is located on the valve member 2260, and one spring, for example, the closing spring 2222, is located on the armature 2269. This concept is very similar to that of the architecture of the cylinder assembly 2130 illustrated in FIG. 18, except that the opening spring 2259 is located on the valve body 2260 rather than the armature 2269. The spring-centering therefore is split between the two pieces, the valve 2260 and the armature 2269.

In some embodiments, as in the example cylinder assembly 2330 shown in FIG. 20, the actuator architecture can include a push-push 2365, spring-inward, with slidehammer 2370. This concept uses two armatures 2388 and 2389 on either side of the valve 2360 to push on it. The armature 2389 on the right side has the closing spring 2322 and the opening coil 2382. The armature on the left side is split into two pieces 2388A and 2388B. The piece 2388A in contact with the valve 2360 has the opening spring 2359, the piece 2388B has the closing coil 2386, and a small biasing spring 2366 so that the valve 2360 resets to the correct position between valve events. The valve 2360 is therefore centered via the closing springs and opening springs on the two armatures, which are always in contact with the valve.

In some embodiments, as shown in the example assembly 2430 in FIG. 21, the actuator architecture can include a push-pull 2465 without slidehammer. In some embodiments, a lash, or slidehammer gap, may not be needed. This architecture has a single moving body. The armature 2487, with both springs, 2422 and 2459, and both coils, 2482 and 2486, is rigidly fixed to the valve 2460.

In some embodiments, as shown in the example assembly 2530 in FIG. 22, the actuator architecture can include a push-push 2565 without slidehammer. In some embodiments, a lash, or slidehammer gap, may not be needed. This architecture utilizes two armatures, 2587 and 2589, one on either side of the valve 2560, each of the armatures with a coil and spring. For example, the armature 2587 with the closing spring 2522 and the opening coil 2582, and/or the armature 2587 with the opening spring 2559 and the closing coil 2586. There is no lash between the armatures and valves, so the 3 bodies stay in contact at all times, and thus are centered together.

Figure 23:
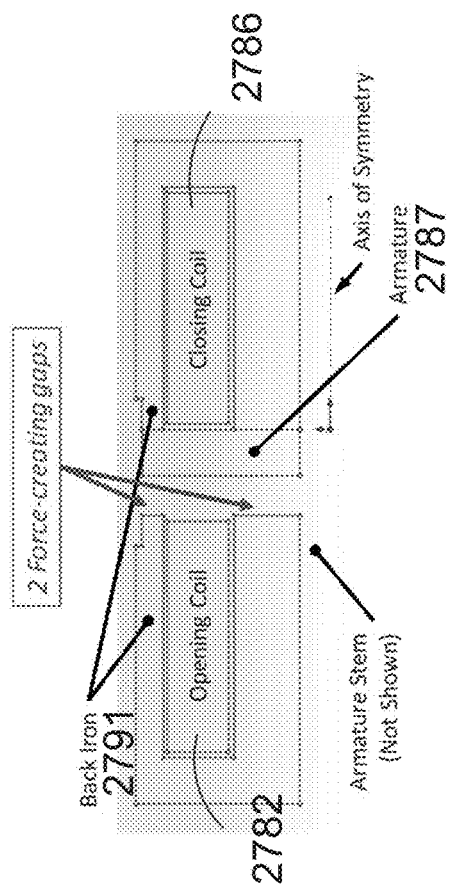
FIG. 23 is a schematic illustration of a valve actuator, according to an embodiment.

In some embodiments, the geometry of the actuator gap can be optimized to provide a favorable force output, power consumption, and controllability of the system. For example, as shown in the cylinder assembly 2630 in FIG. 23, a single-gap geometry can be implemented. This actuator geometry utilizes a single force-creating gap between the armature 2687 and the backiron 2691 for generating electromagnetic force. The primary benefit to this design is greater force when the gap is larger. FIG. 23 shows an axi-symmetric cross-section.

Figure 24:
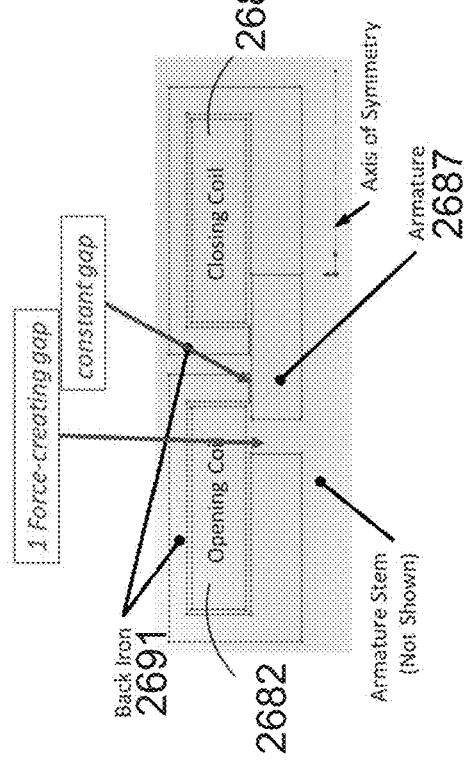
FIG. 24 is a schematic illustration of a valve actuator, according to an embodiment.

In some embodiments, as shown in FIG. 24, a double-gap geometry can be implemented. In the example cylinder assembly 2730 in FIG. 24 the actuator geometry utilizes two force-creating gaps between the armature 2787 and the backiron 2791 for generating electromagnetic force. The primary benefit to this design is greater force when the gap is very small. This graphic shows an axi-symmetric cross-section.

In some embodiments, a tapered armature can be included, as shown in the example cylinder assembly 2830 illustrated in FIG. 25. The moving mass of the system, including the actuator, can be minimized to achieve fast valve motion with less power consumption. One way to do this is to use a tapered (i.e., conical-shaped) armature 2887. The mass of the armature is reduced, with only a slight angle added to the solid pieces. The change to the electromagnetic force is negligible compared to the benefit of the reduced mass. This graphic shows an axi-symmetric cross-section.

Figure 26:
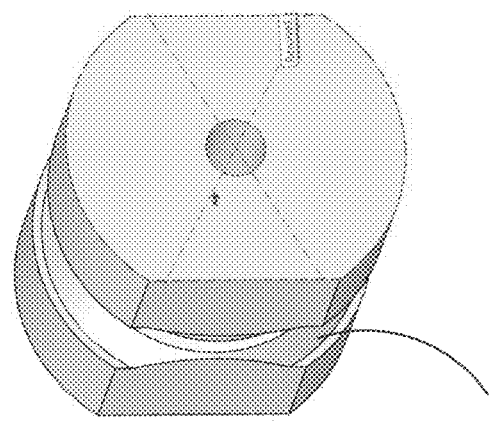
FIG. 26 is a perspective view of an actuator backiron, according to an embodiment.

In some embodiments, the geometry of an electromagnetic actuator backiron can be optimized to provide a favorable force output, power consumption, and controllability of the system, depending on the desired actuator characteristics (e.g., high force, fast rise time). For example, as shown in FIG. 26, the backiron 2991 can be non-axisymmetric. The actuator may have a packaging constraint. For example, the actuator may have a maximum diameter such that several actuators can be placed side-by-side. Additional backiron can be added by using a shape that is rectangular or square, rather than axisymmetric. Additionally, the armature shape could be made to match the backiron.

Figure 27:
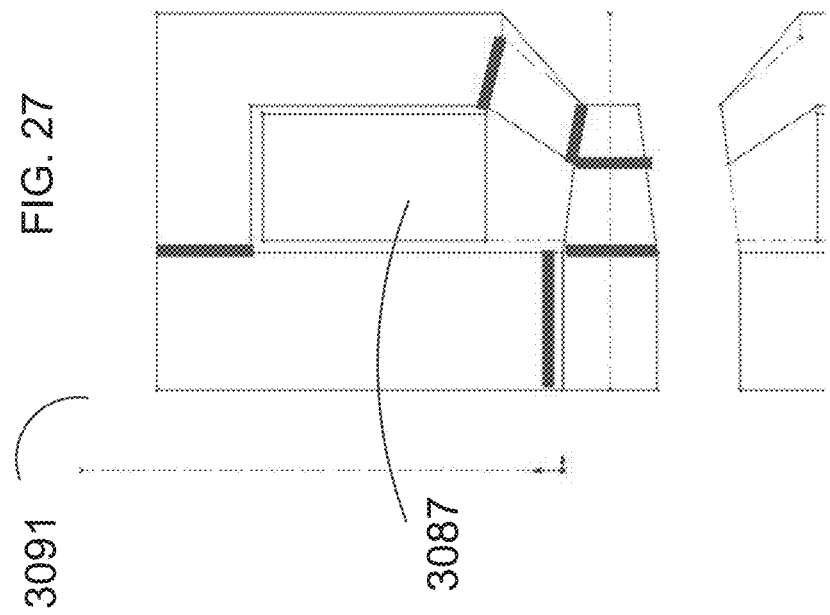
FIG. 27 is a schematic illustration of a portion of a backiron, according to an embodiment.

In some embodiments, a flux bender can be included. The area of the backiron 3091 can be increased, while keeping the armature the same. The electromagnetic flux is directed from the outside of the backiron to the smaller dimension armature via an angled piece. This increases the backiron flux path area, while keeping the pole area and thus the armature mass the same. An axi-symmetric cross-section is shown in FIG. 27, with a backiron 3091 and an armature 3087.

In some embodiments, the backiron can be formed of a material chosen to achieve favorable actuator characteristics. For example, the backiron can be formed from 1006 steel, 1018 steel, 1215 steel, pure iron, and/or 4140 steel.

In some embodiments, power electronics can be integrated on a cylinder head. For example, power electronics can be integrated on any of the cylinder heads described herein. For example, amplifiers and controls (e.g., all of the amplifiers and controls necessary for the operation of a cylinder assembly) can be disposed on a cylinder head of the cylinder assembly to reduce and/or simplify the wiring harness and connection details. In some embodiments, the on-head power electronics can result in the cylinder assembly being a single testable unit. In some embodiments, all electronics can be oriented on the "cold" intake side of the cylinder head for protection from the heat. In some embodiments, the electronics and/or actuators can be cooled by a cylinder head water jacket. In some embodiments, all of the return housings and/or springs can be oriented on the "hot" exhaust side of a cylinder head (such as any of the cylinder heads described herein) since they are insensitive to the potentially hotter environment.

In some embodiments, an actuator assembly, such as any of the actuator assemblies described herein, can include one or more valve position sensors.

In some embodiments, a cylinder head (such as any of the cylinder heads described herein) can be made of one material. In some embodiments, the head can be made of two or more materials. For example, the head can be made of two or more materials such that the head has reduced weight, only having a heavier material in particular places or particular areas. For example, a heavier material can be used in only high wear areas (e.g., CGI valve seats and an aluminum head).

In some embodiments, each return housing of a group of return housings (such as any of the return housings described herein) can be installed on a cylinder head or combination of cylinder heads individually. In some embodiments, a number of return housings can be installed as a group. In some embodiments, a single snap ring can be used to couple a return housing to a cylinder head. In some embodiments, a return assembly (such as any of the return assemblies described herein) can include a return housing incorporating a seal to keep combustion particles out of the dead volume.

In some embodiments, a center bridge can be disposed between an intake valve pocket and an exhaust valve pocket of a cylinder head (such as any of the cylinder heads described herein). The center bridge can be shaped and sized to allow flexibility for location of a dual spark plug, a pressure transducer, and/or other components between the intake valve pocket and the exhaust valve pocket.

In some embodiments, a total integrated package including a cylinder head assembly such as any of the cylinder head assemblies described herein can be about 4 inches lower and about 1 inch shorter than a conventional OHC cylinder head for in-chassis packaging benefits.

In some embodiments, the injector can be positioned in the section of the cylinder head positioned between the reciprocating valve members. This placement allows positioning of the injector to be anywhere ranging from a centered location down to low angle injection points. The location of the injector can be associated with the appropriate spark plug location to take advantage of the fuel/air mixture characteristics to control combustion characteristic and high heat transfer areas during the combustion event.

In some embodiments, a spring or springs associated with an actuation assembly (such as any of the actuation assemblies described herein) can be set to locate a valve member (such as any of the valve members described herein) slightly off center. Locating the valve member in a neutral position that is slightly off center can change the velocity profile of the valve member and the power required to each coil of the actuation assembly to alter the location or position of the valve member. Thus, the necessary energy can be reduced for one particular coil (e.g., the open coil or close coil), the flank velocity can be changed, and varied seating velocities can be enabled while minimizing total electrical power to the system.

In some embodiments, a valve member (such as any of the valve members described herein) can be oscillated during startup of an engine and/or a cylinder head assembly to reduce the required maximum coil force from an actuation assembly. Said another way, oscillating the valve member one or more oscillations can reduce the force required from the coil to get the engine valve member into the desired open and/or closed position for initiating start of engine operation.

In some embodiments, one or both coils in an actuation assembly, such as any of the actuation assemblies described herein, can be bobbin-less, allowing for more turns in tighter packaging.

FIG. 28 shows a cross-sectional front view of a portion of an engine 800 including a cylinder head assembly capable of performing fully variable valve actuation, according to an embodiment. The engine 800 includes an engine block 802 and a cylinder head assembly 830 coupled to the engine block 802. The engine block 802 defines or includes a cylinder 803 having a longitudinal axis Lc. A piston (not shown) can be disposed within the cylinder 803 such that it can reciprocate along the longitudinal axis Lc of the cylinder 803. The piston can be coupled by a connecting rod (not shown) to a crankshaft (not shown) having an offset throw (not shown) such that as the piston reciprocates within the cylinder 803, the crankshaft is rotated about its longitudinal axis (not shown). In this manner, the reciprocating motion of the piston can be converted into a rotational motion.

A first surface 835 of the cylinder head assembly 830 can be coupled to the engine block 802 such that a portion of the first surface 835 covers the upper portion of the cylinder 803 thereby forming a combustion chamber 809. Although the portion of the first surface 835 covering the cylinder 803 is shown as being flat (and, in some embodiments, lies parallel to the top surface of the piston within the combustion chamber 109), in some embodiments, because the cylinder head assembly 830 does not include valves that protrude into the combustion chamber, the surface of the cylinder head assembly forming part of the combustion chamber can have any suitable geometric design. For example, in some embodiments, the surface of the cylinder head assembly forming part of the combustion chamber can be curved and angularly offset from the top surface of the piston. In other embodiments, the surface of the cylinder head assembly forming part of the combustion chamber can be curved to form a hemispherical combustion chamber, a pent-roof combustion chamber or the like.

An exhaust gas manifold 810E defining an interior area or port 812 is coupled to a second surface 836 of the cylinder head assembly 830 such that the interior area 812 of the gas manifold 810 is in fluid communication with a valve pocket 838 (described below) via an exhaust port 839 in the second surface 836. As described in detail herein, this arrangement allows a gas, such as, for example air or combustion by-products, to be transported out of the cylinder 803 via the cylinder head assembly 830 and the gas manifold 810. The engine 800 also includes an intake gas manifold 810I coupled to the second surface 836 of the cylinder head 830 such that an interior area (not shown) of the intake gas manifold 810I is in fluid communication with a second valve pocket (not shown) via an intake port (not shown), and thus the intake gas manifold 810I can be in fluid communication with the cylinder 803. Although shown as including two gas manifolds 810E and 810I, in some embodiments, an engine can include one gas manifold or more than two gas manifolds.

Moreover, as shown, in some embodiments the first surface 835 of the cylinder head assembly 830 can be opposite the second surface 836. In some embodiments, the cylinder head assembly 830 is arranged such that the flow of gas into and/or out of the cylinder 803 can occur along a substantially straight line. In such an arrangement, a fuel injector 890 can be disposed in the intake gas manifold 810I directly above intake cylinder flow passages (such as cylinder flow passages 148 described above with reference to engine 100). In this manner, the injected fuel can be conveyed into the cylinder 803 without being subjected to a series of bends. Eliminating bends along the fuel path can reduce fuel impingement and/or wall wetting, thereby leading to more efficient engine performance, such as, for example, improved transient response.

The cylinder head assembly 830 includes a cylinder head 832 and a valve member 860. The cylinder head 832 has a cylinder bridge portion 894 (also referred to as a cylinder flow passage portion or a cylinder bridge). The cylinder bridge 894 of the cylinder head 832 has an interior surface 834 that defines a valve pocket 838 having a longitudinal axis Lp. The cylinder bridge 894 can define the bottom of the valve pocket 838 and at least a portion of the top of the combustion chamber 809. The cylinder bridge 894 also defines nine cylinder flow passages 848. Each of the cylinder flow passages 848 is adjacent the first surface 835 of the cylinder head 832 and is in fluid communication with the interior of the cylinder 803. Additionally, each of the cylinder flow passages 848 can be in fluid communication with the valve pocket 838 in a condition where the cylinder flow passages 848 are not obstructed by the valve member 860. The cylinder bridge 894 also includes a number of sealing portions 855 which can define the cylinder flow passages 848.

The valve member 860 has a flow passage portion 862 (also referred to herein as a valve bridge or valve bridge portion), a first stem portion 876, and a second stem portion 877. The valve member 860 can have an outer wall with a partially tapered shape, as shown in FIG. 28. The first stem portion 876 is coupled to an end of the flow passage portion 862 of the valve member 860 and is configured to engage a first plug 878. The first plug 878 is configured to engage with an actuator assembly 880 (also referred to herein as a solenoid assembly). The solenoid assembly 880 can be the same or similar in structure and/or function as the solenoid assembly 180 described above with reference to FIGS. 1-3. The second stem portion 877 is coupled to an end of the flow passage portion 862 opposite from the first stem portion 876 and is configured to engage a second plug 879. The second plug 879 is configured to engage with a spring assembly 820 (also referred to herein as a return assembly).

The solenoid assembly 880 includes an armature 881, a connecting rod 883, a force application member 884, and a spring 885. The solenoid assembly 880 also includes an electromagnetic open coil 882 and an electromagnetic close coil 886. The force application member 884 is configured to engage with the first plug 878 such that a force applied to the first plug 878 can cause movement of the valve member 860. The engagement between the force application member 884 and the first plug 878 can be abutting contact. Said another way, the force application member 884 and the first plug 878 can include no articulated joint or interlocking features. In other embodiments, the engagement between the force application member 884 and the first plug 878 and/or the valve member 860 can include interlocking features.

The spring assembly 820 includes a spring 822 and a spring force application member 821. The spring 822 can be configured to elastically deform and be biased toward an expanded configuration. The spring force application member 821 can be formed of an inelastic, stiff material. For example, the spring force application member 821 can be formed of steel and/or titanium. The spring force application member 821 is configured to engage with the second plug 879 such that a force applied to the second plug 879 by the spring assembly 820 (e.g., due to being biased toward an expanded configuration) can cause movement of the valve member 860. The engagement between the spring force application member 821 and the second plug 879 can be abutting contact. Said another way, the spring force application member 821 and the second plug 879 can include no articulated joint or interlocking features. In other embodiments, the engagement between the spring force application member 821 and the second plug 879 and/or the valve member 860 can include interlocking features.

The flow passage portion 862 of the valve member 860 defines nine flow passages 868 therethrough. The flow passage portion 862 includes a number of sealing portions 872, each of which is disposed adjacent one of the flow passages 868 and disposed on and/or includes a bottom surface 863 of the flow passage portion 862. In some embodiments, the sealing portions 872 define the openings to the flow passages 868 on the bottom surface 863 of the flow passage portion 862. The valve member 860 is disposed within the valve pocket 838 such that the flow passage portion 862 of the valve member 860 can be moved along a longitudinal axis Lv of the valve member 860 within the valve pocket 838. For example, the solenoid assembly 880 can be configured to apply a first force to the first plug 878 such that the valve member 860 shifts in the direction of arrow D. Similarly, the solenoid assembly 880 can be configured to apply a second force to the force application member 884 such that the force application member shifts in the direction of arrow C, causing the valve member 860 to also shift in the direction of arrow C under the force of the spring assembly 820. Said another way, the spring assembly 820 can be configured to apply a force to the second plug 879 such that the valve member 860 shifts in the direction of arrow C.

The spring 822 and the spring 885 can both be biased toward the valve member 860 (i.e., the spring 822 and the spring 885 are both center-biased). Thus, in a configuration in which no current is applied to the armature 881 of the solenoid assembly 880 (i.e., no current is applied to the open coil 882 or the close coil 886), the spring forces applied to the valve member 860 by the spring 885 and the spring 822 will cause the valve member 860 to be center-biased in a neutral position such that the valve member 860 is disposed in a centered or substantially centered position relative to the cylinder head 832 and the valve member 860 is partially open. In other words, the flow passages 868 can be partially aligned with the flow passages 848 such that at least a portion of the cylinder-side opening to each flow passage 868 is in fluid communication with a flow passage 848 and a portion of the cylinder-side opening to each flow passage 868 is obstructed, blocked, or closed by a sealing portion 855. In some embodiments, the spring 822 and the spring 885 can be biased toward the valve member 860 such that in the absence of a current applied to the coils 882, 886 of the solenoid assembly 880, the valve member 860 is disposed halfway between the location of the valve member 860 in an open position (e.g., the position of the valve member 860 when a current is applied to the open coil 882) and the location of the valve member 860 in a closed position (e.g., the position of the valve member 860 when a current is applied to the close coil 886).

In some embodiments, the spring 822 and the spring 885 can be biased toward the valve member 860 such that in the absence of a current applied to the coils 882, 886 of the solenoid assembly 880, the valve member 860 is disposed partway along the translation path between the location of the valve member 860 in an open position (e.g., the position of the valve member 860 when a current is applied to the open coil 882) and the location of the valve member 860 in a closed position (e.g., the position of the valve member 860 when a current is applied to the close coil 886). In some embodiments, the valve member 860 can be positioned closer to the open position, closer to the closed position, or at the midway point. In some embodiments, one or more flow passages 868 of the valve member 860 can be partially obstructed by a sealing portion 872 of the flow passage portion 862. In some embodiments, the offset in central axes between the flow passages 868 and the sealing portions 872 when the valve member 860 is in the neutral position can result in the openings of the flow passages 868 in the bottom surface 863 of the flow passage portion 862 being about 50% obstructed, more than 50% obstructed, or less than 50% obstructed.

As shown in the configuration of FIG. 28, when the solenoid assembly 880 is actuated such that current is delivered to the open coil 882, the armature 881 can be configured to shift toward the open coil 882, allowing the connecting rod 883 and the force application member 884 to move into force-applying contact with the first plug 878 as a result of the force from spring 885. Thus, the valve member 860 can be pushed by the force application member 884 in the direction of arrow D against the force applied by spring 822 such that the flow passages 868 are in alignment with the flow passages 848 (as shown by the configuration illustrated in FIG. 28). When the flow passages 868 are in alignment with the flow passages 848, each of the flow passages 868 can be in fluid communication with one of the cylinder flow passages 848. In this manner, the exhaust gas manifold 810E is in fluid communication with the cylinder 803 via the flow passages 868, 848. When the current is removed from the open coil 882, a return force applied by the spring 822 in combination with the spring force application member 821 can push the valve member 860 in the direction of arrow C such that the valve member 860 returns to the equilibrium position.

When the solenoid assembly 880 is actuated such that current is delivered to the close coil 886, the armature 881 can be configured to shift toward the close coil 886, moving the connecting rod 883 and the force application member 884 in the direction of arrow C against the force of spring 885 and reducing the force applied on the first plug 878 by the force application member 884. Due to the reduced force applied on the first plug 878 by the force application member 884, the valve member 860 can be pushed by the spring assembly 820 in the direction of arrow C such that the flow passages 868 are out of alignment with the flow passages 848. In other words, the valve member 860 can be disposed such that the flow passages 868 are sealed from the combustion chamber 109 by the sealing portions 872. Moreover, when each flow passage 868 is offset from the corresponding cylinder flow passage 848, each flow passage 868 is fluidically isolated from the cylinder flow passages 848. In this manner, the cylinder 803 is fluidically isolated from the gas manifold 810. When the current is removed from the close coil 886, a return force applied by the spring 885 in combination with the force application member 884 can push the valve member 860 in the direction of arrow D against the force of the spring assembly 820 such that the valve member 860 returns to the equilibrium position.

In some embodiments, the solenoid assembly 880 can be actuated to apply a "boost pulse" to the valve member 860. For example, a current can be delivered to one of the open coil 882 or the close coil 886 to assist movement of the valve (e.g., to overcome friction forces).

Although the longitudinal axis Lc of the cylinder 803 is shown as being substantially normal to the longitudinal axis Lp of the valve pocket 838 and the longitudinal axis Lv of the valve 860, in some embodiments, the longitudinal axis of the cylinder can be offset from the longitudinal axis of the valve pocket and/or the longitudinal axis of the valve member by an angle other than 90 degrees.

Although the flow passages 868 and the cylinder flow passages 848 are shown as having particular shapes in FIG. 28, the flow passages 868 and the cylinder flow passages 848 can have any suitable shape. FIG. 28 shows the flow passages 868 having rounded tops. When aligned as in FIG. 28, the flow passages 868 and the cylinder flow passages 848 can have a combined converging/diverging shape. In some embodiments, when the valve member 860 is in the open configuration, at least one of the valve flow passages 868 can converge toward a corresponding cylinder flow passage 848, and the corresponding cylinder flow passage 848 can converge toward at least one of the valve flow passages 868. In some embodiments, the flow passages 868 and/or the cylinder flow passages 848 can be angled, for example, 5, 10, or 20 degrees relative to vertical to control the fluid motion inside the cylinder 803 when the piston inside the cylinder 803 is drawing down. In some embodiments, the flow passages 868 and/or the cylinder flow passages 848 can be angled between, for example, about 20 degrees and about 40 degrees relative to vertical. In some embodiments, the flow passages 868 and/or the cylinder flow passages 848 can be angled, for example, between about 5 degrees and about 20 degrees relative to vertical. The flow passages 868 and/or the cylinder flow passages 848 can have optimized shapes and sizes such that the fluid flow can be controlled to achieve a particular result. For example, tumble can occur such that air flows down one side of the cylinder 803, starts to rotate near the piston at the bottom of the cylinder, and then is collapsed and converted into turbulence such that fuel efficiency is improved.

The spring 822 and the spring 885 can be constructed from any suitable material, such as, for example, a stainless steel spring wire, and can be fabricated to produce a suitable biasing force. In some embodiments, however, a cylinder head assembly can include any suitable biasing member to ensure that that the valve member 860 can be moved among a center-biased equilibrium configuration, an opened configuration, and a closed configuration. For example, in some embodiments, a cylinder head assembly can include a cantilever spring, a Belleville spring, a leaf spring and the like.

Although the cylinder head 832 is shown and described as being a separate component coupled to the engine block 802, in some embodiments, the cylinder head 832 and the engine block 802 can be monolithically fabricated, thereby eliminating the need for a cylinder head gasket and cylinder head mounting bolts. In some embodiments, for example, the engine block and the cylinder head can be cast using a single mold and subsequently machined to include the cylinders, valve pockets and the like.

Although the engine 800 is shown and described as including a single cylinder, in some embodiments, an engine can include any number of cylinders in any arrangement. For example, in some embodiments, an engine can include any number of cylinders in an in-line arrangement. In other embodiments, any number of cylinders can be arranged in a vee configuration, an opposed configuration or a radial configuration.

Similarly, the engine 800 can employ any suitable thermodynamic cycle. Such engine types can include, for example, Diesel engines, spark ignition engines, homogeneous charge compression ignition (HCCI) engines, two-stroke engines and/or four stroke engines. Moreover, the engine 800 can include any suitable type of fuel injection system, such as, for example, multi-port fuel injection, direct injection into the cylinder, carburetion, and the like.

Figure 29B:
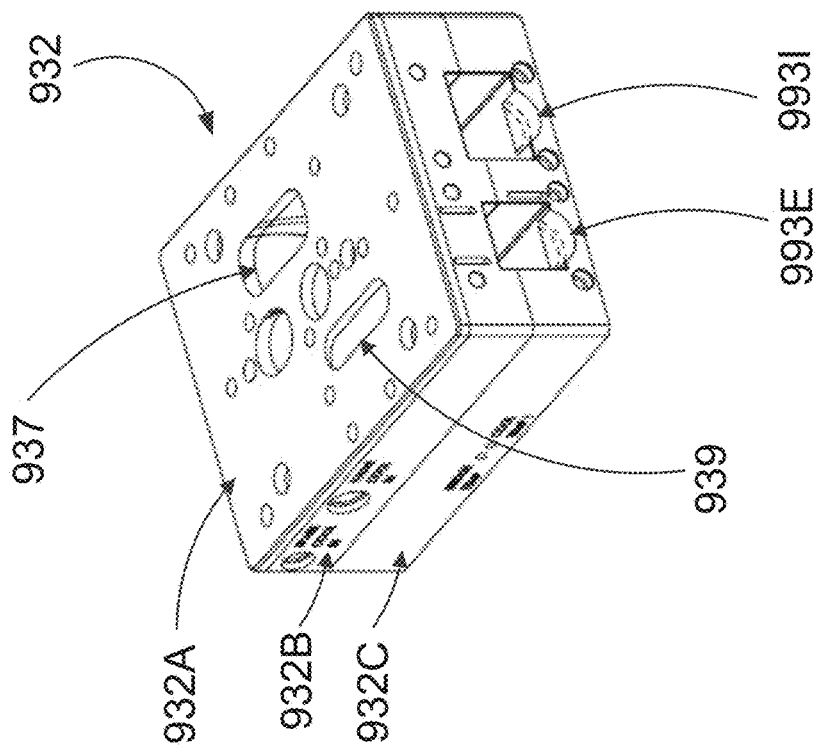
FIGS. 29A and 29B are a first perspective view and a second perspective view, respectively, of a cylinder head, according to an embodiment.
Figure 29A:
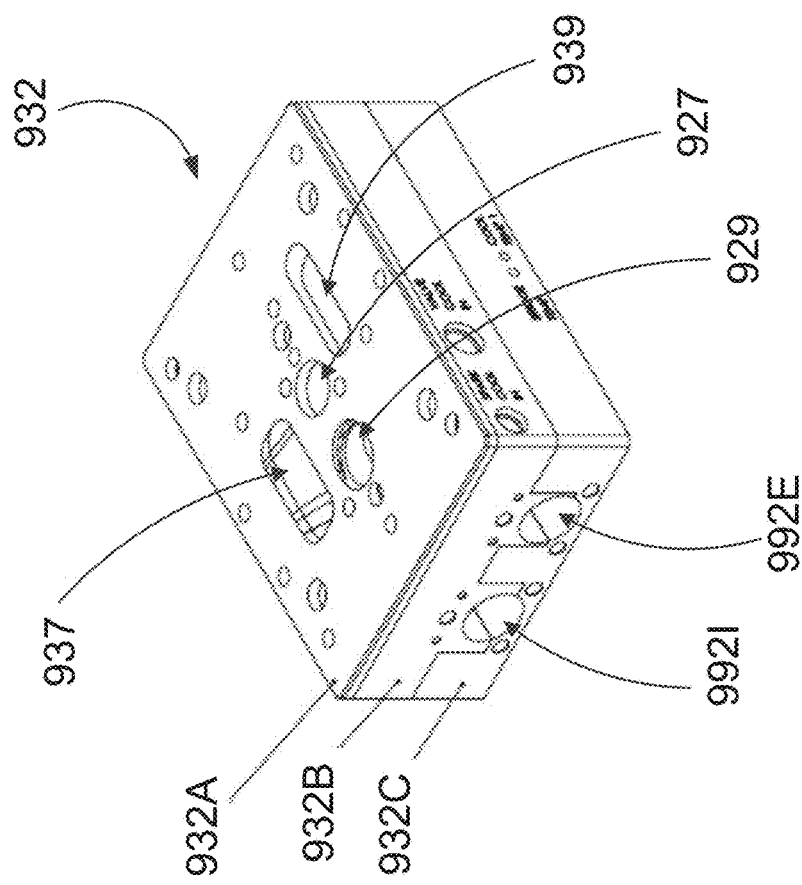

FIGS. 29A and 29B show a first perspective view and a second perspective view of a cylinder head 932, according to an embodiment. The cylinder head 932 can be the same or similar as any cylinder head described herein, such as the cylinder head 832 shown and described above with reference to FIG. 28. The cylinder head 932 includes a top layer 932A, a middle layer 932B, and a bottom layer 932C. The cylinder head 932 defines an intake port 937 and an exhaust port 939. The cylinder head 932 is configured to be coupled to an intake manifold such that the intake manifold is in fluid communication with the intake port 937 and to an exhaust manifold such that the exhaust manifold is in fluid communication with the exhaust port 939. Although the exhaust port 939 is shown as being narrower than the intake port 937, the exhaust port 939 and the intake port 937 can have any suitable size and/or shape. The cylinder head 932, and specifically the top layer 932A, can also define a spark plug port 927 and a fuel injector port 929 for engagement with a spark plug (not shown) and a fuel injector (not shown), respectively. Due to the arrangement of the intake valve pocket and the exhaust valve pocket within the cylinder head 932, a spark plug and a fuel injector can be positioned between the intake valve pocket and the exhaust valve pocket for communication with a combustion chamber, particular valve pocket, or port associated with the cylinder head 932.

The cylinder head 932 defines an intake actuator assembly port 992I and an exhaust actuator assembly port 992E. The intake actuator assembly port 992I and the exhaust actuator assembly port 992E can be configured to receive any of the actuator or solenoid assemblies described herein such that the actuator or solenoid assemblies can operably engage with an intake valve member (not shown) or an exhaust valve member (not shown) disposed within the cylinder head 932, respectively. Similarly, the cylinder head 932 defines an intake return assembly port 993I and an exhaust return assembly port 993E. The intake return assembly port 993I and the exhaust return assembly port 993E can be configured to receive any of the return or spring assemblies described herein such that the return or spring assemblies can operably engage with the intake valve member (not shown) or the exhaust valve member (not shown) disposed within the cylinder head 932, respectively.

FIGS. 29C and 29D show a top and bottom perspective view, respectively, of the bottom layer 932C of the cylinder head 932. As shown, the bottom layer 932C partially defines an intake valve pocket 938I and an exhaust valve pocket 938E. The bottom layer 932C includes an intake cylinder bridge 994I and an exhaust cylinder bridge 994E. The intake cylinder bridge 994I defines a number of flow passages 948I and the exhaust cylinder bridge 994E defines a number of flow passages 948E. As shown, the intake valve pocket 938I can be wider than the exhaust valve pocket 938E such that the intake valve pocket 938I can accommodate a wider valve member than the exhaust valve pocket 938E. However, in some embodiments, the intake valve pocket 938I and the exhaust valve pocket 938E can each be any suitable size and any suitable relative sizes.

Figure 29F:
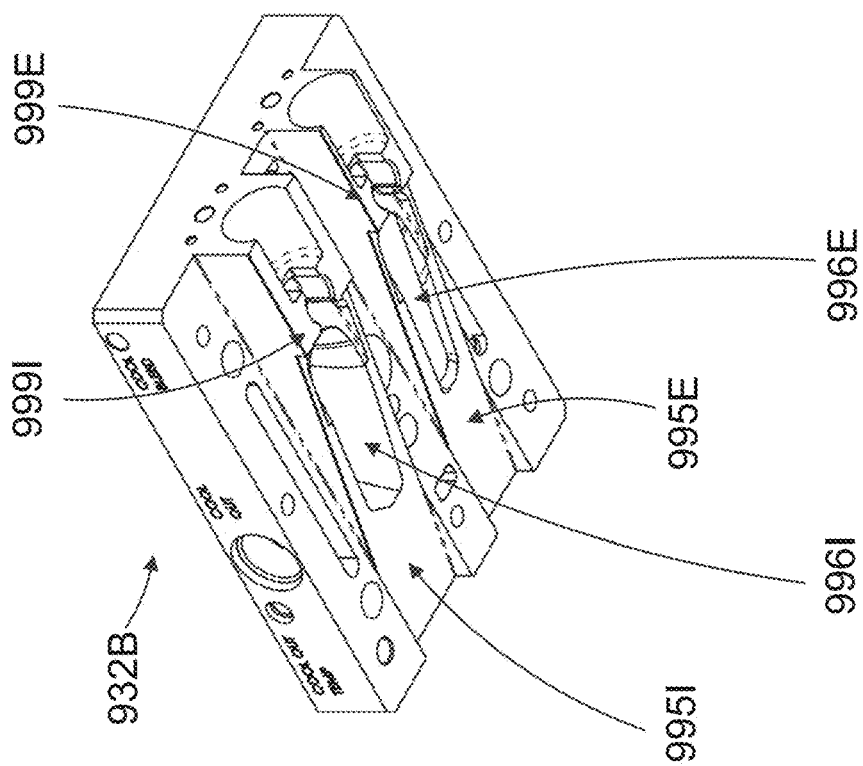
FIGS. 29E and 29F are a top perspective view and a bottom perspective view, respectively, of a middle layer of the cylinder head of FIG. 29A.
Figure 29E:
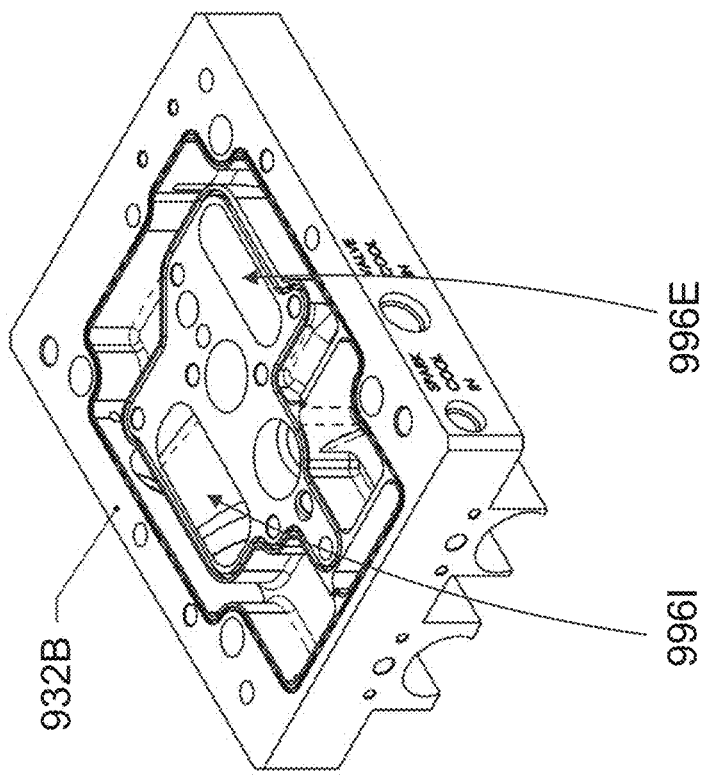

FIGS. 29E and 29F show a top and bottom perspective view, respectively, of the middle layer 932B. The middle layer 932B includes a first intake valve pocket upper surface 995I and a first exhaust valve pocket upper surface 995E. The middle layer 932B also includes a second intake valve pocket upper surface 999I and a second exhaust valve pocket upper surface 999E. The intake valve pocket upper surfaces 995I and 999I and the exhaust valve pocket upper surfaces 995E and 999E, when the middle layer 932B is in combination with the bottom layer 932C as shown in FIGS. 29A and 29B, each form a portion of the upper surface of the valve pockets of the cylinder head 932 and are configured to engage with an intake valve member and an exhaust valve member disposed within the valve pockets. The middle layer 932B also defines a first flow passage 996I and second flow passage 996E. The first flow passage 996I and the second flow passage 996E are configured such that, when the cylinder head 932 is assembled as shown in FIGS. 29A and 29B, the intake port 937 and the exhaust port 939 are in fluid communication with the flow passages 948I and 948E via the first flow passage 996I and the second flow passage 996E, respectively.

While the cylinder head 932 is shown and described as including a top layer, a middle layer, and a bottom layer, in some embodiments the cylinder head 932 may include any suitable number of layers. In some embodiments, the cylinder head 932 may include only two layers such that, for example, the top layer 932A and the middle layer 932 are formed as a unitary structure.

FIGS. 30A-30C are various views of an intake valve member 960I. Specifically, FIG. 30A is a perspective view of the intake valve member 960I, FIG. 30B is a cross-sectional illustration of the intake valve member 960I, and FIG. 30C is a bottom view of the intake valve member 960I. The intake valve member 960I can be the same or similar in structure and/or function to any of the valve members described herein. For example, the intake valve member 960I can include a flow passage portion 962I (also referred to as a valve bridge), a first stem portion 976I, and a second stem portion 977I. The flow passage portion 962I can include a number of sealing portions 972I and can define a number of flow passages 968I. Additionally, the intake valve member 960I can include a first upper wall 998I and a second upper wall 998I. The first upper wall 998I can be configured such that it lies in a plane parallel to a plane containing a bottom surface 963I of the intake valve member 960I. The second upper wall 997I can be configured such that it is disposed at an angle relative to the first upper wall 998I and tapers downward toward the first upper wall 998I. Said another way, the second upper wall 997I can have a surface lying in a plane that intersects a surface of the first upper wall at a non-zero angle. Thus, the first upper wall 998I and the second upper wall 997I can be configured to engage with a first intake valve pocket upper surface and a second intake valve pocket upper surface (such as 995I and 999I shown in FIG. 29F) of a cylinder head. Additionally, the second upper wall 997I can be configured such that the second upper wall 997I has the same taper angle as the first intake valve pocket upper surface of a corresponding cylinder head. Said another way, a valve pocket can have a first valve pocket upper surface and a second valve pocket upper surface. The first valve pocket upper surface can lay in a plane parallel to the plane containing the first upper surface (surface of first upper wall 998I) of the valve member 960I, the second valve pocket upper surface lying in a plane parallel to the plane containing the second upper surface (surface of second upper wall 997I) of the valve member, the second upper surface of the valve member and the second valve pocket upper surface configured to be in abutting contact when the valve member 960I is in a closed configuration relative to a cylinder bridge (e.g., cylinder bridge 994I).

As shown in FIG. 30C, the intake valve member 960I can have a first width W1. Additionally, the flow passages 968I can have any suitable shape or length, and can have the same or similar characteristics as any of the valve member flow passages described herein.

FIGS. 31A-31C are various views of an exhaust valve member 960E. Specifically, FIG. 31A is a perspective view of the exhaust valve member 960E, FIG. 31B is a cross-sectional illustration of the exhaust valve member 960E, and FIG. 31C is a bottom view of the exhaust valve member 960E. The exhaust valve member 960E can be the same or similar in structure and/or function to any of the valve members described herein (e.g., intake valve member 960I). For example, the exhaust valve member 960E can include a flow passage portion 962E (also referred to as a valve bridge), a first stem portion 976E, and a second stem portion 977E. The flow passage portion 962E can include a number of sealing portions 972E and can define a number of flow passages 968E. Additionally, the exhaust valve member 960E can include a first upper wall 998E and a second upper wall 998E. The first upper wall 998E can be configured such that it lies in a plane parallel to a bottom surface 963E of the exhaust valve member 960E. The second upper wall 997E can be configured such that it is disposed at an angle relative to the first upper wall 998E and tapers downward toward the first upper wall 998E. Thus, the first upper wall 998E and the second upper wall 997E can be configured to engage with a first exhaust valve pocket upper surface and a second exhaust valve pocket upper surface (such as 995E and 999E shown in FIG. 29F) of a cylinder head. Additionally, the second upper wall 997E can be configured such that the second upper wall 997E has the same taper angle as the first intake valve pocket upper surface of a corresponding cylinder head.

As shown in FIG. 31C, the exhaust valve member 960E can have a second width W2. Additionally, the flow passages 968E can have any suitable shape or length, and can have the same or similar characteristics as any of the valve member flow passages described herein. In some embodiments, the first width W1 of the intake valve member 960I can be greater than the second width W2 of the exhaust valve member 960E. In some embodiments, the first width W1 can be the same width as the second width W2 of the exhaust valve member 960E. In some embodiments, the first width W1 can be less than the second width W2 of the exhaust valve member 960E.

Figure 32:
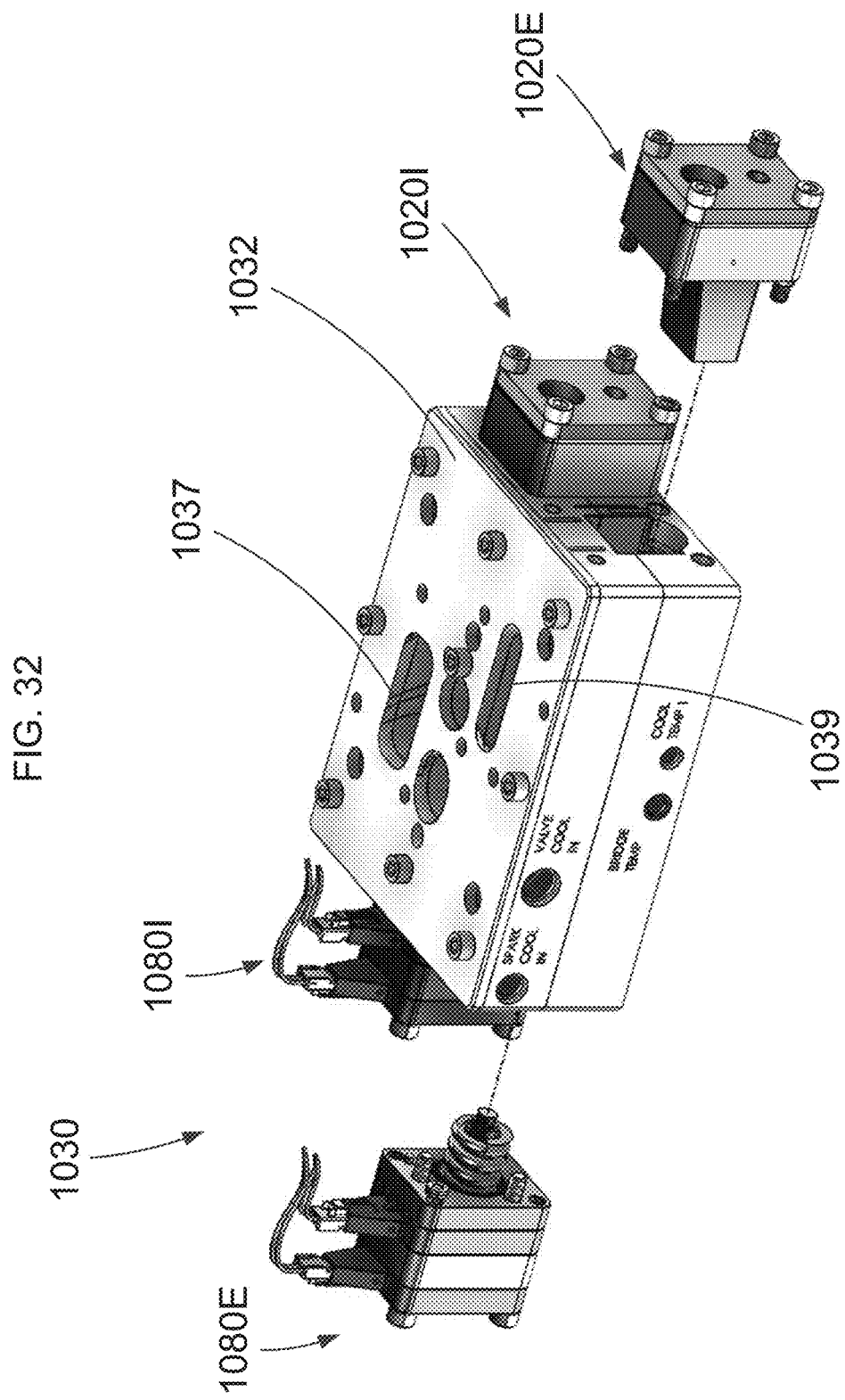
FIG. 32 is a partially exploded perspective view of a cylinder head assembly, according to an embodiment.

FIG. 32 is a partially exploded perspective view of a cylinder head assembly 1030. The cylinder head assembly 1030 can include a cylinder head 1032, an intake valve actuator assembly 1080I, an exhaust valve actuator assembly 1080E, an intake valve return assembly 1020I, and an exhaust valve return assembly 1020E. The cylinder head 1032 can be the same or similar in structure and/or function to any of the cylinder heads described herein. For example, the cylinder head 1032 can define an intake port 1037 and an exhaust port 1039. Similarly, the intake valve actuator assembly 1080I and/or the exhaust valve actuator assembly 1080E can be the same or similar in structure and/or function to any of the actuator or solenoid assemblies described herein. The intake valve return assembly 1020I and the exhaust valve return assembly 1020E can be the same or similar in structure and/or function to any of the return or spring assemblies described herein. The cylinder head assembly 1030 can be assembled the similarly to any of the cylinder head assemblies described herein, such as cylinder head assembly 230 as shown in FIG. 7.

Figure 33:
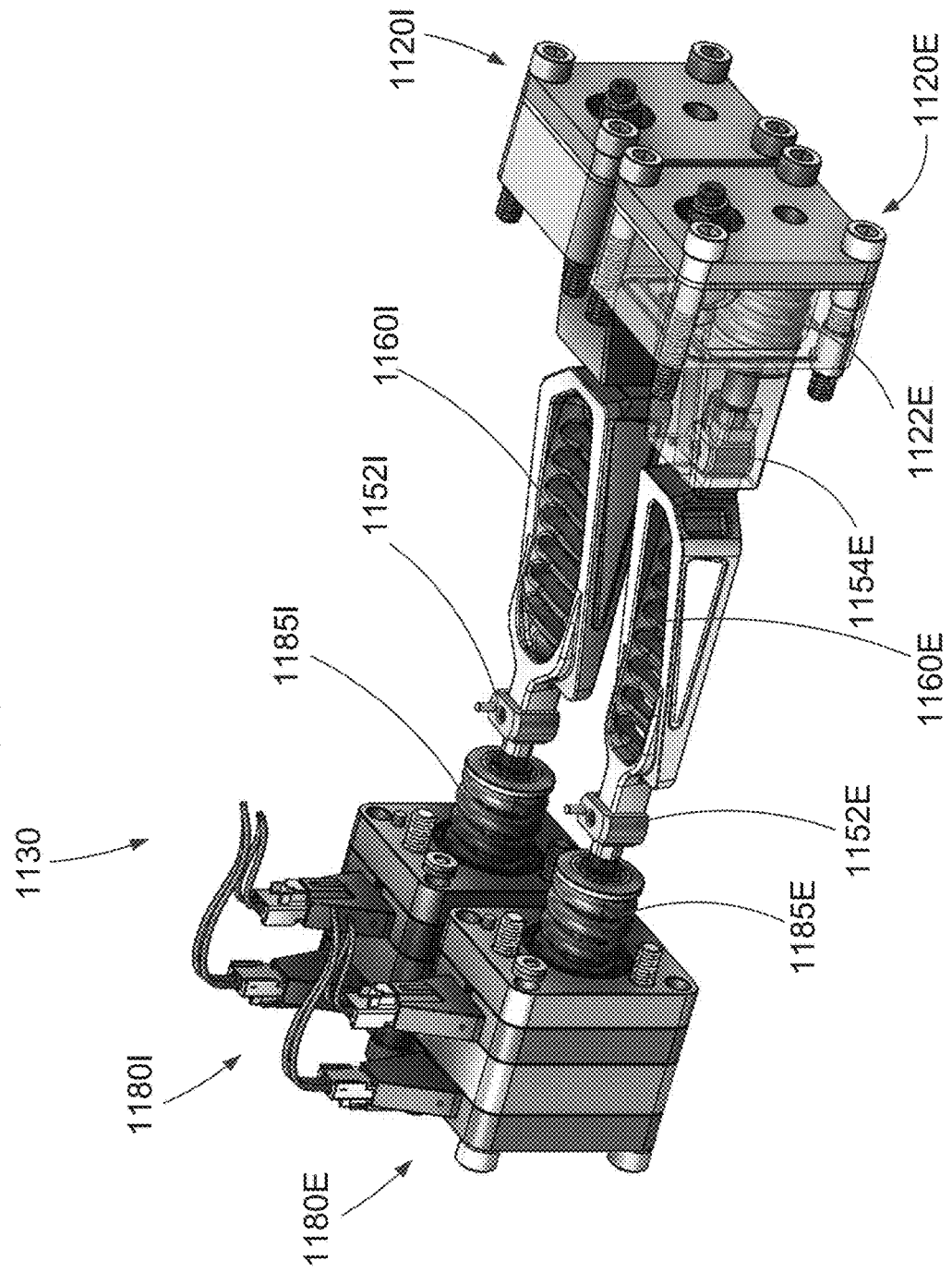
FIG. 33 is a perspective view of a cylinder head assembly, according to an embodiment.

FIG. 33 is a perspective view of a cylinder head assembly 1130 shown without a cylinder head. The assembly 1130 includes an intake valve actuator assembly 1180I, an exhaust valve actuator assembly 1180E, an intake valve return assembly 1120I, and an exhaust valve return assembly 1120E. The assembly 1130 also includes an intake valve member 1160I and an exhaust valve member 1160E. The intake valve actuator assembly 1180I and/or the exhaust valve actuator assembly 1180E can be the same or similar in structure and/or function to any of the actuator or solenoid assemblies described herein. The intake valve return assembly 1120I and the exhaust valve return assembly 1120E can be the same or similar in structure and/or function to any of the return or spring assemblies described herein. Similarly, the intake valve member 1160I and the exhaust valve member 1160E can be the same or similar in structure and/or function to any of the valve members described herein.

As shown in FIG. 33, the intake valve actuator assembly 1180I and the exhaust valve actuator assembly 1180E can include an intake actuator spring 1185I and an exhaust actuator spring 1185E, respectively. Similarly, the intake valve return assembly 1120I and the exhaust valve return assembly 1120E can include an intake return spring (not shown) and an exhaust return spring 1122E.

The intake valve member 1160I and the exhaust valve member 1160E can be coupled to the respective actuator assemblies and return assemblies via valve guides. For example, a first stem portion of the intake valve member 1160I can be coupled to a valve guide 1152I. The valve guide 1152I can be movably disposed in the cylinder head of the cylinder head assembly 1130. Similarly, a first stem portion of the exhaust valve member 1160E can be coupled to a valve guide 1152E, which can also be movable disposed in the cylinder head of the cylinder head assembly 1130. A second stem portion of the intake valve member 1160I can be coupled to the intake valve return assembly 1120I via a valve guide (not shown) movable disposed within a housing of the intake valve return assembly 1120I. Similarly, a second stem portion of the exhaust valve member 1160E can be coupled to a valve guide 1154E. The valve guide 1154E can be movable disposed within a housing of the exhaust valve return assembly 1120E. In some embodiments, each of the valve guides 1152 and 1154 can also provide a seal between, for example, the valve pocket and the cylinder head.

Figure 34:
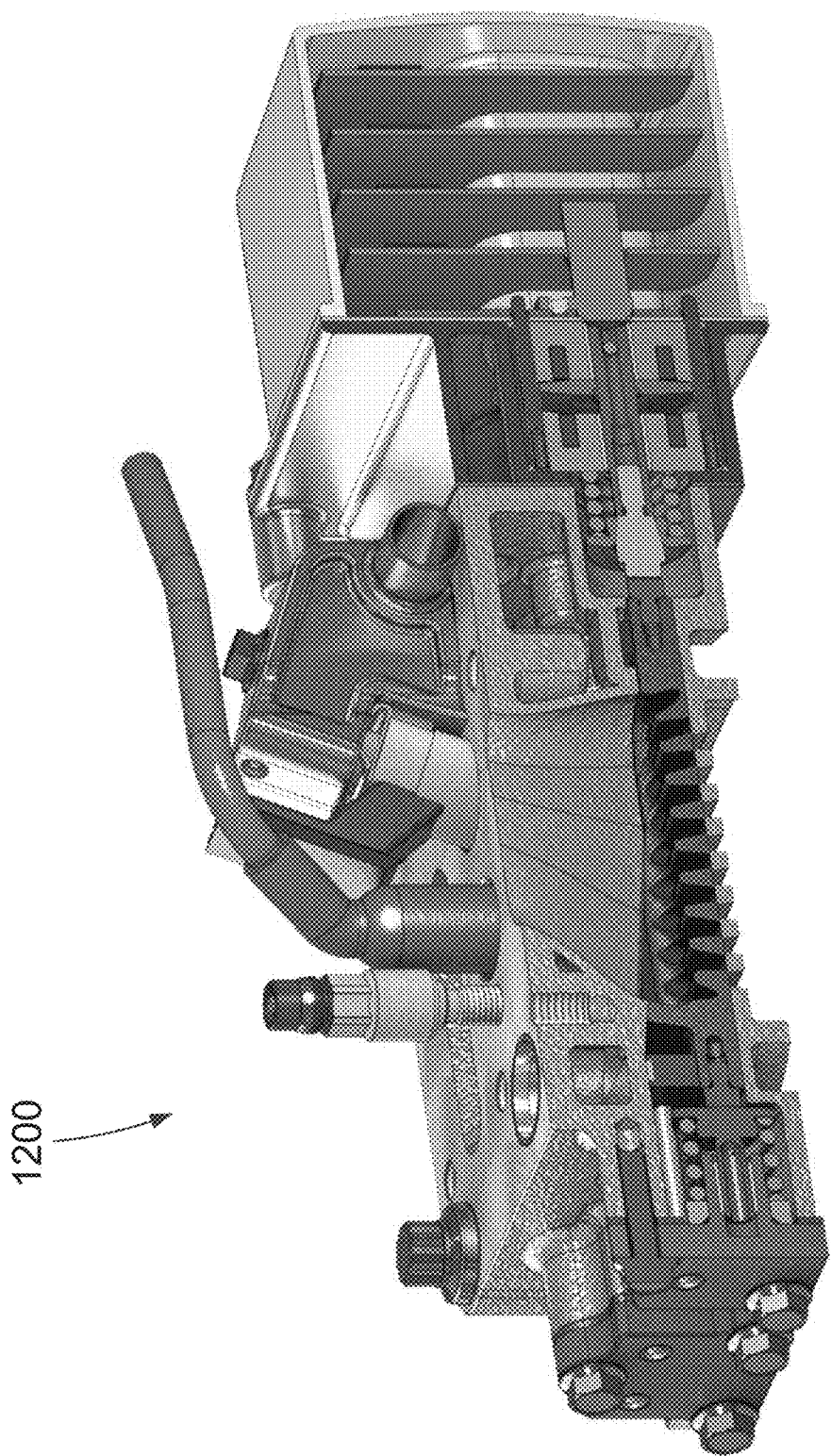
FIG. 34 is a cross-sectional view of an engine, according to an embodiment.

FIG. 34 is a cross-sectional view of an engine 1200 according to an embodiment. The engine 1200 can be the same or similar in structure and function to any of the engines described herein, such as the engine 800 described above and shown in FIG. 28. FIG. 34 shows the engine 800 with the cross-section taken through an intake valve member and an intake gas manifold.

Figure 35:
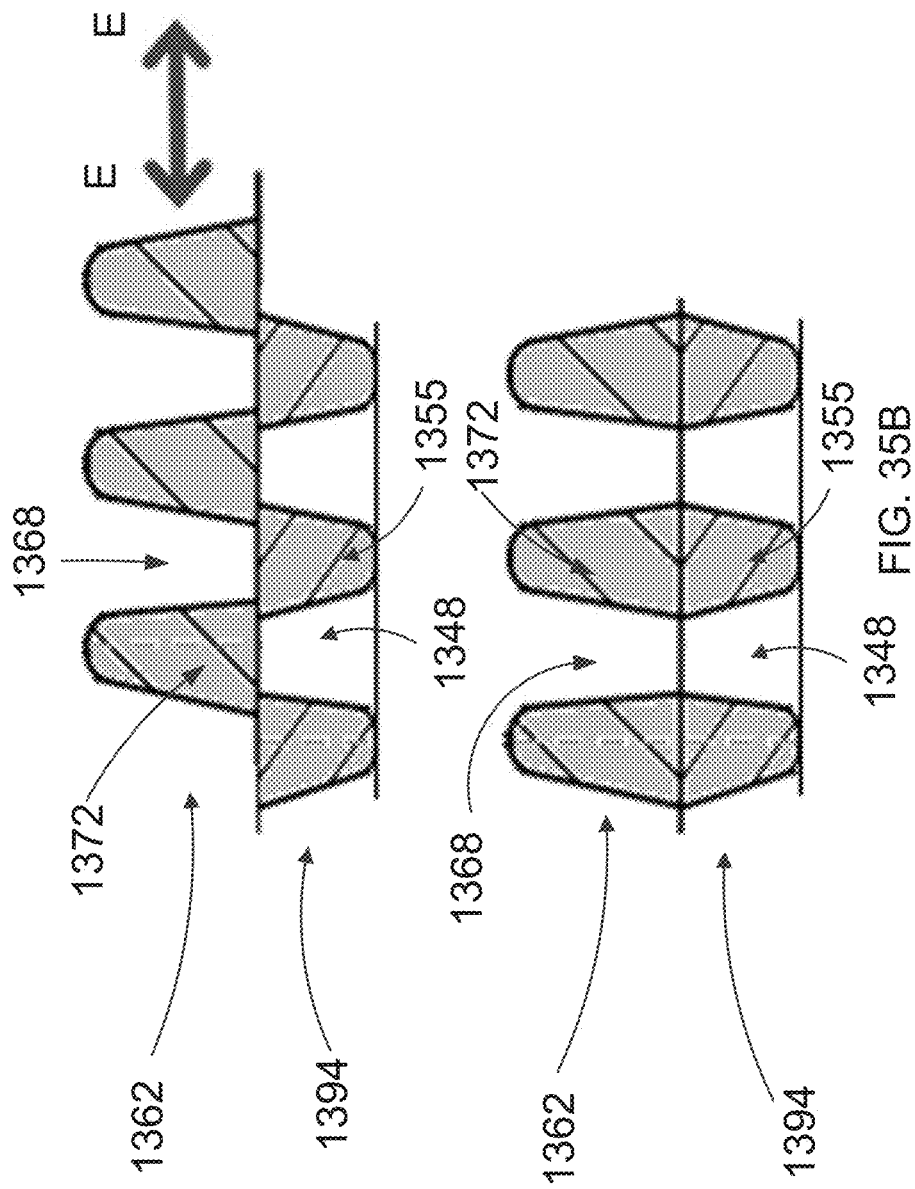
FIGS. 35A and 35B are schematic cross-sectional illustrations of a valve bridge and a cylinder bridge in a first configuration and a second configuration, respectively, according to an embodiment.

FIGS. 35A and 35B are schematic cross-sectional illustrations of a valve bridge 1362 and a cylinder bridge 1394 in a first configuration and a second configuration, respectively. As shown, the valve bridge 1362 includes three sealing portions 1372. Between each sealing portion 1372, a flow passage 1368 is defined. Similarly, the cylinder bridge 1394 includes three sealing portions 1355. Between each sealing portion 1355, a flow passage 1348 is defined. As shown in FIG. 35A, the valve bridge 1362 and the cylinder bridge 1394 are in a closed configuration. Each of the flow passages 1368 of the valve bridge 1362 are obstructed by a sealing portion 1355 of the cylinder bridge 1394, and each of the flow passages 1348 of the cylinder bridge 1394 is obstructed by a sealing portion 1372 of the valve bridge 1362. Thus, in the closed configuration of FIG. 35A, there is no fluid communication between the flow passages 1368 and the flow passages 1348.

Similarly to the valve bridges included in any of the other valve members described herein, the valve bridge 1362 is configured to translate along line EE. Thus, for example under the force of any of the actuator or solenoid assemblies described herein, the valve bridge 1362 can be translated or shifted relative to the cylinder bridge 1394 into an open configuration as shown in FIG. 35B. In this configuration, the flow passages 1368 and 1348 are unobstructed and in fluid communication. As shown in FIG. 35B, when in the open configuration, the flow passages 1368 and 1348 can be configured such that the flow passages 1368 of the valve bridge 1362 taper or decrease in diameter as the flow passages 1368 approach the interface between the valve bridge 1362 and the cylinder bridge 1394. Similarly, the flow passages 1348 can be configured such that the flow passages 1348 of the cylinder bridge 1394 taper or decrease in diameter as they flow passages 1348 approach the interface between the valve bridge 1362 and the cylinder bridge 1394.

Figure 36:
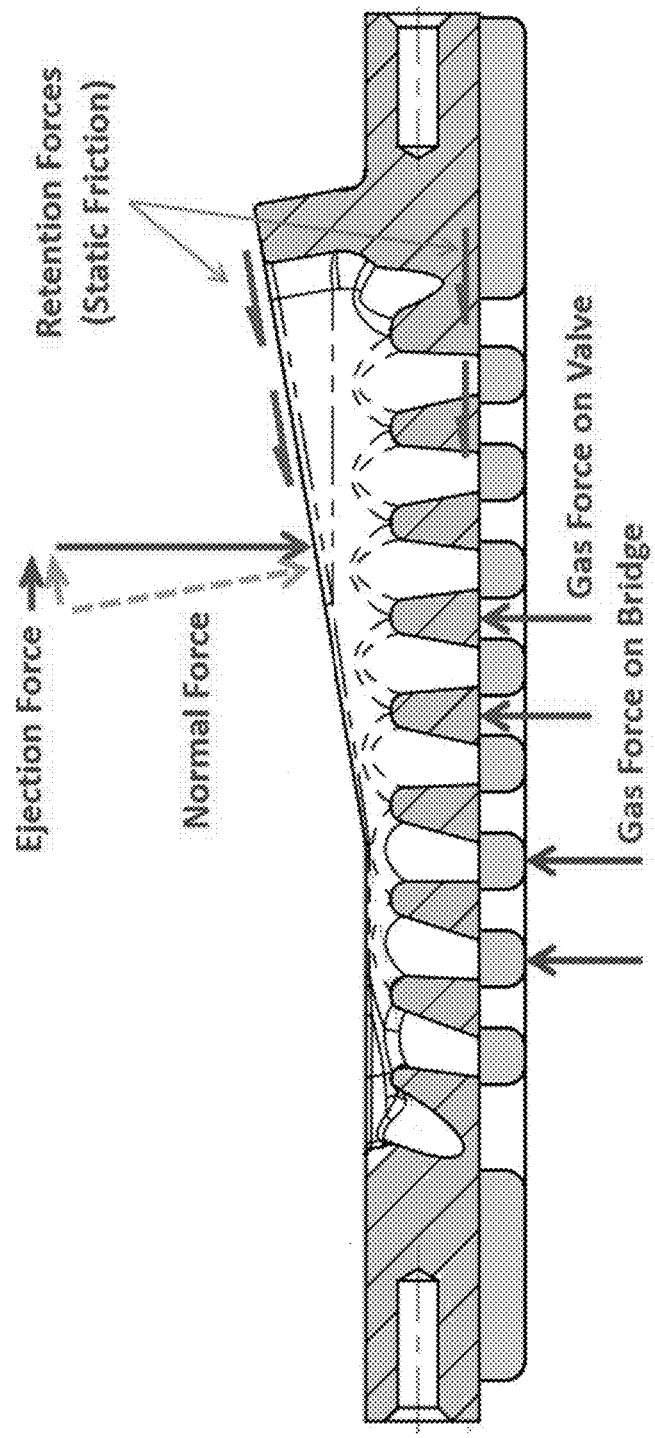
FIG. 36 is a schematic cross-sectional exemplary illustrations of the forces applied to a valve member in a closed configuration relative to a cylinder bridge, according to an embodiment.

FIG. 36 is a schematic cross-sectional exemplary illustration of the forces applied to a valve member in a closed configuration relative to a cylinder bridge. As shown, when in a closed configuration, both the a cylinder bridge and a valve bridge experience upward forces resulting from gas pressure. When pushed into the closed configuration and while maintained in the closed configuration, the tapered portion of the outer wall of the valve can be pushed against a complementarily tapered interior wall of a valve pocket. The interior wall of the valve pocket can apply a resulting downward force that improves the seal between the valve bridge and the cylinder bridge in the closed configuration.

Figure 37B:
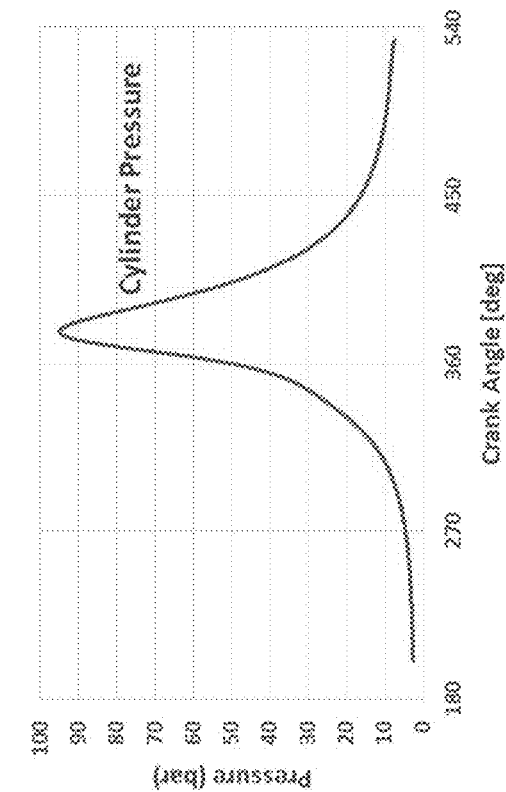
FIGS. 37A and 37B are exemplary graphs of the forces and pressure applied to a valve member at various crank angles, according to an embodiment.
Figure 37A:
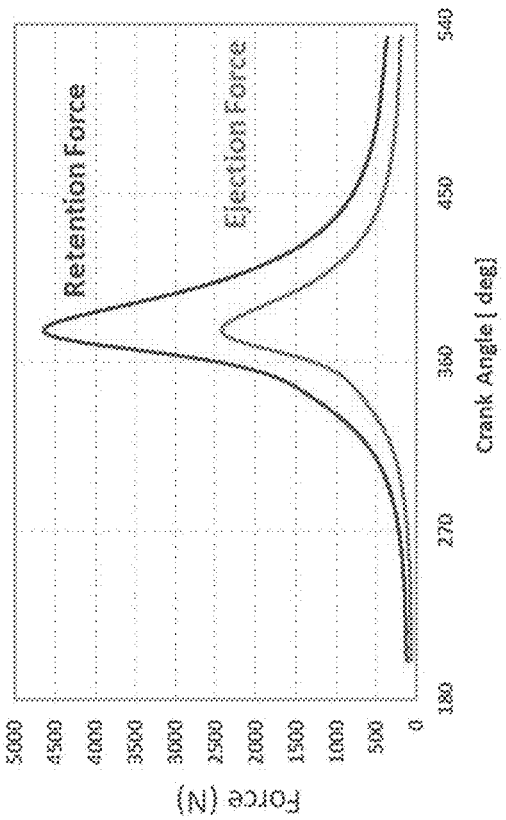

FIGS. 37A and 37B are exemplary graphs of the forces and pressure experienced by a valve member, such as the valve member shown in FIG. 36 in a closed configuration, at various crank angles during operation of an engine including the valve member.

Figure 38A:
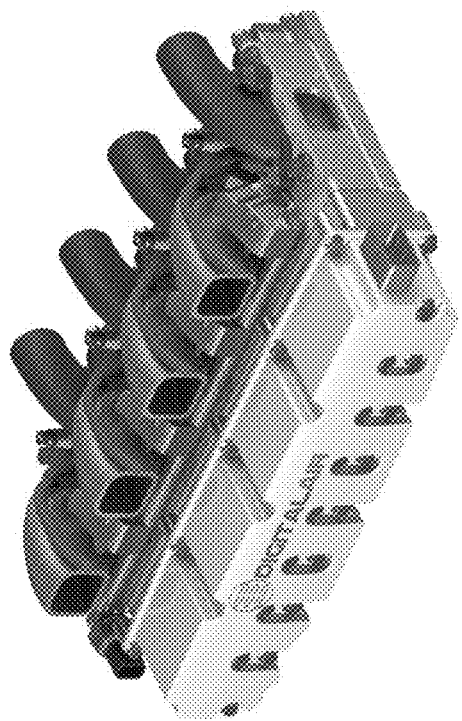
FIGS. 38A and 38B are a perspective view and a partially exploded view, respectively, of an assembly, according to an embodiment.
Figure 38B:
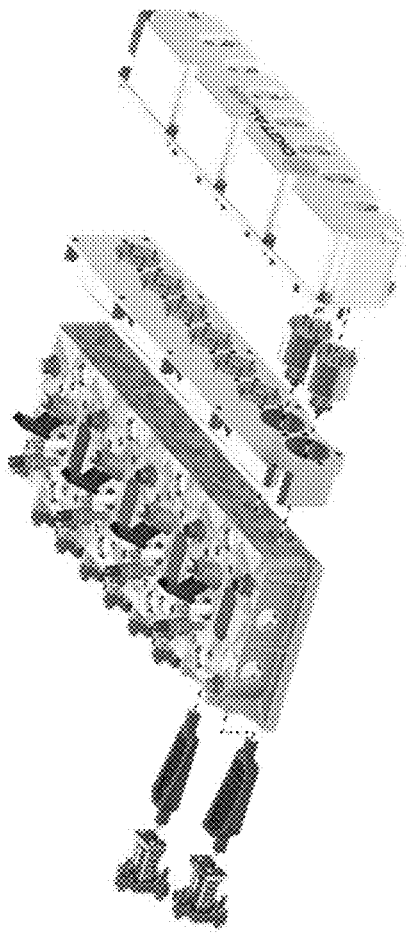

FIGS. 38A and 38B are a perspective view and a partially exploded view, respectively, of an assembly of according to an embodiment. As shown, the assembly can include four cylinder head assemblies, each including an intake valve member and an exhaust valve member. Each of the cylinder head assemblies can be the same or similar in structure and/or function to any of the cylinder head assemblies described herein. Additionally, the engine can include a housing configured to contain and support each of the actuator (e.g., solenoid) assemblies for actuating the valve members. Said another way, the housing can include openings (e.g., eight openings) such that each opening can contain an actuator assembly and support the actuator assembly in operable engagement with a valve member.

Figure 39C:
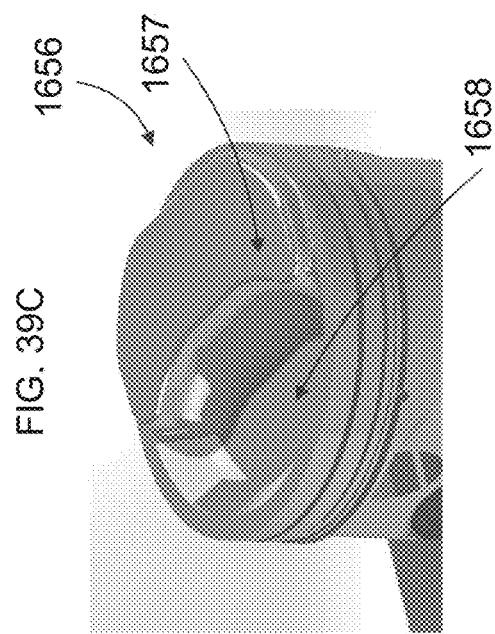
FIG. 39C is a perspective view of the top of a piston, according to an embodiment.
Figure 39A:
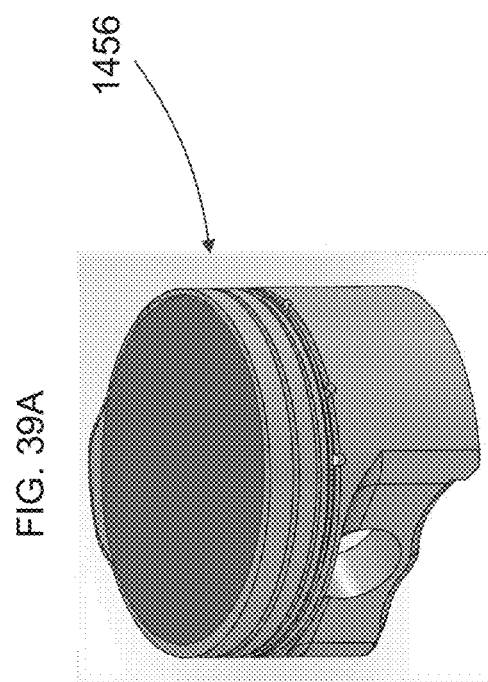
FIG. 39A is a perspective view of the top of a piston, according to an embodiment.
Figure 39B:
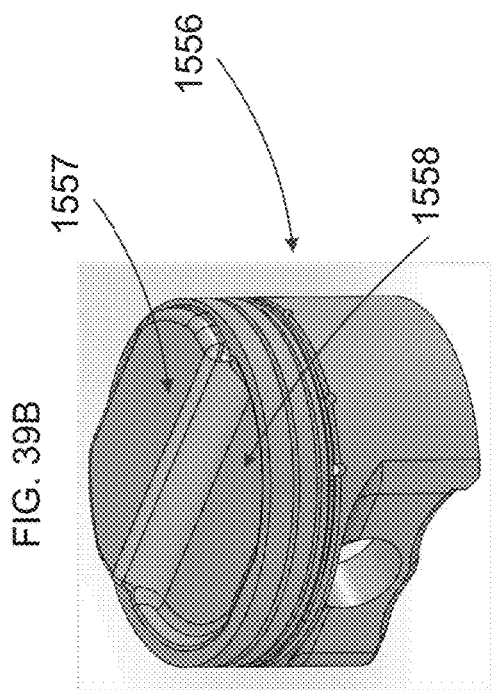
FIG. 39B is a perspective view of the top of a piston, according to an embodiment.

FIGS. 39A-39C illustrate a variety of pistons that can be configured to be used with any of the engines and/or components described herein, according to an embodiment. Specifically, the pistons can be disposed in any of the combustion chambers defined by the cylinders (e.g., cylinder 103, 803) described herein. In some embodiments, the combustion chamber and/or piston bowl can be designed to reduce engine knock tendencies for an engine operating with one of the valve members described herein. Combustion and CFD modeling indicate that flow patterns setup by the valve members described herein can be very different than those in a conventional engine. As such, unique combustion chamber designs can be used to move the flame front toward the gases under the exhaust valve bridge to prevent them from auto-igniting. A piston bowl centered under the exhaust valve can reduce knock tendency in a port injected gasoline engine.

FIG. 39A illustrates a piston 1456 with a flat upper surface. FIG. 39A illustrates a piston 1556 having a piston boss 1557 and a piston bowl 1558. The piston 1556 can be positioned relative to any of the cylinder heads described herein such that the boss, or vertically extending portion, is under the intake side of the cylinder head and the bowl, or vertically depressed portion, is under the exhaust side of the cylinder head. FIG. 39C illustrates a piston 1656 having a piston boss 1657 and a piston bowl 1658. The piston boss 1657, or vertically extending portion, has edges extending to the edge of the piston 1656. Additionally, the piston bowl 1658 is depressed deeper into the piston 1656 compared to the piston bowl 1558 of piston 1556 shown in FIG. 39B. Similarly to the piston 1565, the piston 1656 can be positioned relative to any of the cylinder heads described herein such that the boss, or vertically extending portion, is under the intake side of the cylinder head and the bowl, or vertically depressed portion, is under the exhaust side of the cylinder head.

Figure 41A:
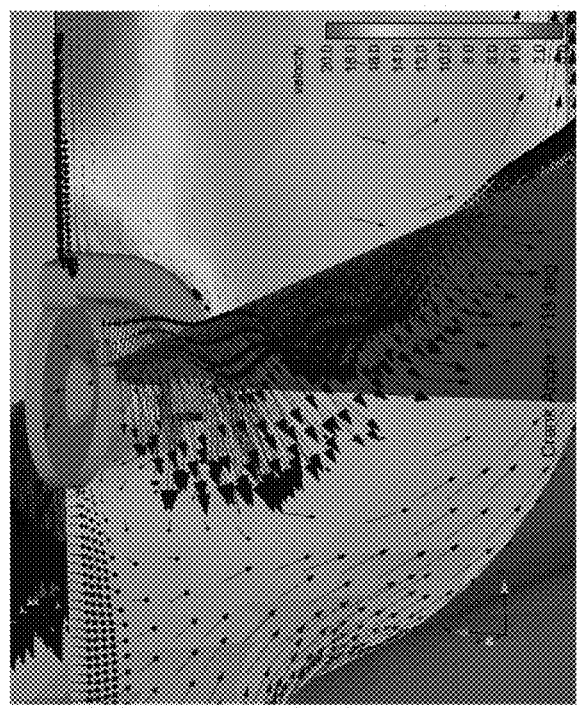
FIG. 41A is an illustrative model of velocity vectors of fluid traveling through an engine, according to an embodiment.
Figure 41B:
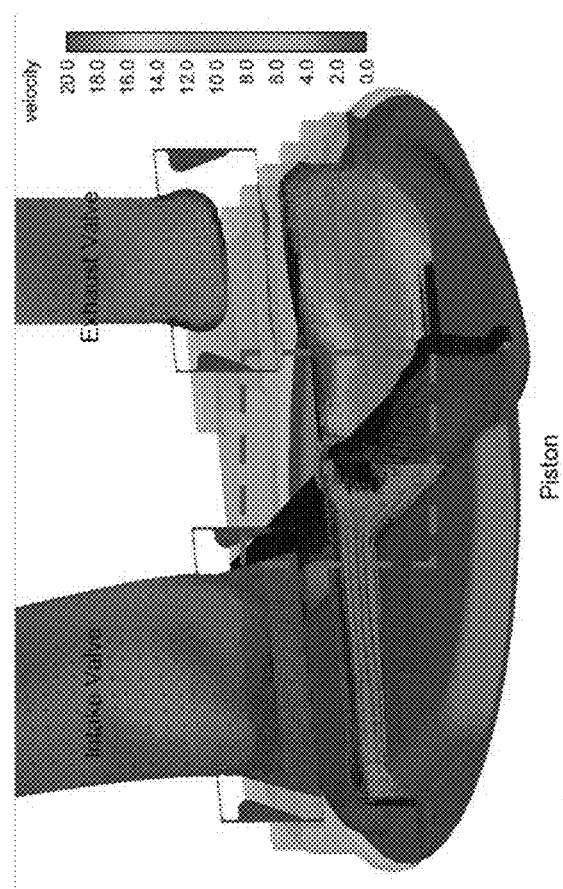
FIG. 41B is close up view of a portion of FIG. 41A.

FIGS. 41A and 41B demonstrate velocity vectors of fluid traveling through an engine at 20 degrees before top dead center of any of the engines described herein when using a piston such as the piston 1565 or the piston 1656 shown in FIGS. 39B and 39C, respectively. As shown in FIGS. 41A and 41B (which is a close up of the boxed portion of FIG. 41A), the flow around the spark plug can be forced downward into a bowl of the piston.

The following tables (i.e., Table 1 and Table 2) reflect performance metrics of a cylinder head assembly (such as any of the cylinder head assemblies described herein), according to an embodiment.

TABLE 1

| | Mean [m/s] | Sigma [m/s] | Min [m/s] | Max [m/s] |
|---|---|---|---|---|
| Intake Open Seating Velocity | 1.29 | 0.15 | 0.98 | 1.63 |
| Intake Close Seating Velocity | 1.26 | 0.45 | 0.98 | 1.63 |
| Exhaust Open Seating Velocity | 1.40 | 0.08 | 1.16 | 1.56 |
| Exhaust Close Seating Velocity | 1.39 | 0.43 | 0.34 | 2.47 |

TABLE 1-continued

|  | Mean [ms] | Sigma [ms] | Min [ms] | Max [ms] |
|---|---|---|---|---|
| Intake Opening Travel Time | 2.62 | 0.22 | 2.15 | 3.10 |
| Intake Closing Travel Time | 2.63 | 0.03 | 2.15 | 3.10 |
| Exhaust Opening Travel Time | 2.42 | 0.05 | 2.33 | 2.54 |
| Exhaust Closing Travel Time | 2.38 | 0.05 | 2.24 | 2.53 |

|  | Mean [deg] | Sigma [deg] | Min [deg] | Max [deg] |
|---|---|---|---|---|
| Intake Open Timing | 371.02 | 0.88 | 368.49 | 372.37 |
| Intake Close Timing | 509.79 | 0.42 | 508.79 | 510.42 |
| Exhaust Open Timing | 180.62 | 0.28 | 180.04 | 181.13 |
| Exhaust Close Timing | 337.76 | 0.43 | 336.92 | 338.83 |

TABLE 2

|  | Mean [m/s] | Sigma [m/s] | Min [m/s] | Max [m/s] |
|---|---|---|---|---|
| Intake Open Seating Velocity | 1.06 | 0.10 | 0.80 | 1.28 |
| Intake Close Seating Velocity | 1.32 | 0.34 | 0.80 | 1.28 |
| Exhaust Open Seating Velocity | 1.51 | 0.13 | 0.97 | 1.75 |
| Exhaust Close Seating Velocity | 1.86 | 0.52 | 0.64 | 3.00 |

|  | Mean [ms] | Sigma [ms] | Min [ms] | Max [ms] |
|---|---|---|---|---|
| Intake Opening Travel Time | 2.65 | 0.14 | 2.36 | 2.95 |
| Intake Closing Travel Time | 2.68 | 0.15 | 2.36 | 2.95 |
| Exhaust Opening Travel Time | 2.15 | 0.17 | 1.38 | 2.40 |
| Exhaust Closing Travel Time | 2.44 | 0.10 | 2.20 | 2.60 |

|  | Mean [deg] | Sigma [deg] | Min [deg] | Max [deg] |
|---|---|---|---|---|
| Intake Open Timing | 334.18 | 0.54 | 332.97 | 335.49 |
| Intake Close Timing | 547.83 | 0.28 | 547.10 | 548.26 |
| Exhaust Open Timing | 157.52 | 0.52 | 156.09 | 158.44 |
| Exhaust Close Timing | 385.26 | 0.68 | 383.40 | 386.62 |

Figure 40A:
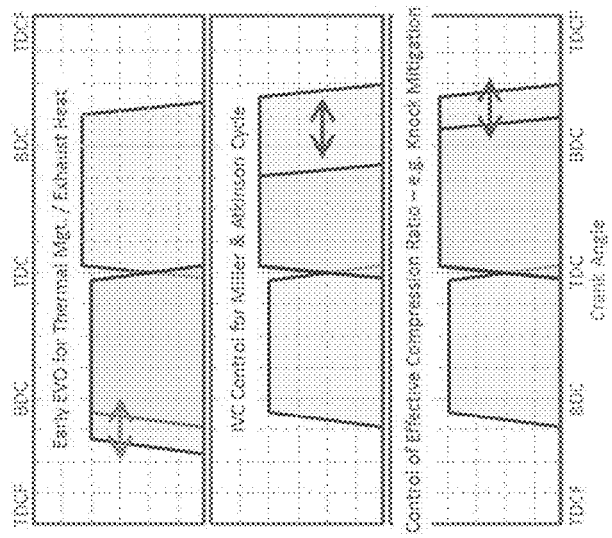
FIGS. 40A and 40B are graphical illustrations of various valve actuation cycles through various crank angles, according to various embodiments.
Figure 40B:
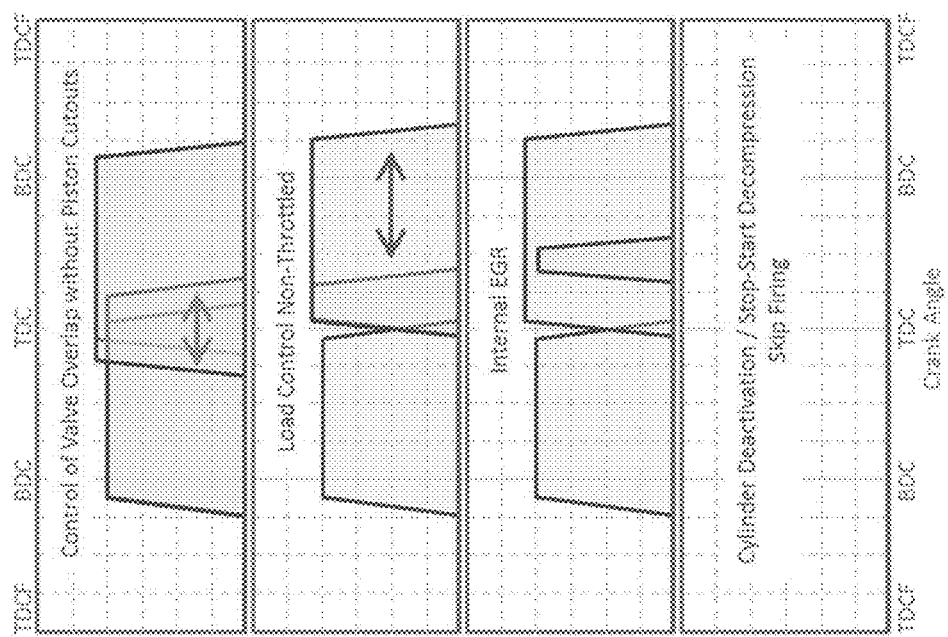

The engines and cylinder head assemblies described herein can be used for fully variable valvetrain actuation. In other words, the valve members can be actuated to perform a variety of valve and/or engine events or processes due to the flexibility of the actuation assemblies and return assemblies in the cylinder head assemblies. In some embodiments, for example, an intake valve member and an exhaust valve member can be actuated independently to perform various types of engine cycles or engine processes. FIGS. 40A and 40B illustrate examples of various valve actuation cycles through various crank angles. The cylinder head assemblies described herein can be actuated as shown by the valve motion profiles in the graphs illustrated in FIGS. 40A and 40B.

As shown in FIG. 40A, in some embodiments, a first valve (e.g., an intake valve member such as any of the valve members described herein) can be moved to an open position as the crank angle of a crankshaft associated with a piston within a combustion chamber associated with the first valve approaches bottom dead center (BDC). The first valve can be maintained in the open position, and a second valve (e.g., an exhaust valve member such as any of the valve members described herein) can be moved to an open position as the crank angle approaches top dead center (TDC). After opening the second valve and as the crank angle moves away from TDC back toward BDC, the first valve can be closed. After the crank angle reaches BDC, the second valve can be closed. Thus, the first valve and the second valve can be configured and actuated such that the first valve and the second valve have overlapping open periods. Said another way, the first valve and the second valve can both be maintained in an open position for a period of time. Similarly, the first valve and the second valve can both be maintained in a closed position for a period of time. In some embodiments, the first valve can be reopened for a period after closing the first valve while maintaining the second valve in the open position.

With respect to the operation of any of the systems or assemblies described herein, the timing of an engine incorporating any of the cylinder head assemblies described herein can be virtually unlimited with respect to piston position. Additionally, in some embodiments, the duration of valve events can be limited only by actuation speed. In some embodiments, the cylinder head assemblies described herein can translate or moved a valve member from a neutral or center-biased position to an open position in, for example, about 2 ms, in about 3 ms, and/or between about 2 ms and about 3 ms. In some embodiments, the cylinder head assemblies described herein can translate or moved a valve member from a neutral or center-biased position to a closed position in about 2 ms, in about 3 ms, and/or between about 2 ms and about 3 ms. In some embodiments, the cylinder head assemblies described herein can translate or moved a valve member from an open position to a closed position or from a closed position to an open position in about 2 ms, in about 3 ms, and/or between about 2 ms and about 3 ms.

In some embodiments, any of the valve members and/or cylinder head assemblies can be controlled according to methods or used in cycles described in U.S. Pat. No. 9,145,797, entitled "Valve Apparatus for an Internal Combustion Engine," issued Sep. 29, 2015, which is hereby incorporated by reference in its entirety.

Figure 42:
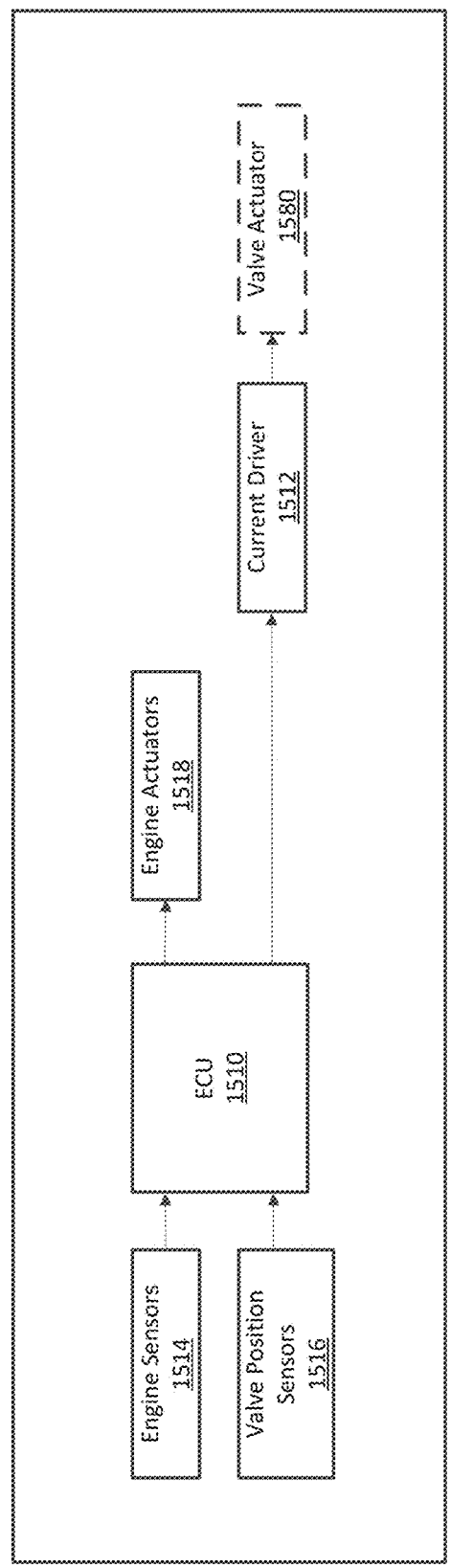
FIG. 42 is a schematic illustration of a system, according to an embodiment.

FIG. 42 is a schematic illustration of a system 1500, according to an embodiment. As shown in FIG. 42, the system 1500 can include an electronic control unit (ECU) 1510 and a current driver 1512. In some embodiments, the electronic control unit 1510 can include integrated valve control algorithms. Additionally, the electronic control unit 1510 can be configured to receive inputs from engine sensors 1514 and valve position sensors 1516. In some embodiments, the engine sensors 1514 can sense various conditions of the engine (such as any of the engines described herein), such as, for example, pressure and/or temperature in a combustion chamber. In some embodiments, the valve position sensors 1516 can sense the position of one or more valve members (such as any of the valve members described herein) included in the engine (e.g., in a cylinder head assembly).

In response to the received inputs, the electronic control unit 1510 can send signals to engine actuators 1518 associated with the engine. Additionally, the electronic control unit 1510 can send signals to the current driver 1512. For example, in some embodiments, the electronic control unit 1510 can send transistor-transistor logic (TTL) drive signals to the current driver 1510. The current driver 1512 can then send drive signals to a valve actuator 1580. The valve actuator 1580 can be, for example, any of the actuator or solenoid assemblies described herein. Thus, the system 1500 can be used to control the operation of any of the cylinder head assemblies described herein such that the valve members can be fully variably actuated to complete various engine cycles.

Figure 43:
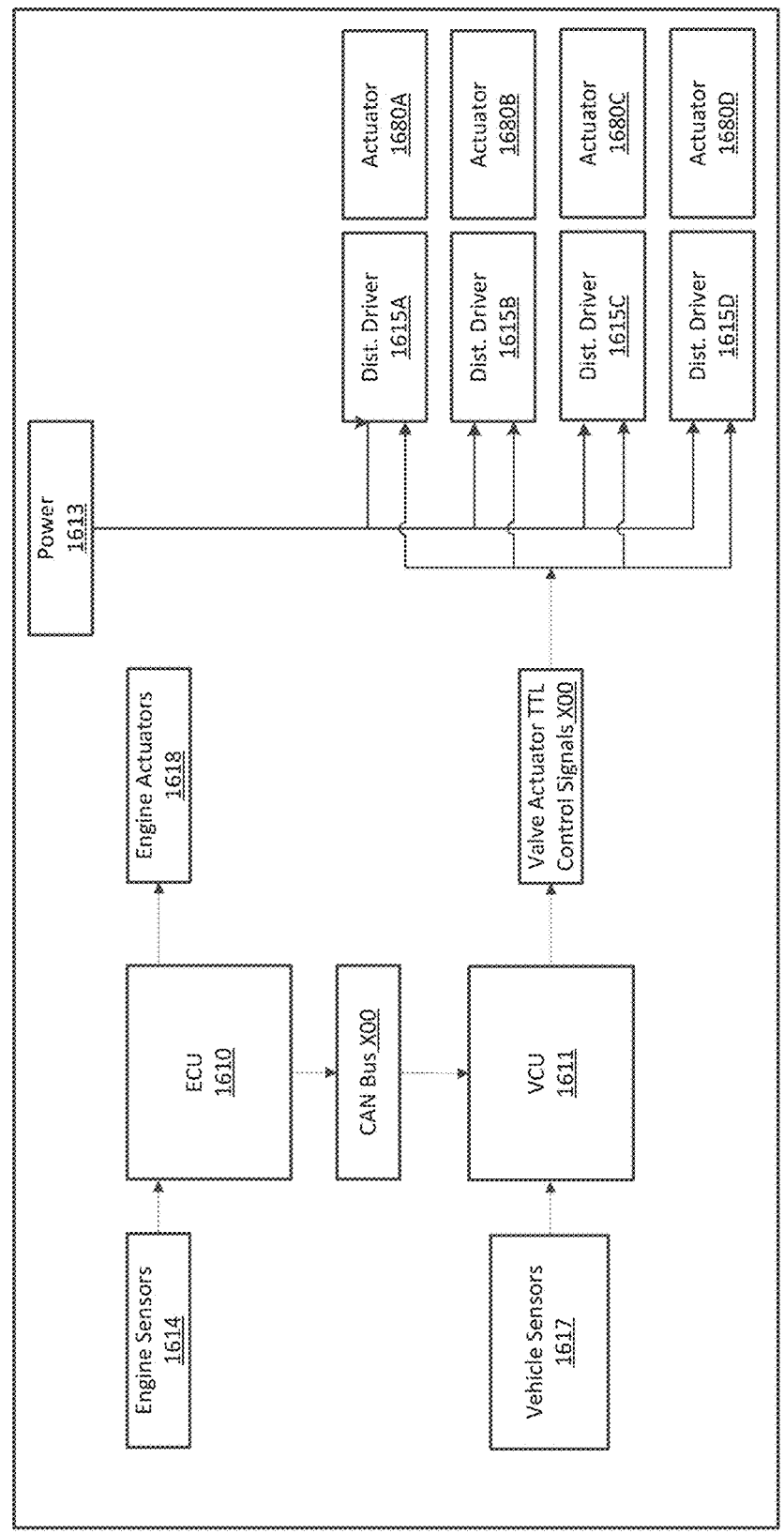
FIG. 43 is a schematic illustration of a system, according to an embodiment.

FIG. 43 is a schematic illustration of a system 1600, according to an embodiment. As shown in FIG. 43, the system 1600 can include an electronic control unit (ECU) 1610 and a vehicle control unit (VCU) 1611. In some embodiments, the system 1600 can also include a power source 1613. The electronic control unit 1610 can be configured to receive signals from engine sensors 1614 and to send signals and/or instructions to engine actuators 1618. In some embodiments, the engine sensors 1614 can sense various conditions of the engine (such as any of the engines described herein), such as, for example, pressure and/or temperature in a combustion chamber. The electronic control unit 1610 can also be coupled to the vehicle control unit 1611. The vehicle control unit 1611 can received sensor data from a variety of sensors 1617, such as sensors corresponding to valve position, engine position, and other data. The vehicle control unit 1611 can send control signals to each of four distributed current drivers 1615A-1615D. In some embodiments, the vehicle control unit 1611 can send valve actuator TTL control signals to the distributed current drivers 1615A-1615D. Each of the distributed current drivers 1615A-1615D are operable coupled to an actuator 1680A-1680D. The power source 1613 can also be coupled to each of the four distributed current drivers 1615A-1615D. Although four distributed current drivers 1615 and four actuators 1680 are shown, the system 1600 can include any suitable number of distributed current drivers and actuators. The actuators 1680 can include any of the actuator or solenoid assemblies described herein such that the system 1600 can control the valve member positions of valve members (such as any of the valve members described here) within any of the cylinder head assemblies described herein. Thus, the system 1600 can be used to control the operation of any of the cylinder head assemblies described herein such that the valve members can be fully variably actuated to complete various engine cycles.

FIG. 45 is an illustration of a method 3100 of operating any of the cylinder head assemblies and/or engines described herein. The method 3100 includes, at 3102, moving a valve member in a first direction within a valve pocket defined by a cylinder head from a first configuration to a second configuration such that a gas manifold is in fluid communication with a cylinder via a plurality of valve passages defined by the valve member. At 3104, the valve member is moved in a second direction opposite the first direction within the valve pocket from the second configuration to a third configuration such that the gas manifold is fluidically isolated from the cylinder. At 3106, the valve member is released such that the valve member moves to the first configuration.

FIG. 46 is an illustration of a method 3200 of operating any of the cylinder head assemblies and/or engines described herein. The method 3200 includes, at 3202, applying a first current to a first electromagnetic coil of an actuation assembly such that an armature is drawn toward the first electromagnetic coil, the armature being coupled to a valve member such that the movement of the armature causes the valve member to move within a valve pocket defined by a cylinder head from a neutral configuration to an open configuration. The valve member can define a plurality of valve flow passages. A gas manifold can be in fluidic communication with a cylinder via the plurality of valve flow passages in the open configuration. At 3204, the application of the first current to the first electromagnetic coil can be ceased such that the valve member moves to the neutral configuration. At 3206, a second current can be applied to a second electromagnetic coil of an actuation assembly such that the valve member moves to a closed configuration, the gas manifold being fluidically isolated from the cylinder in the closed configuration.

In some embodiments, the electromagnetic actuators (also referred to as solenoid assemblies) described herein can include two nested coils rather than a single wound coil for variability of control. For example, one of the two coils could be actuated at various points during valve member motion to achieve the desired force and reduce power consumption. Additionally, in some embodiments, square, rectangular, or flat wire can be used for the coil rather than standard round wire. Thus, tighter packaging may be achieved while utilizing the same number of turns.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. While the embodiments have been particularly shown and described, it will be understood that various changes in form and details may be made. Although various embodiments have been described as having particular features and/or combinations of components, other embodiments are possible having a combination of any features and/or components from any of embodiments as discussed above.

The invention claimed is:

1. An apparatus, comprising:
    a cylinder head having an interior surface defining a valve pocket, the cylinder head configured to be coupled to a cylinder and a gas manifold; and
    a valve member having a portion defining a plurality of valve flow passages, the valve member configured to be disposable within the valve pocket such that the valve member is movable within the valve pocket along a longitudinal axis of the valve member, the apparatus having a first configuration, a second configuration, and a third configuration,
        in the first configuration, each valve flow passage from the plurality of valve flow passages being in fluid communication with the cylinder and the gas manifold,
        in the second configuration, each valve flow passage from the plurality of valve flow passages being fluidically isolated from the cylinder, and
        in the third configuration, the valve member being disposed in a position different from the first configuration and the second configuration,
        the valve member being biased toward the third configuration.

2. The apparatus of claim 1, wherein the valve member is biased toward the third configuration by an actuator assembly and a return assembly.

3. The apparatus of claim 2, wherein the actuator assembly includes a force application member, an actuator, and a biasing member, the force application member configured to move the valve member.

4. The apparatus of claim 3, wherein the actuator includes a first electromagnetic coil, a second electromagnetic coil, and an armature, the actuator assembly having a first armature configuration in which the armature is in a first position adjacent to the first electromagnetic coil, a second armature configuration in which the armature is in a second position adjacent to the second electromagnetic coil, and a third armature configuration in which the armature is in a third position between the first position and the second position.

5. The apparatus of claim 4, wherein when the actuator assembly is in the first armature configuration, the valve member is in the first configuration, when the actuator assembly is in the second armature configuration, the valve member is in the second configuration, and when the actuator assembly is in the third armature configuration, the valve member is in the third configuration.

6. The apparatus of claim 2, wherein the return assembly includes a return biasing member and a return force application member, the return biasing member configured to move the valve member via a force applied to the return force application member.

7. The apparatus of claim 6, wherein the return biasing member is a spring.

8. The apparatus of claim 6, wherein the return biasing member is biased toward an expanded configuration.

9. The apparatus of claim 3, wherein the biasing member is a spring.

10. The apparatus of claim 3, wherein the biasing member is biased toward an expanded configuration.

11. The apparatus of claim 5, wherein the return assembly includes a return biasing member and a return force application member, the return biasing member configured to move the valve member via a force applied to the return force application member, and wherein, in the absence of a current applied to the armature via the first electromagnetic coil or the second electromagnetic coil, the forces applied by the biasing member and the return biasing member cause the valve member to be disposed in the third configuration.

12. The apparatus of claim 1, wherein when in the third configuration, at least one valve flow passage from the plurality of valve flow passages is partially obstructed by a portion of the cylinder head disposed between the at least one valve flow passage and the cylinder.

13. An apparatus, comprising:
a cylinder head having an interior surface defining a valve pocket, the cylinder head configured to be coupled to a cylinder and a gas manifold, a portion of the valve pocket including sealing portions, the sealing portions defining a plurality of cylinder flow passages; and
a valve member having a portion defining a plurality of valve flow passages, the valve member configured to be disposable within the valve pocket such that the valve member is movable within the valve pocket along a longitudinal axis of the valve member, the apparatus having a first configuration, a second configuration, and a third configuration,
in the first configuration, each valve flow passage from the plurality of valve flow passages is in fluid communication with the cylinder and the gas manifold, the plurality of valve flow passages in fluid communication with the cylinder via the plurality of cylinder flow passages,
in the second configuration, each valve flow passage from the plurality of valve flow passages is fluidically isolated from the cylinder via the sealing portions of the valve pocket, and
in the third configuration, an opening to each of the plurality of valve flow passages is at least partially obstructed by the sealing portions of the valve pocket such that each valve flow passage from the plurality of valve flow passages is in fluid communication with the cylinder and the gas manifold, the valve member being biased toward the third configuration.

14. The apparatus of claim 13, wherein, when in the third configuration, the openings to each of the plurality of valve flow passages are about 50% obstructed by the sealing portions of the valve pocket.

15. The apparatus of claim 13, wherein, when in the first configuration, each of the valve flow passages of the plurality of valve flow passages is axially aligned with a cylinder flow passage from the plurality of cylinder flow passages.

16. The apparatus of claim 13, wherein, when in the first configuration, at least one of the valve flow passages of the plurality of valve flow passages converges toward a corresponding cylinder flow passage from the plurality of cylinder flow passages, and the corresponding cylinder flow passage converges toward the at least one of the valve flow passages.

17. The apparatus of claim 13, wherein at least one of the plurality of valve flow passages and the plurality of cylinder flow passages have a central axis angled at a non-zero angle relative to a central axis of the cylinder head.

18. The apparatus of claim 17, wherein the non-zero angle is between about twenty degrees and about forty degrees.

19. The apparatus of claim 13, wherein the valve member includes a first upper surface, a second upper surface, and a bottom surface, the first upper surface lying in a plane parallel to a plane containing the bottom surface, the second upper surface lying in a plane at an angle relative to the first upper surface.

20. The apparatus of claim 19, wherein the valve pocket has a first valve pocket upper surface and a second valve pocket upper surface, the first valve pocket upper surface lying in a plane parallel to the plane containing the first upper surface of the valve member, the second valve pocket upper surface lying in a plane parallel to the plane containing the second upper surface of the valve member, the second upper surface of the valve member and the second valve pocket upper surface configured to be in abutting contact when the valve member is in the second configuration.

* * * * *